(12) United States Patent
Oashi et al.

(10) Patent No.: US 8,036,513 B2
(45) Date of Patent: Oct. 11, 2011

(54) PLAYBACK APPARATUS AND PLAYBACK METHOD

(75) Inventors: Masahiro Oashi, Kyoto (JP); Keiichi Tanaka, Hyogo (JP); Hidetaka Ohto, Hyogo (JP); Germano Leichsenring, Osaka (JP)

(73) Assignee: Panasonic Corporation, Osaka (JP)

( * ) Notice: Subject to any disclaimer, the term of this patent is extended or adjusted under 35 U.S.C. 154(b) by 1242 days.

(21) Appl. No.: 11/572,243

(22) PCT Filed: Jul. 19, 2005

(86) PCT No.: PCT/JP2005/013535
§ 371 (c)(1),
(2), (4) Date: Mar. 7, 2007

(87) PCT Pub. No.: WO2006/009270
PCT Pub. Date: Jan. 26, 2006

(65) Prior Publication Data
US 2007/0286575 A1    Dec. 13, 2007

(30) Foreign Application Priority Data

| Jul. 22, 2004 | (JP) | 2004-214918 |
| Oct. 5, 2004 | (JP) | 2004-293042 |
| Oct. 28, 2004 | (JP) | 2004-314663 |
| Feb. 16, 2005 | (JP) | 2005-039832 |
| Mar. 30, 2005 | (JP) | 2005-099409 |

(51) Int. Cl.
*H04N 9/80* (2006.01)
(52) U.S. Cl. ........................ 386/240; 386/248
(58) Field of Classification Search .................. 386/240, 386/248
See application file for complete search history.

(56) References Cited

U.S. PATENT DOCUMENTS

| 7,246,234 | B1 | 7/2007 | Ishiguro et al. |
| 7,522,726 | B2 | 4/2009 | Ishiguro et al. |
| 7,933,172 | B2 * | 4/2011 | Gargi et al. ............... 369/30.09 |
| 2003/0149886 | A1 | 8/2003 | Ito et al. |
| 2005/0018854 | A1 * | 1/2005 | Yamamoto et al. ........... 380/277 |
| 2006/0056624 | A1 | 3/2006 | Ishiguro et al. |

(Continued)

FOREIGN PATENT DOCUMENTS

EP    1553769    *    7/2005

(Continued)

OTHER PUBLICATIONS

"Digital Video Broadcasting (DVB) Multimedia Home Platform (MHP) Specification 1.1.1," ETSI Standards, European Telecommunications Standard Institute, Sophia-Antipo, FR, No. V121, Jun. 2003, pp. 1-1086.*

(Continued)

*Primary Examiner* — David E Harvey
(74) *Attorney, Agent, or Firm* — Greenblum & Bernstein, P.L.C.

(57) ABSTRACT

In the Local Storage (18), a plurality of files, merge management information which specifies a file out of the plurality of files to be used in combination with what is recorded on a Read-Only recording medium, and signature information used for judging the authenticity of the merge management information. The Virtual File System unit (38) judges the authenticity of the merge management information based on the signature information. In the case where the merge management information is judged to be authentic, the Virtual File System unit (38) generates package information which indicates a new file structure obtained by adding the file specified by the merge management information to the file structure of the Read-Only recording medium.

2 Claims, 59 Drawing Sheets

U.S. PATENT DOCUMENTS

| | | | |
|---|---|---|---|
| 2006/0098936 A1 | * | 5/2006 | Ikeda et al. |
| 2006/0140091 A1 | * | 6/2006 | Iwamoto et al. |
| 2006/0143666 A1 | * | 6/2006 | Okada et al. |
| 2006/0282612 A1 | * | 12/2006 | Ikeda et al. |

FOREIGN PATENT DOCUMENTS

| | | | |
|---|---|---|---|
| JP | 11-282741 | * | 10/1999 |
| JP | 2001-066986 | | 3/2001 |
| JP | 2003-228522 | | 8/2003 |
| WO | 96/11446 | * | 4/1996 |
| WO | 2004/025651 | * | 3/2004 |
| WO | 2004/030356 | | 4/2004 |
| WO | 2004/074976 | * | 9/2004 |
| WO | 2005/036540 | * | 4/2005 |
| WO | 2005/036547 | * | 4/2005 |
| WO | 2005/036555 | * | 4/2005 |
| WO | 2005/045840 | * | 5/2005 |

OTHER PUBLICATIONS

English language Abstract of JP 11-282741.*
U.S. Appl. No. 10/596,107 to Hashimoto et al., filed May 31, 2006.*
U.S. Appl. No. 10/596,109 to Tanaka et al., filed May 31, 2006.*
U.S. Appl. No. 10/597,614 to Tanaka et al., filed Aug. 1, 2006.*
U.S. Appl. No. 11/568,555 to Hashimoto et al., filed Nov. 1, 2006.*
U.S. Appl. No. 11/568,862 to Tanaka et al., filed Nov. 9, 2006.*
U.S. Appl. No. 11/574,777 to Oashi et al., filed Mar. 6, 2007.*

* cited by examiner

FIG.12

INFO ASSOCIATING
Java APPL. WITH STREAM ··· BD-JObject XXXXX.BOBJ

| REF. VALUE OF PL INFO ID |
|---|
| APPL. MGMT TABLE (SHOWS Java APPL. WHOSE LIFE CYCLE IS Title DEFINED BY BD-J Object) |

FIG.17

| DISC ID | FILE PATH | HASH VALUE |
|---|---|---|
| disc#1 | ROOT/organization#1/disc#1/00002.MPLS | xxxx |
| | ... | ... |

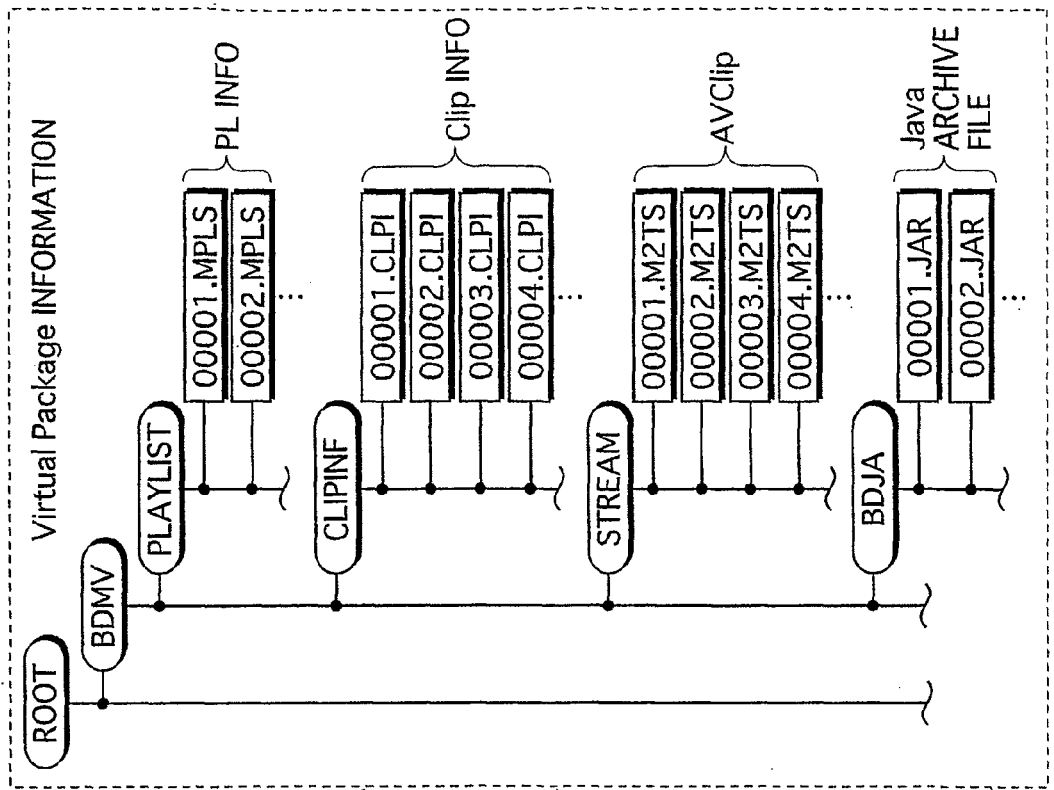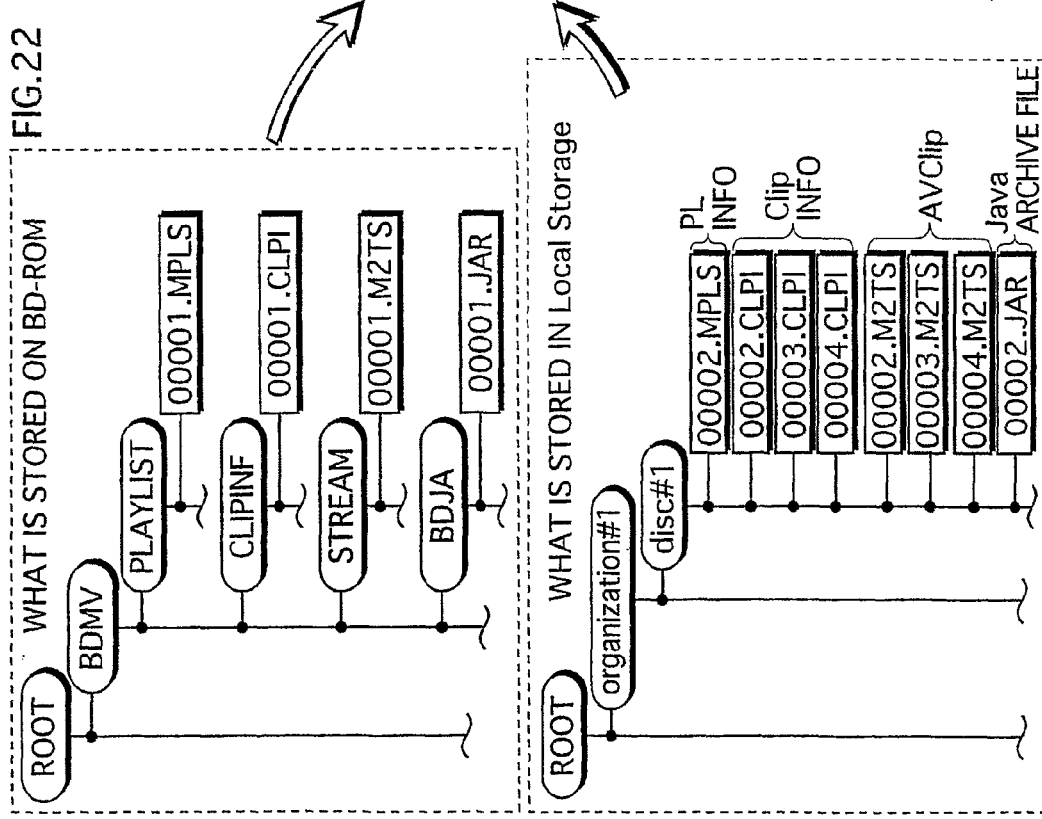
FIG.22

FIG. 35

| disc ID | MERGE POINT |
|---|---|
| disc#1 | ROOT/organization#1/disc#1/conts ID#1 |
| ... | ... |

FIG. 42

| disc ID | MERGE POINT | SIGNATURE |
|---|---|---|
| disc#1 | ROOT/organization#1/disc#1/conts ID#1 | BDMV/INDEX.BDMV — xxx ~601<br>BDMV/PLAYLIST/00002.MPLS — kkk ~602<br>BDMV/CLIPINF/00002.CLPI — bbb ~603<br>BDMV/STREAM/00002.M2TS — ~606<br>~607 |
| ... | ... | ... |

PLAYBACK APPARATUS AND PLAYBACK METHOD

TECHNICAL FIELD

The present invention relates to a playback technique for a "Virtual Package".

BACKGROUND ART

A "Virtual Package" is a technique (i) for generating package information that integrally indicates what is recorded on a Read-Only recording medium such as a BD-ROM and what is recorded on a readable/writable recording medium such as a hard disk and (ii) for playing back or executing digital streams and application programs (hereafter, simply referred to as applications) that are recorded on these recording mediums as if they were recorded in one package that is virtual.

According to this technique, by updating the data recorded on the rewritable hard disk, it is possible to change the contents of the production as an entire Virtual Package even after the BD-ROM is distributed. For example, even after a BD-ROM having a movie production itself recorded is distributed, a provider of the movie production is able to advertise most recent movie productions to users no matter when the BD-ROM is distributed, by supplying movie-trailer digital streams for other unreleased movie productions via a network.

Prior Art related to Virtual Packages is published in the Patent Document shown below:
Patent Document 1
International Publication WO 2004/030356 A1 Publication

DISCLOSURE OF THE INVENTION

Problems to be Solved by the Invention

The fact that the hard disc is rewritable implies that it is possible to tamper with the data recorded on the hard disk and there is a possibility that providers and users may suffer from disadvantages. For example, such disadvantages include that digital streams recorded on a BD-ROM may be played back in a state that is against the provider's intention so that the value of the production thereby may be degraded, and that an illegitimate application recorded on the hard disk is run so that the playback apparatus may thereby experience a malfunction.

The present invention aims to provide a playback apparatus that is able to prevent illegitimate data recorded on a rewritable recording medium from being executed or played back in combination with data recorded on a Read-Only recording medium.

Means to Solve the Problems

In order to achieve the aforementioned aim, the present invention provides a playback apparatus that plays back an application program and a digital stream in conjunction with each other, the playback apparatus comprising: a reading unit operable to read a file recorded on a read-only recording medium mounted to the playback apparatus; a storing unit storing therein (i) a plurality of files, (ii) merge management information which specifies a file out of the plurality of files that is to be used in combination with what is recorded on the read-only recording medium, and (iii) signature information which is used for judging authenticity of the merge management information; a judgment unit operable to judge the authenticity of the merge management information based on the signature information; a package management unit operable to (a) in a case where the merge management information is judged to be authentic, generate package information that indicates a new file structure obtained by adding the file specified by the merge management information to a file structure of the read-only recording medium and (b) in a case where the merge management information is judged to be inauthentic, not generate the package information that indicates the new file structure; a playback unit operable to play back the digital stream either recorded on the read-only recording medium or stored in the storing unit based on the package information generated by the package management unit; and an execution unit operable to execute the application program either recorded on the read-only recording medium or stored in the storing unit based on the package information generated by the package management unit.

Effects of the Invention

With the arrangement above, the playback apparatus according to the present invention verifies authenticity of merge management information based on signature information and in the case where the merge management information cannot be confirmed to be authentic, the playback apparatus inhibits generation of package information from files stored in the storing unit.

With this arrangement, it is possible to prevent the data recorded on a Read-Only recording medium from being executed or played back in combination with illegitimate data.

BRIEF DESCRIPTION OF THE DRAWINGS

FIG. 12 shows an internal structure of a BD-J object;
FIG. 17 shows an internal structure of a merge management information file.

FIG. 22 shows an exemplary construction of Virtual Package information to be performed by a Virtual File System unit 38;

FIG. 35 is an example of a Virtual Package management table;

FIG. 42 shows an example of a Virtual Package management table according to the fifth embodiment;

BEST MODE FOR CARRYING OUT THE INVENTION

First Embodiment

Figure 1:
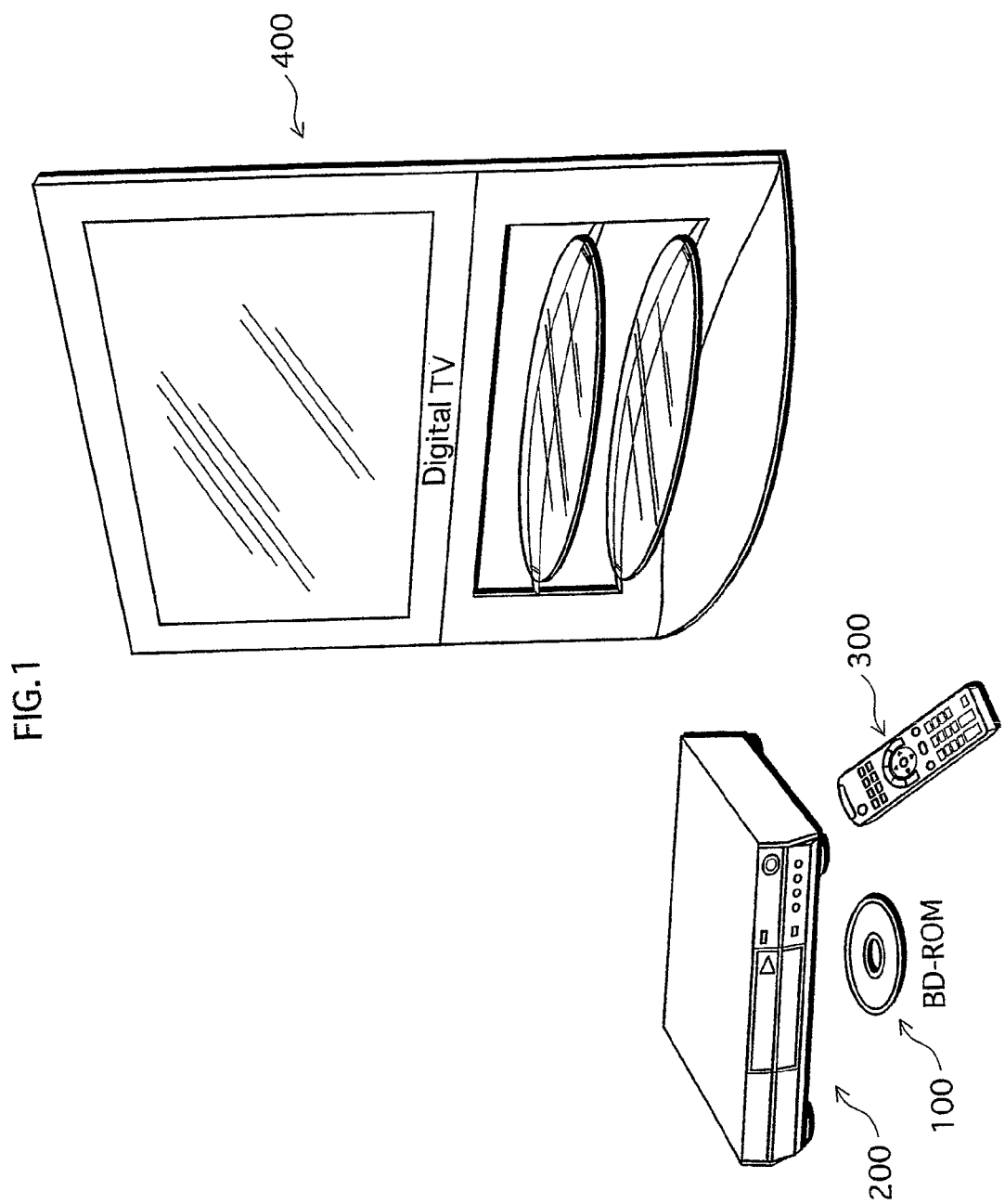
FIG. 1 shows a form of use of a playback apparatus according to the present invention.

The following describes embodiments of playback apparatuses pertaining to the present invention. Firstly, a form of use out of the forms of the implementation of a playback apparatus pertaining to the present invention is described. FIG. 1 shows a form of use of a playback apparatus pertaining to the present invention. In FIG. 1, a playback apparatus pertaining to the present invention is a playback apparatus 200. The playback apparatus 200 is submitted for use in supplying movie works in a home theater system composed of the playback apparatus 200, a remote controller 300, and a television 400.

Figure 2:
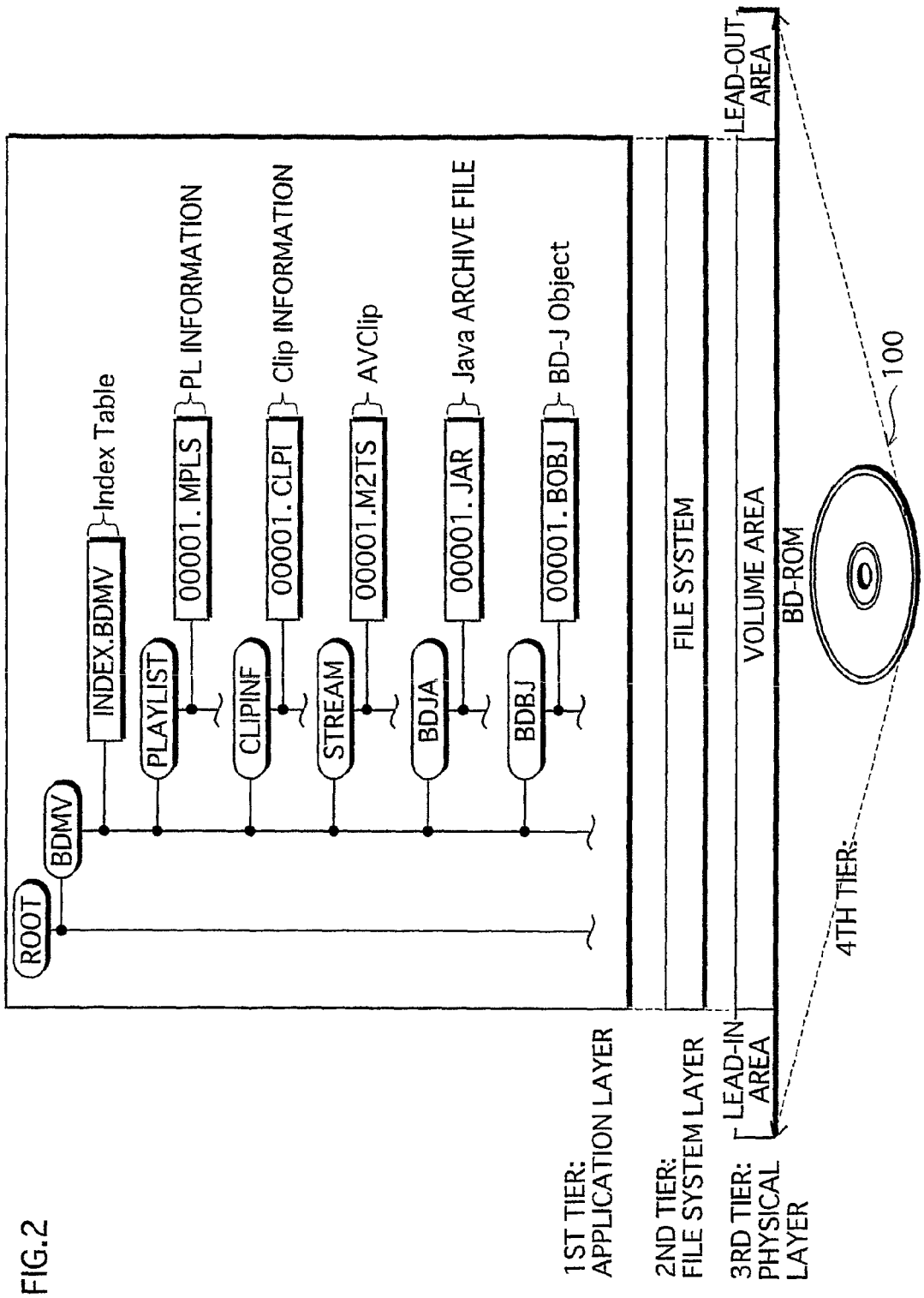
FIG. 2 shows a file-directory structure on the BD-ROM.

This completes description of a form of use of a playback apparatus pertaining to the present invention. Described next is a recording medium targeted for playback by a playback apparatus pertaining to the present invention. The recording medium played by a playback apparatus pertaining to the present invention is a BD-ROM. FIG. 2 shows an internal structure of the BD-ROM.

The BD-ROM is shown at the fourth tier in FIG. 2, while a track on the BD-ROM is shown at the third tier. The track depicted in FIG. 2 results from a track spiraling from the inner circumference to the outer circumference of the BD-ROM having been drawn out to the sides. This track consists of a lead-in area, a volume area, and a lead-out area. The volume area in FIG. 2 has a layered structure made up of a physical layer, a file system layer, and an application layer. Expressing the application format of the BD-ROM using a directory structure gives the first tier in FIG. 2. A BDMV directory is placed below a ROOT directory at the first tier in the BD-ROM.

Under the BDMV directory exist an INDEX.BDMV file and five subdirectories known as a PLAYLIST directory, a CLIPINF directory, a STREAM directory, a BDJA directory, and a BOBJ directory.

The STREAM directory stores a file forming the main digital stream, the extension "M2TS" being assigned to this file (00001.M2TS).

In the PLAYLIST directory exists a file (00001.MPLS) with the extension "MPLS" assigned thereto.

In the CLIPNF directory exists a file (00001.CLPI) with the extension "CLPI".

In the BDJA directory exists a file (00001.JAR) with the extension "JAR".

In the BOBJ directory exists a file (00001.BOBJ) with the extension "BOBJ".

These files are described next.

<AVClips>

Figure 3:
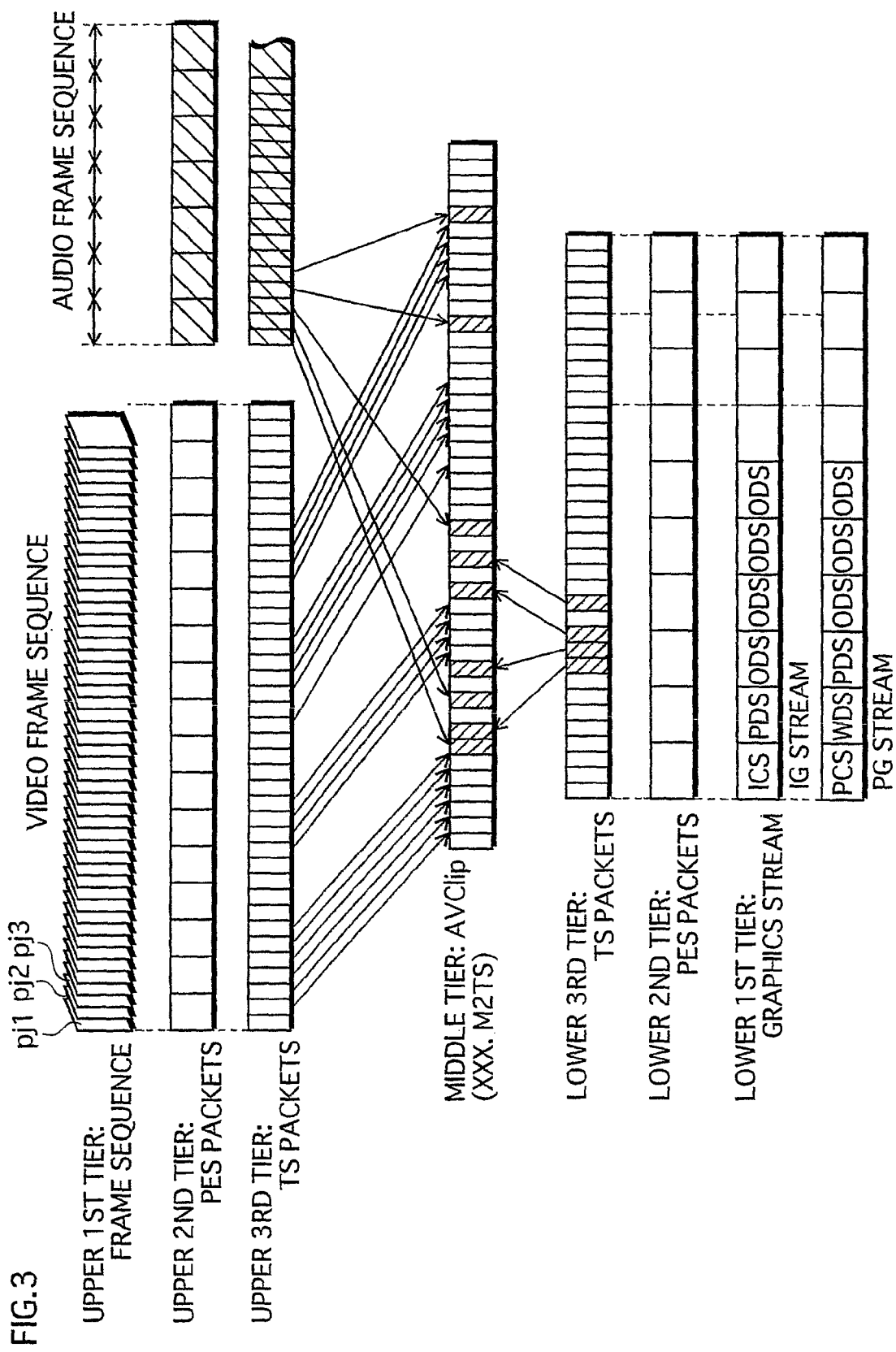
FIG. 3 schematically shows how an AV Clip is structured.

The Files with the extension "M2TS" are described firstly. FIG. 3 systematically shows how the file with the extension "M2TS" is structured. Each of the files with the extension "M2TS" (00001.M2TS, 00002.M2TS, 00003.M2TS . . . ) stores an AVClip. The AVClip (middle tier) is constituted by multiplexing TS packets resulting from the conversion of a video stream composed of a plurality of video frames (pictures pj1, pj2, pj3) and an audio stream composed of a plurality of audio frames (the upper 1st tier) firstly to PES packets (the upper 2nd tier) and then to TS packets (the upper 3rd tier) and the conversion of a subtitle presentation graphics stream (PG stream at the lower 1st tier) and a dialogue interactive graphics stream (IG stream at the lower 1st tier) to TS packets (the lower 3rd tier) in the same manner.

Apart from the AVClip obtained through multiplexing as shown in FIG. 3, there also exist AVClips that do not result from multiplexing. These are called SubClips, and include AVClips constituting an audio stream, a graphics stream, or a text subtitle stream (TextSTStream) etc.

<Clip Information>

The file with the extension "CLPI" (00001.CLPI) is a piece of clip information corresponding to an AVClip. Clip information, being management information, contains an EP_map showing the head location of a GOP and information such as the encoding format, frame rate, bit rate and resolution etc. of streams in the AVClip.

<PlayList Information>

Figure 4:
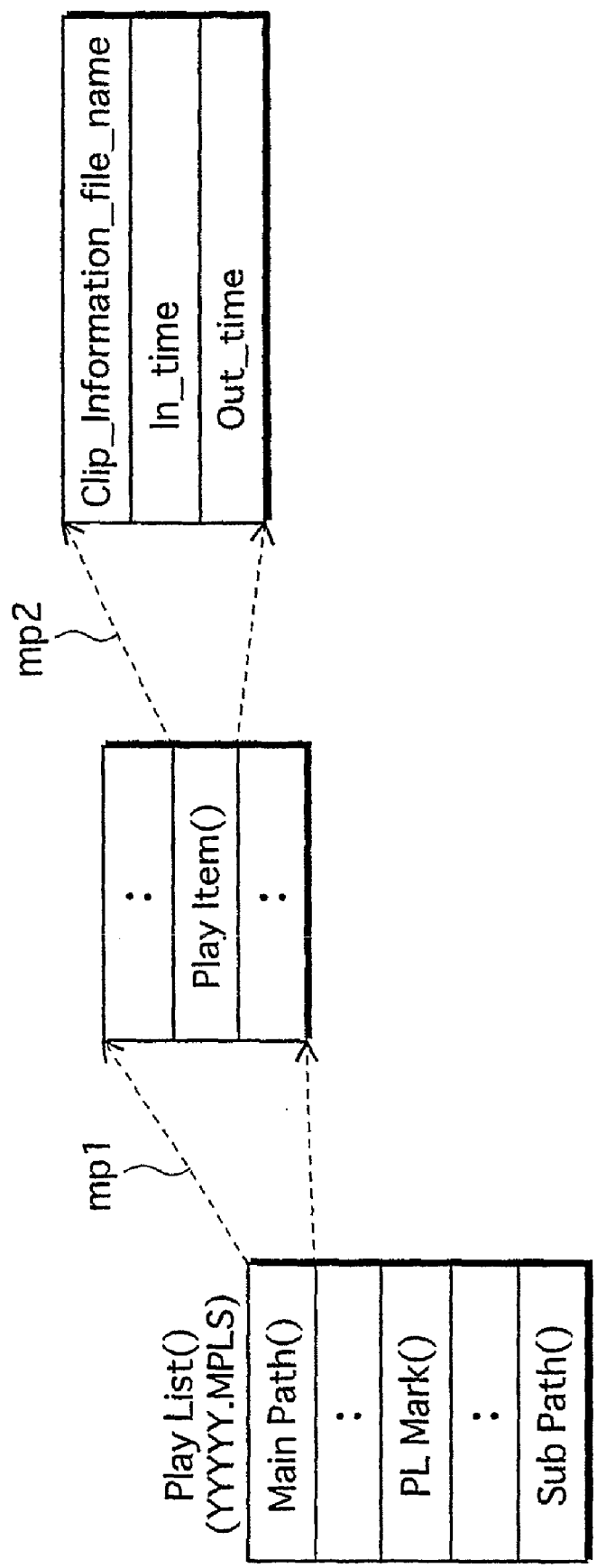
FIG. 4 shows the structure of PL information.

The file with the extension "MPLS" (00001.MPLS) stores PlayList (PL) information. PL information defines a PlayList by referring to AVClips. FIG. 4 shows the structure of PL information, which, as shown on left side of the diagram, is constituted from MainPath information, PLMark information, and SubPath information.

Figure 5:
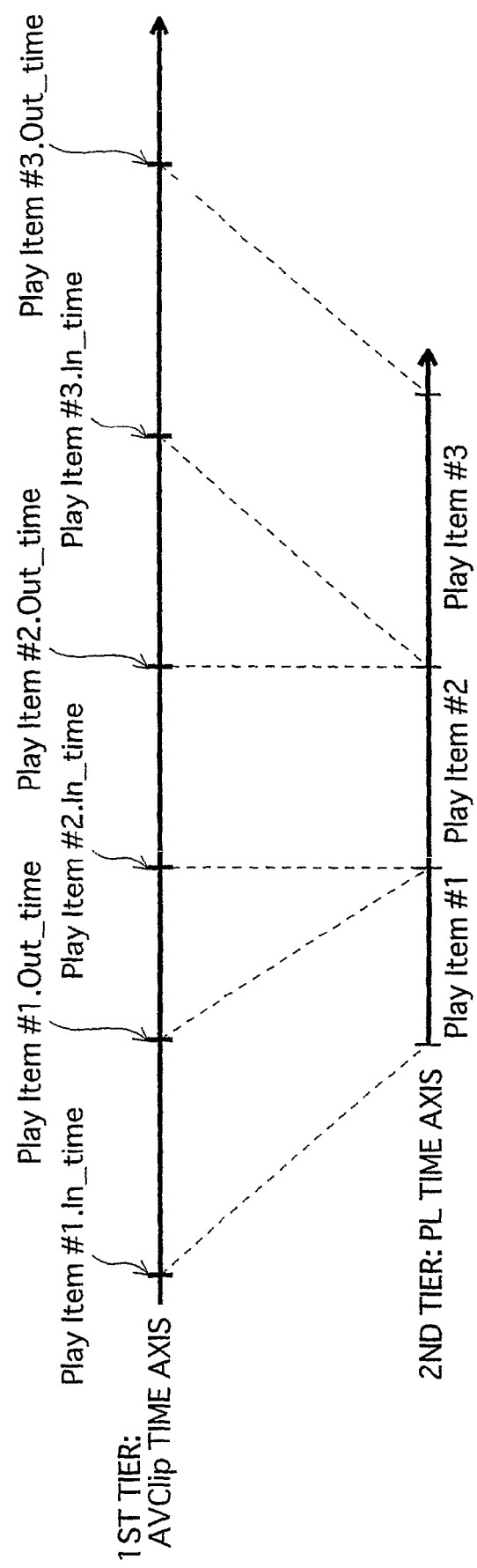
FIG. 5 shows the relation between an AVClip time axis and a PL time axis.

MainPath information "MainPath( )" is composed of PlayItem information "PlayItem( )", as indicated by the arrows mp1. A PlayItem is a playback interval defined by specifying an In_time and an Out_time on one or more AVClip time axes. A PlayList (PL) composed of a plurality of playback intervals is defined by the placement of plural pieces of PlayItem information. The arrows mp2 in FIG. 4 shows a close up of the internal structure of PlayItem information. As shown in FIG. 4, PlayItem information is composed of an In_time, an Out_time, and a Clip_Information_file_name showing a corresponding AVClip. FIG. 5 shows the relation between an AVClip and a PL. The 1st tier shows the time axis of the AVClip, while the 2nd tier shows the time axis of the PL. The PL information includes three pieces of PlayItem information (PlayItems #1-#3), with three playback intervals being defined by the In_times and Out_times of PlayItems #1, #2 and #3. A different time axis to the AVClip is defined when these playback intervals are lined up. This is the PL time axis shown at the 2nd tier. Defining a different time axis to the AVClip is thus enabled by the definitions in the PlayItem information.

Figure 6:
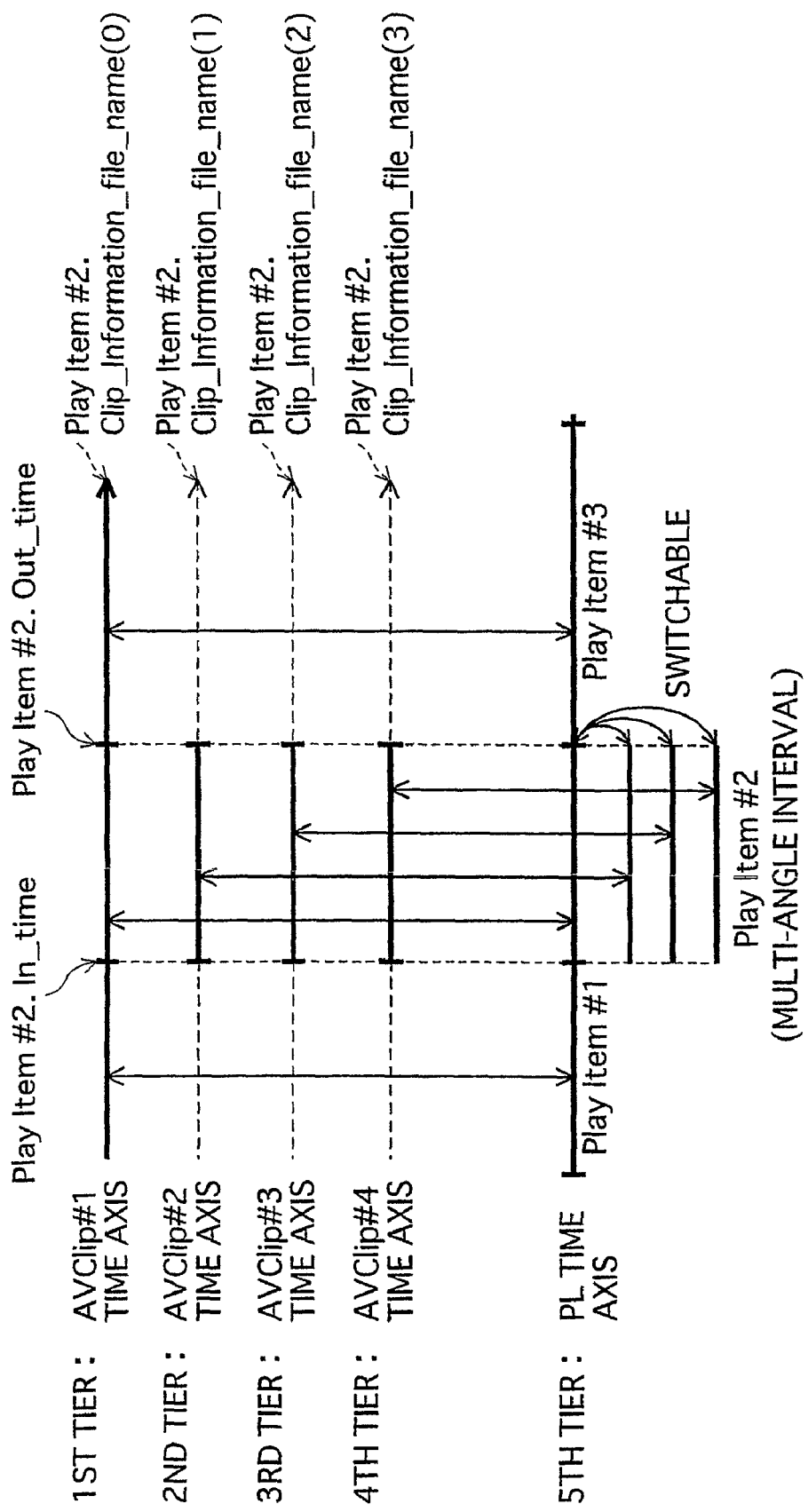
FIG. 6 shows batch specification using four Clip_Information_file_names.

As a rule, one AVClip is specified at any one time, though batch specification of a plurality of AVClips is also possible. Batch specification of AVClips is performed using Clip_Information_file_names in PlayItem information. FIG. 6 shows the batch specification of AVClips using four Clip_Information_file_names. The 1st to 4th tiers in the diagram show four AVClip time axes (time axes of AVClips #1-#4), while the 5th tier show the PL time axis. Four time axes are specified with these four Clip_Information_file_names included in PlayItem information. This allows four alternatively playable playback intervals to be defined by In_times and Out_times. As a result, an interval composed of plural piece of switchable angle video (so-called multi-angle intervals) is defined on the PL time axis.

Figure 7:
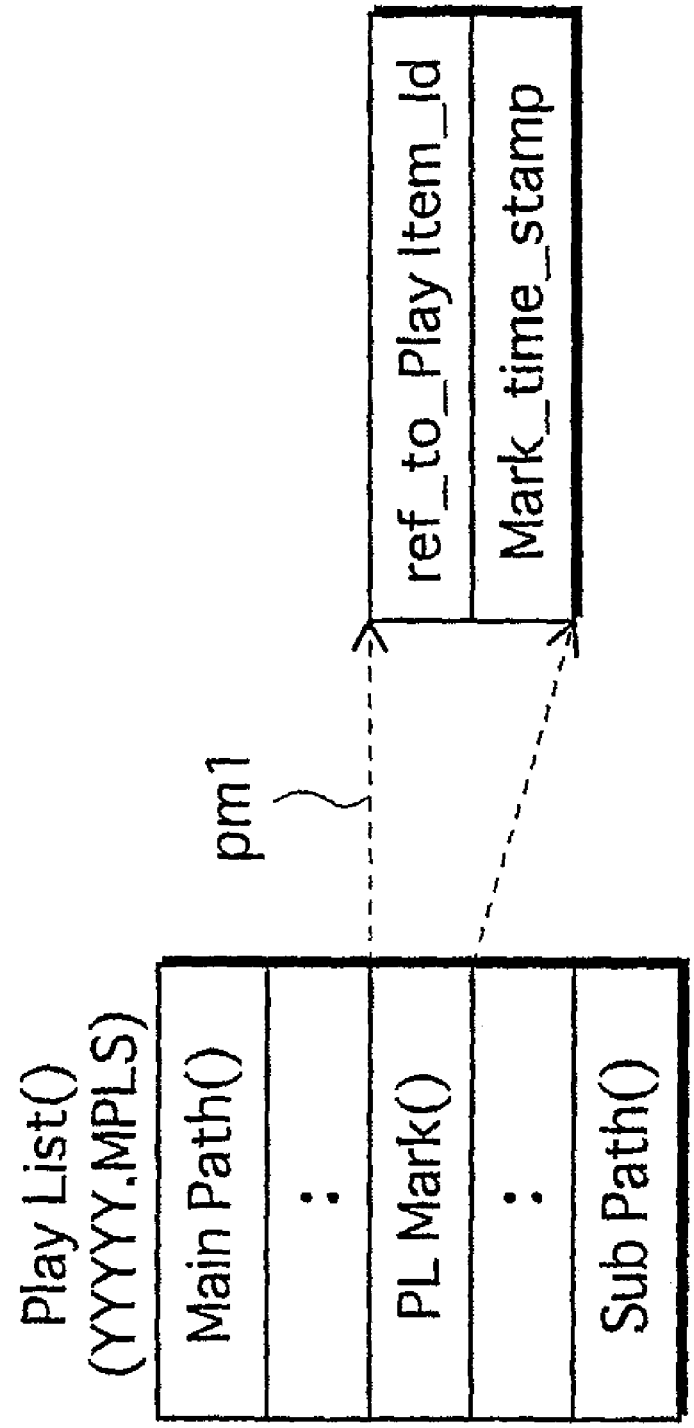
FIG. 7 shows an internal structure of PLmark information.
Figure 8:
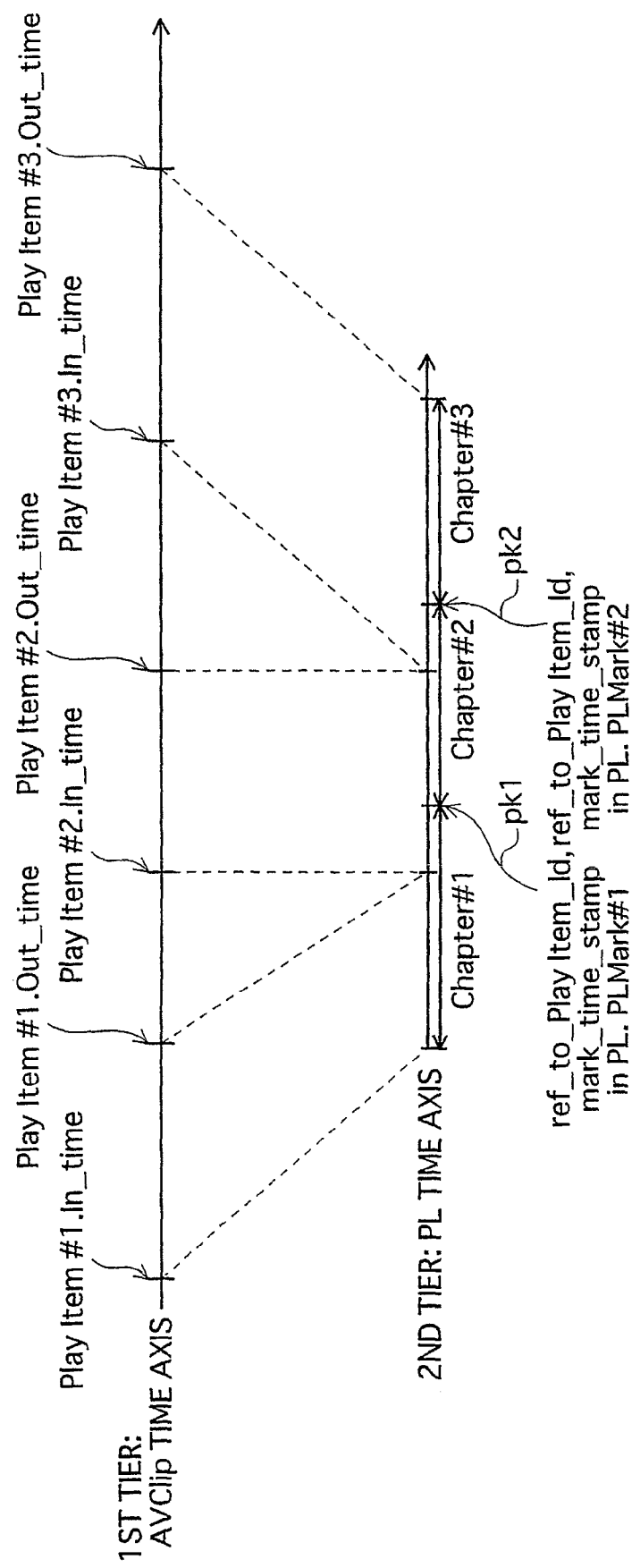
FIG. 8 shows chapter definitions using PLmarks.

PLmark information "PLmark( )" specifies an arbitrary interval on a PL time axis as a chapter. FIG. 7 shows the internal structure of PLmark information, which includes a ref_to_PlayItem_Id and a Mark_time_stamp, as indicated by the arrows pm1 in FIG. 7. FIG. 8 shows the definition of chapters using PLmarks. The 1st tier in FIG. 8 shows the AVClip time axis, while the 2nd tier shows the PL time axis. The arrows pk1 and pk2 in FIG. 8 show the specification of a PlayItem (ref_to_PlayItem_Id) and a point in time (Mark_time_stamp) in PLmarks. Three chapters (Chapters #1-#3) are defined on the PL time axis as a result of these specifications. This completes description of PLmarks. SubPath information is described next.

Figure 9:
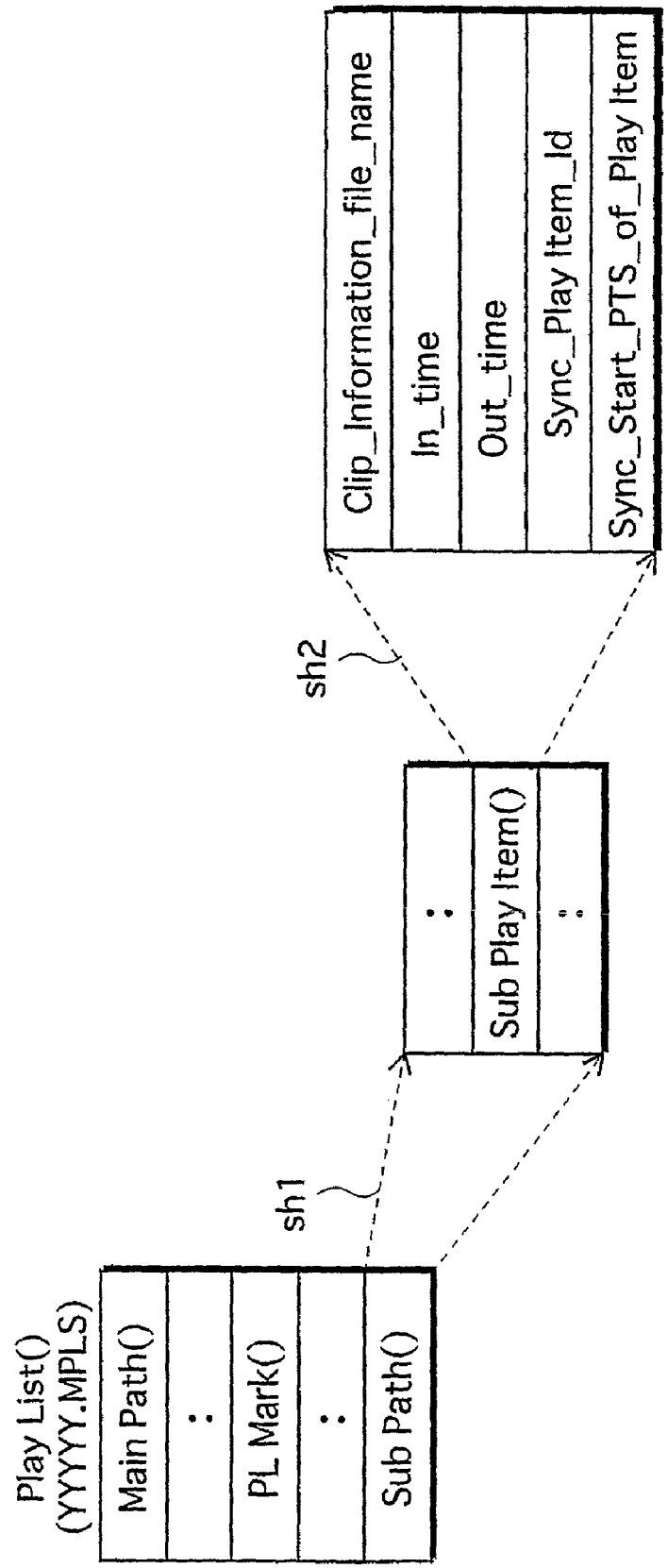
FIG. 9 shows an internal structure of SubPath information.

SubPath information "SubPath( )" defines one or more playback intervals by specifying an In_time and an Out_time on a SubClip time axis, and has the internal structure shown in FIG. 9. SubPath information is composed of SubPlayItem information "SubPlayItem( )" as indicated by the arrows sh1. In the close up marked by the arrows sh2, SubPlayItem information is composed of a Clip_Information_file_name, an In_time, an Out_time, a Sync_PlayItem_Id, and a Sync_Start_PTS_of_PlayItem. In_times and Out_times on the SubClip time axis are specified using the Clip_Information_file_name, In_time, and Out_time. The Sync_PlayItem_Id and the Sync_Start_Pts_of_PlayItem are for synchronizing playback intervals on the SubClip time axis with the PL time axis. This allows processing on both the SubClip time axis and the PL time axis to proceed in sync with one another.

Figure 10:
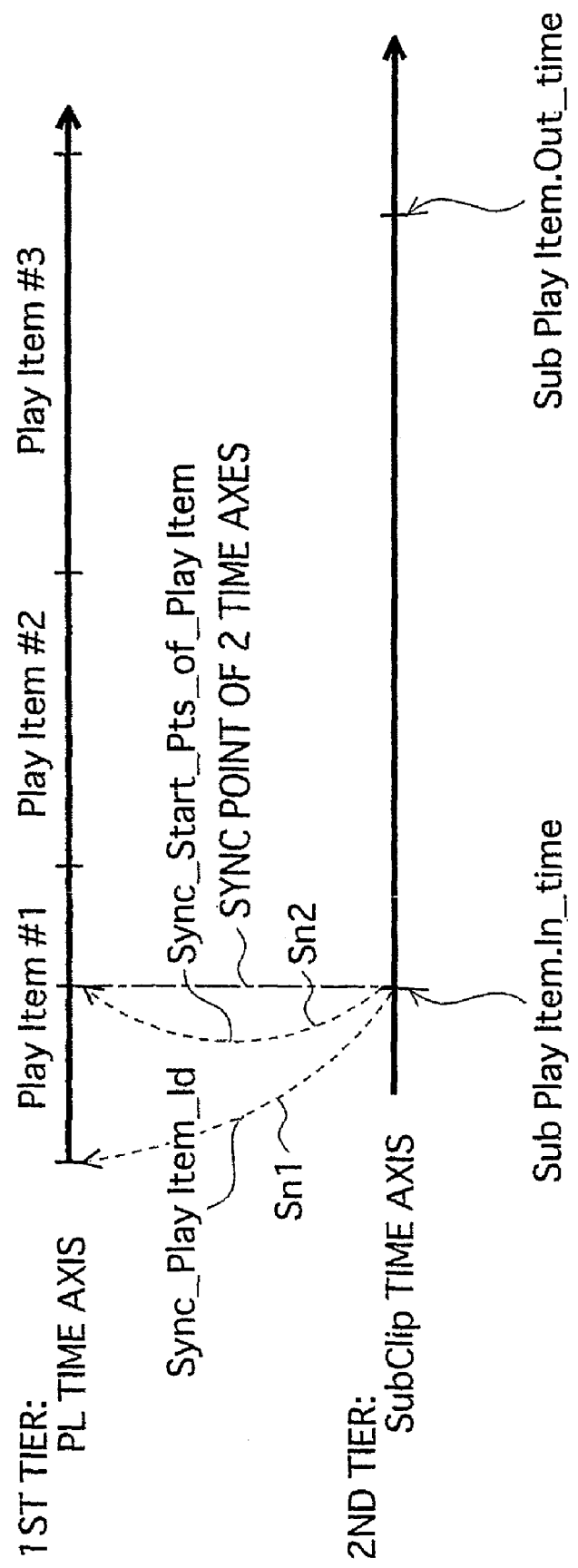
FIG. 10 shows sync specification and playback interval definitions on a SubPlayItem time axis.

FIG. 10 shows sync specification and the definition of playback intervals on the SubClip time axis. The 1st tier in FIG. 10 shows the PL time axis, while the 2nd tier shows the SubClip time axis. The SubPlayItem.In_time and SubPlayItem.Out_time in FIG. 10 show respectively the start and end of a playback interval. Thus it is apparent that a playback interval is also defined on the SubClip time axis. The Sync_PlayItem_Id marked by the arrow Sn1 shows the sync specification of a PlayItem, while the Sync_Start_Pts_of_PlayItem marked by the arrow Sn2 shows the specification of a point in time in the PlayItem on the PL time axis.

A feature of PL information in BD-ROM is that it makes possible the definition of multi-angle intervals that enable AVClips to be switched and sync intervals that enable AVClips and SubClips to be synchronized. Clip information and PL information are classified as "static scenarios".

The following describes "dynamic scenarios". Here, "dynamic" refers to the fact that the content of playback controls changes due to user key events and status changes in playback apparatus 200 etc. With BD-ROM, playback controls can be described using the same description as Java applications. That is, with BD-ROM, Java applications act as dynamic scenarios.

<Java Applications>

The following described Java applications. A Java application is composed of a one or more xlet programs loaded in a heap area (also called working memory) of a virtual machine. An application is constituted from the xlet programs loaded in working memory as well as data. This completes description of the Java application structure.

The substance of a Java application is the Java archive files (00001.jar, 00002.jar) stored in the BDJA directory under the BDMV directory in FIG. 2. Java archive files are described below with reference to FIG. 11.

<Java Archive Files>

Figure 11A:
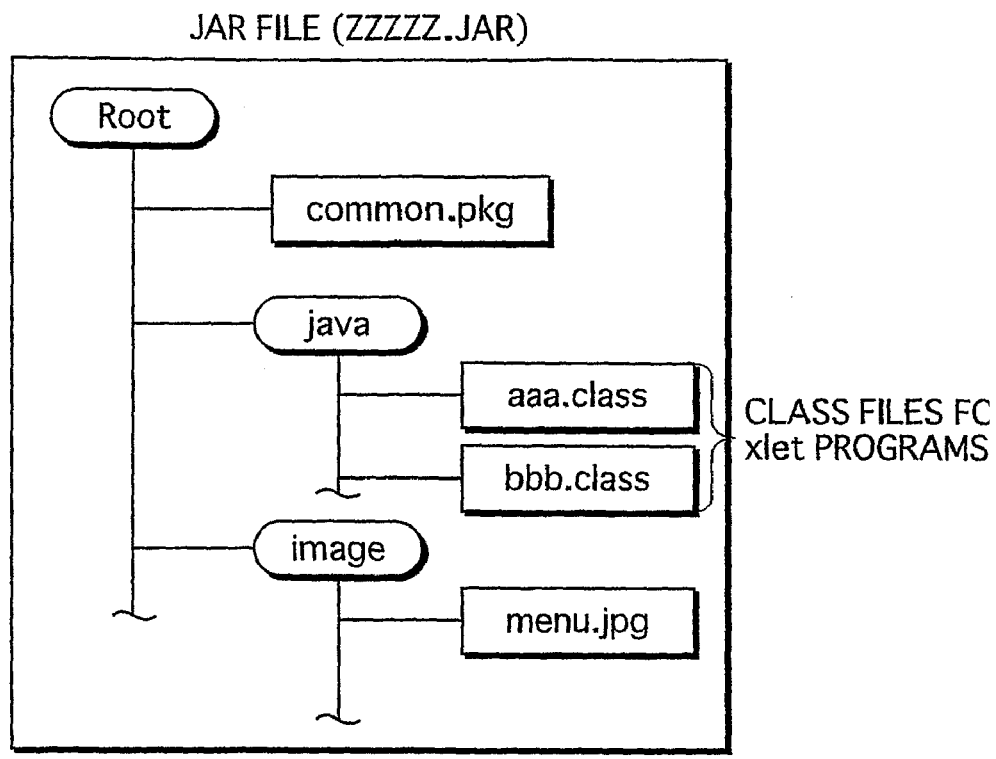
FIG. 11A shows program and data housed in Java archive files.

The Java archive file (00001.JAR in FIG. 9) is a collection of one or more class files and data files etc. FIG. 11A shows programs and data collected in the archive file. The data in FIG. 11A is a plurality of files collected by a Java archiver and arranged into the directory structure shown within the frame. This directory structure consists of a Root directory, a Java directory, and an image directory, with a common.pkg file being placed in the Root directory, class files (aaa.class, bbb.class) being placed in the Java directory, and a menu .jpg file being placed in the image directory. The Java archive file is the result of the Java archiver having collected these files together. The class files and data are expanded when read from BD-ROM to a cache, and treated in the cache as a plurality of files existing in directories. The five-digit numerical value "zzzzz" in the filename of the Java archive file shows an ID of the Java archive file, the BD-J object refers to the Java archive file using such a value. By referring to this numerical value in the filename when the Java archive file has been read to the cache, it is possible to extract data as well as programs constituting arbitrary Java applications.

The class files (aaa.class, bbb.class) in FIG. 11A correspond to the above xlet programs. Playback procedures in an operating mode (BD-J mode) supported by the Java operational environment are prescribed using xlet programs corresponding to the instances of these class files. An xlet program is a Java program capable of using Java media framework (JMF) interface, and performs PlayList playback processing based on key events in accordance with JMF etc.

Furthermore, xlet programs can also execute procedures for accessing WWW sites and downloading contents. This enables playback of original works created by mixing downloaded contents with playlists.

Figure 11B:
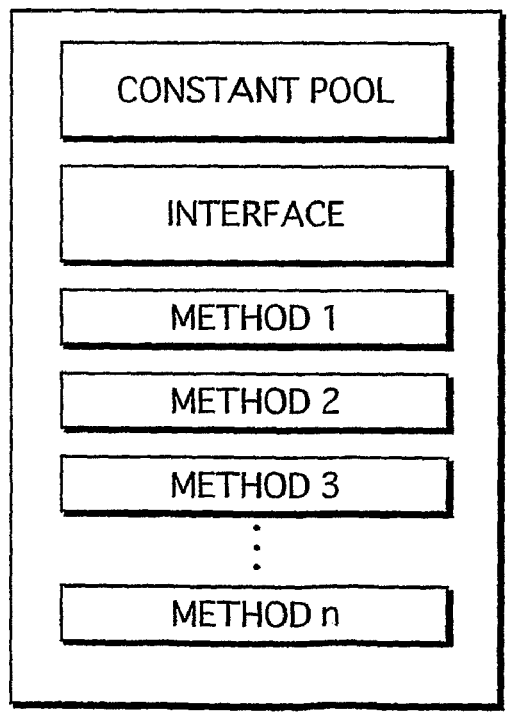
FIG. 11B shows an internal structure of a class file.

The class file of an xlet program is described next. FIG. 11B shows the internal structure of a class file. As shown in FIG. 11B, this class file, similar to a normal class file, is composed of a constant pool, an interface, and methods 1, 2, 3 . . . n. The methods in a class file include those (EventListeners) that are triggered by preregistered key events and those for calling a function API (application program interface) in playback apparatus 200. Computation procedures and the like in these methods are described by employing local variables allocated to a given method and arguments occurring when the method is called. This completes description of Java archive files.

The file with the extension "BOBJ" is described next. This file stores a BD-J object. A BD-J object is information defining a Title by associating an AVClip sequence defined in PlayList information with applications. FIG. 12 shows the internal structure of a BD-J object. The BD-J object shows "an application management table" and "a PlayList information reference value". The application management table shows each application whose life cycle is a Title by enumerating the application identifier (the application ID) and the IDs of the archive files that constitute the application. In other words, one application is composed of one or more Java archive files. The "PlayList information reference value" shows PlayList information to be played back simultaneously when the title is started.

This completes description of the file with the extension "BOBJ".

It should be noted that the description of BD-J objects and application management tables is published in the international publication listed below, which should be referred to for further details:

International Publication WO 2005/045840

The INDEX.BDMV file is described next.

INDEX.BDMV is management information for an entire BD-ROM and includes information such as an organization ID which is an identifier identifying a provider of a movie production, and a disc ID which is an identifier assigned to each of BD-ROMs provided by a provider. When a disc is inserted into a playback apparatus, INDEX.BDMV is read at first, and this way the playback apparatus recognizes the disc in one-to-one correspondence. In addition, INDEX.BDMV includes a table that shows a plurality of playable titles in BD-ROM and BD-J objects prescribing individual titles, in correspondence with one another. The following describes the types of Titles recordable to BD-ROM, which include a FirstPlayTitle, a Top_menuTitle, and Titles #1, #2, and #3.

The FirstPlayTitle is charged with playing a dynamic trademark of a BD-ROM when the BD-ROM is loaded before doing anything else. Thus, the FirstPlayTitle realizes the practice of playing a dynamic trademark symbolizing the creator and/or distributor of a movie work when a BD-ROM is loaded.

The Top_menuTitle is composed of AVClips and applications for playing the menu positioned at the very top of the menu hierarchy in a BD-ROM.

The Titles #1, #2 and #3 are Titles that correspond to general movie works. INDEX.BDMV is thus the file showing the correspondence of the Titles such as FirstPlayTitle, Top_menuTitle, and Titles #1 to #3 with individual BD-J objects.

Figure 13:
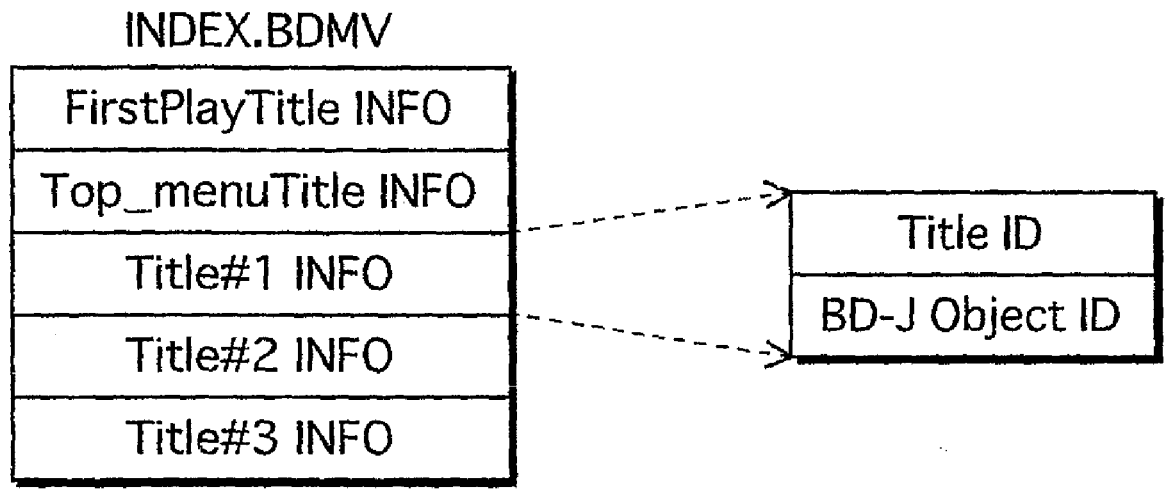
FIG. 13 shows an internal structure of INDEX.BDMV.

FIG. 13 shows the internal structure of INDEX.BDMV. As shown in the drawing, INDEX.BDMV is made up of pieces of Title information such as "FirstPlayTitle information", "Top_menuTitle information", "Title #1 information", "Title #2 information", and "Title #3 information". Each piece of Title information shows a correspondence between a Title number and a BD-J object prescribing the Title. With the use of such a piece of Title information, it is possible to specify a BD-J object that defines a Title, and with the use of such a BD-J object, it is possible to lead to PlayList information and an application to be operated in conjunction with one another. Thus completes description of INDEX.BDMV.

A detailed description of INDEX.BDMV is published in the international application listed below, which should be referred to for further details:

International Publication WO 2004-025651

BD-ROM is not the only recording media targeted by a playback apparatus pertaining to the present invention. A magnetic recording apparatus (Local Storage) such as a hard disk built in a playback apparatus is also targeted by the playback apparatus of the present invention. The following describes data recorded on such a Local Storage.

Figure 14:
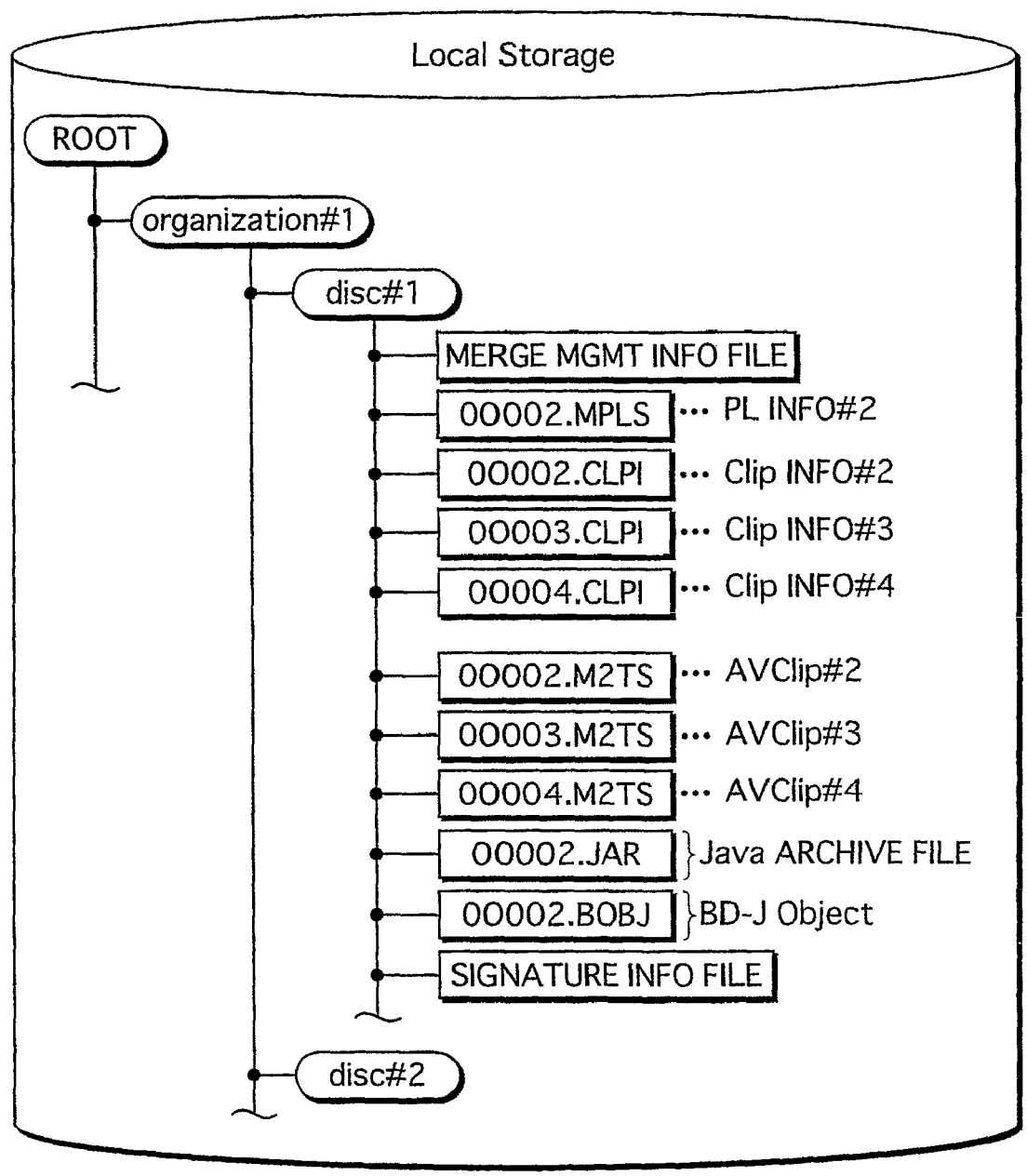
FIG. 14 shows a directory structure in the Local Storage.

FIG. 14 shows a directory structure in the Local Storage.

In this directory structure, a subdirectory "organization#1" is located under a ROOT directory, and under this are the subdirectories "disc#1" and "disc#2". The "organization#1" directory is allocated to a specific provider of movie works. The "disc#1" and "disc#2" directories are allocated respectively to BD-ROMs provided by the provider. The values of the organization ID and the disc ID indicated in the INDEX. BDMV of each BD-ROM are used for the directory names.

Providing directories corresponding to the BD-ROMs in directories corresponding to specific providers allows downloaded data relating to individual BD-ROMs to be stored separately. Under these subdirectories are stored PlayList information, Clip information, and AVClips, similar to what is stored on BD-ROM. There also additionally exist a Java archive file, a merge management information file, and a signature information file.

In comparison to PlayList information on a BD-ROM, which refers only to AVClips on the BD-ROM, PlayList information in the Local Storage (the PlayList information newly added in a Virtual Package) refers to both AVClips on BD-ROM and AVClips in the Local Storage 18.

Here, description is provided for a case where the PlayList information in the Local Storage is constituted from four pieces of PlayItem information (PlayItem information #1-#4). This PlayList information can, in the case of the head piece (PlayItem information #1) referring to Clip information on the BD-ROM and the remaining three pieces (PlayItem information #2-#4) referring to Clip information in the Local Storage, define a single stream sequence from the AVClips on the BD-ROM and the AVClips in the Local Storage, as shown in FIG. 15.

Figure 15:
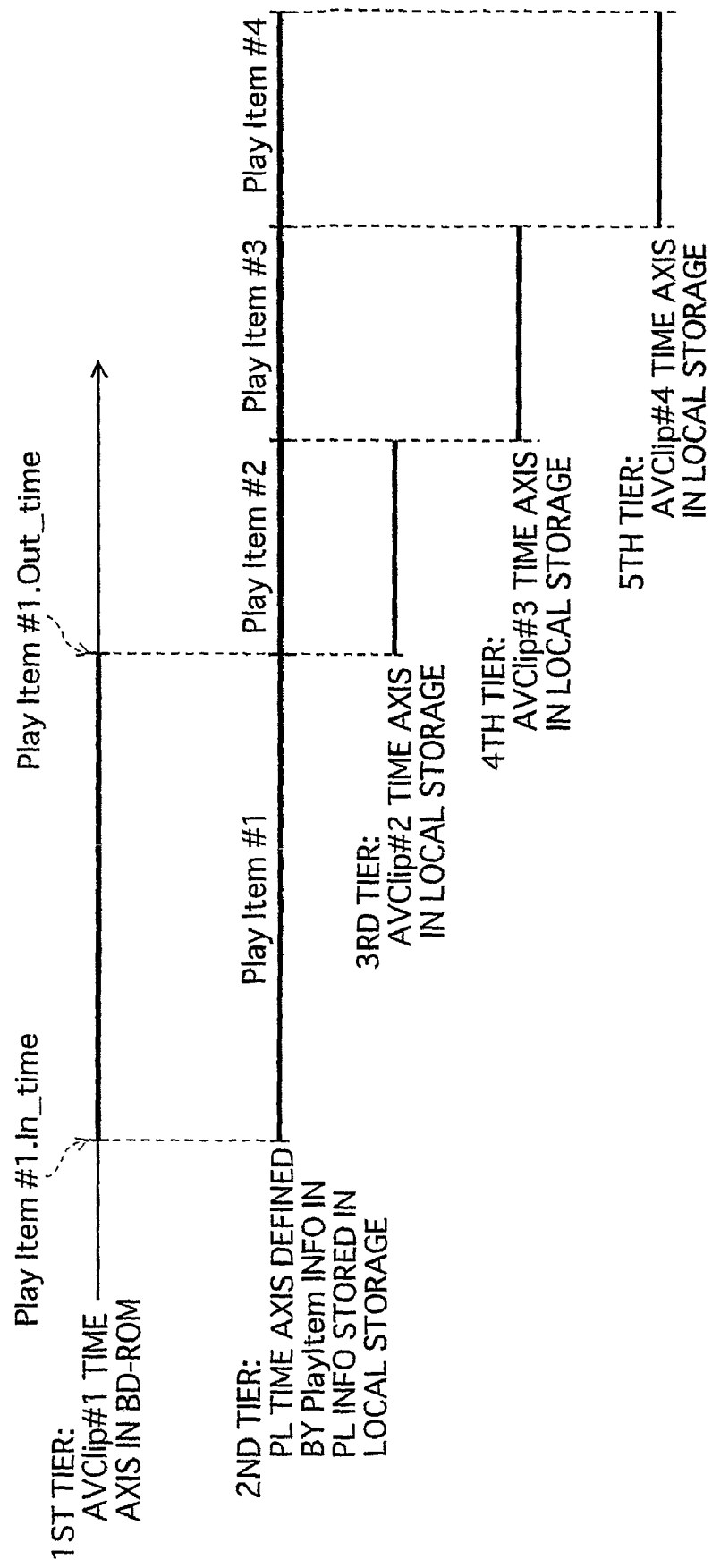
FIG. 15 shows the kinds of PlayList playback time axes defined by PL information stored in the Local Storage.

FIG. 15 shows the kinds of PlayList playback time axes defined by PL information stored in the Local Storage. The 1st tier shows the playback time axis of an AVClip stored on BD-ROM, while the 2nd tier shows the playback time axis of a PlayList defined in PL information stored in the Local Storage. The $3^{rd}$ tier shows the playback time axis of the AVClip #3 stored in the Local Storage. The 4th tier shows the playback time axis of the AVClip #4 stored in the Local Storage. The 5th tier shows the playback time axis of the AVClip #5 stored in the Local Storage.

Out of the PlayItems in the PlayList information, in the case of PlayItem information #2, #3 and #4 specifying AVClips #2, #3 and #4 as playback intervals, the PlayList information is able to prescribe both AVClips on the BD-ROM and AVClips in the Local Storage 18 as a single stream sequence.

Figure 16A:
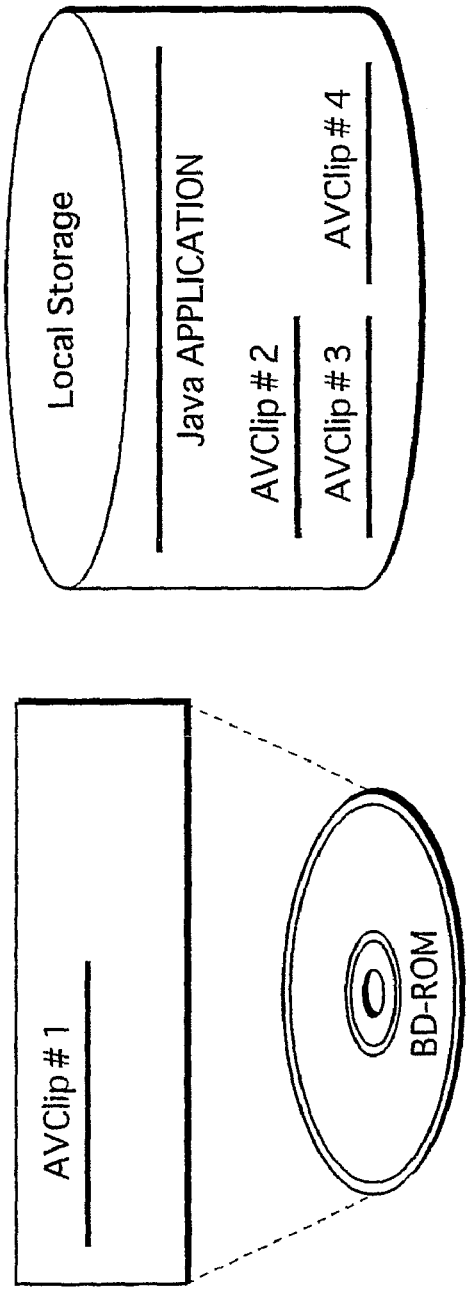
FIG. 16A shows an application and AVClips stored on BD-ROM and in the Local Storage.
Figure 16B:
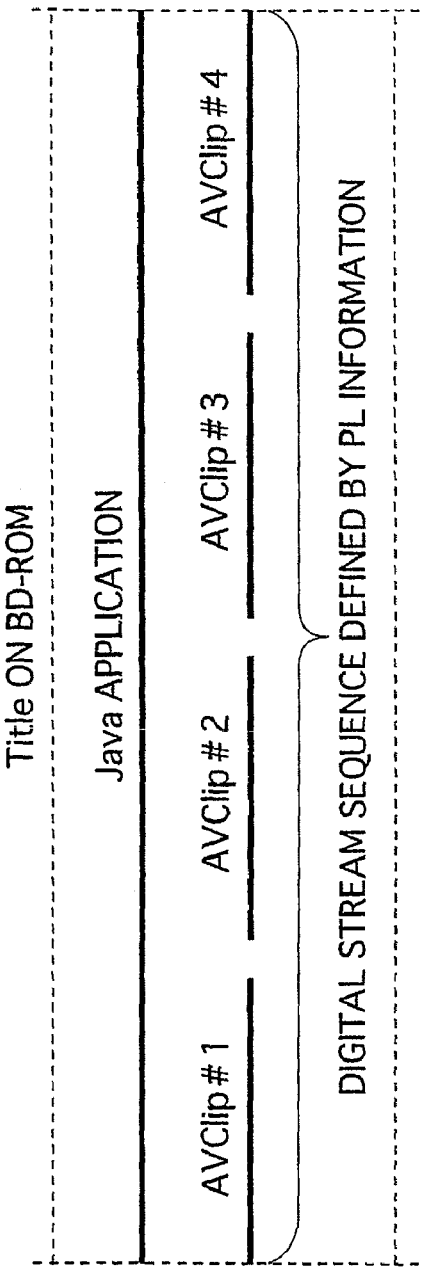
FIG. 16B shows a Title made up of an application and AVClips stored on BD-ROM and in the Local Storage.

As illustrated above, it is possible to prescribe both the AVClips on the BD-ROM and the AVClips in the Local Storage 18 as a single stream sequence, and by combining this stream sequence with applications on the BD-ROM or in the Local Storage, it is possible to constitute a single Title from those AVClips and from the applications recorded on the BD-ROM or in the Local Storage. In the case of AVClip #1 being recorded on a BD-ROM, and AVClips #2 to #4 and an application being recorded in the Local Storage as shown in FIG. 16A, it is possible to treat these AVClips and the application as a single Title as shown in FIG. 16B.

The merge management information file is described next. This merge management information file collectively shows all of those files that constitute a Virtual Package and are in the disc#1 and disc#2 directories in the Local Storage.

FIG. 17 shows an exemplary internal structure of the merge management information file. The merge management information file is composed of storage location information relating to files within the Local Storage that constitute a Virtual Package. For each file, the storage location information is composed of a file path that indicates a storage location of the file in the Local Storage 18 and a "hash value" indicating a hash value of the file which is determined from the data in the file and is calculated using a one-way function.

The signature information file is described next. The signature information file shows the electronic signature of a provider on the merge management information file. The electronic signature generally employed is obtained by computing a hash value for information that requires tamper-proofing and encrypting the hash value using some sort of secret key. In the signature information file according to the present embodiment, the hash value of the merge management information file is encrypted with the use of a secret key that corresponds to a public key within a merge certificate held by the playback apparatus.

It should be noted that a merge certificate is a certificate used for authenticating a merge management information file and includes a public key published by the provider. A merge certificate provided by a provider is incorporated into a playback apparatus in advance. As an example, as for a file format of a merge certificate, X.509 may be used. The detailed specification of X.509 is written in CCITT Recommendation X.509 (1988), "The Directory-Authentication Framework" published by the International Telegraph and Telephone Consultative Committee.

It should be noted that although the description above notes that a merge certificate is incorporated into a playback apparatus in advance, it is acceptable to record a merge certificate on a BD-ROM. Alternatively, it is acceptable to download and obtain a merge certificate from a server apparatus that provides merge certificates via the Internet.

This completes description of the recording medium. The following describes the internal structure of a playback apparatus pertaining to the present invention.

<Playback Apparatus>

Figure 18:
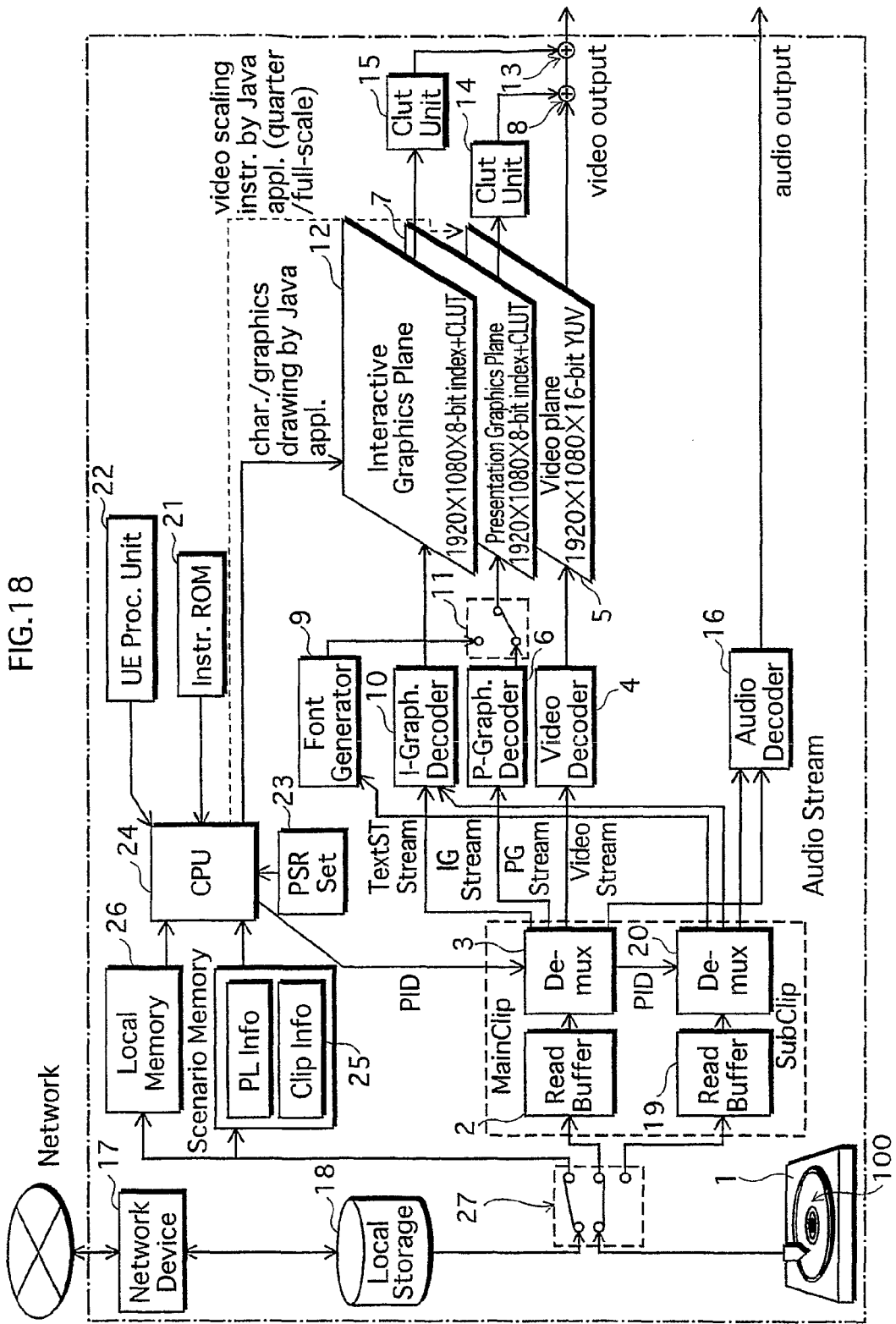
FIG. 18 shows an internal structure of a playback apparatus of the present invention.

FIG. 18 shows the internal structure of the playback apparatus of the present invention. The playback apparatus of the present invention may be industrially manufactured based on the internal structure shown in the drawing. The playback apparatus of the present invention is mainly composed of two parts such as a system LSI and a drive apparatus and may be industrially manufactured by mounting these parts on a cabinet of the playback apparatus and on the substrate. The system LSI is an integrated circuit in which various processing units which are operable to achieve the functions of the playback apparatus are integrated. The playback apparatus manufactured in such a manner comprises: a BD-ROM drive 1, a Read Buffer 2, a demultiplexer 3, a video decoder 4, a video plane 5, a P-graphics decoder 6, a Presentation Graphics plane 7, a composition unit 8, a font generator 9, an I-graphics decoder 10, a switch 11, an Interactive Graphics plane 12, a composition unit 13, a CLUT unit 14, a CLUT unit 15, an audio decoder 16, a network device 17, a Local Storage 18, a Read Buffer 19, a demultiplexer 20, an instruction ROM 21, a user event processing unit 22, a PSR set 23, a CPU 24, a scenario memory 25, a Local Memory 26, and a switch 27.

The constituent elements (the BD-ROM drive 1—the audio decoder 16) pertaining to playback of AVClips recorded on BD-ROM are described firstly.

The BD-ROM drive 1 loads/ejects, and accesses a BD-ROM.

The Read buffer 2 is a first-in first-out (FIFO) memory in which transport stream (TS) packets read from the BD-ROM or the Local Storage 18 are stored on a first-in first-out basis.

Demultiplexer (De-MUX) 3 takes out TS packets from Read Buffer 2 and converts these TS packets into PES packets. Out of the PES packets obtained through the conversion, PES packets having PIDs set by CPU 24 are then output to one of the video decoder 4, the P-graphics decoder 6, the I-graphics decoder 10, and the audio decoder 16.

The video decoder 4 decodes PES packets output from the demultiplexer 3 to obtain pictures in uncompressed format, and writes these pictures to the video plane 5.

The video plane 5 is for storing uncompressed pictures. A plane is a memory area in a playback apparatus for storing one screen worth of pixel data. The video plane 5 has a 1920×1080 resolution, with stored picture data being constituted from pixel data expressed by 16-bit YUV. In the video plane 5, playback video images in a video stream can be scaled per frame. Scaling involves changing playback video images per frame to either ¼ (quarter) or ¹⁄₁ (full-scale) of the entire video plane 5. Scaling is executed in BD-J mode in accordance with instructions from CPU 24, enabling screen production whereby the playback images of video streams are relegated to a corner of the screen or projected over the whole screen.

The P-graphics decoder 6 decodes presentation graphics streams read from a BD-ROM and writes the uncompressed graphics to the Presentation Graphics plane 7. Subtitles appear on screen as the result of a graphics stream being decoded.

The Presentation Graphics plane 7, being a memory with room for one screen worth of data, is able to store one screen worth of uncompressed graphics. This plane has a 1920×1080 resolution, with pixels of the uncompressed graphics in the Presentation Graphics plane 7 being expressed by 8-bit index color. Uncompressed graphics stored in the Presentation Graphics plane 7 are submitted for display by converting the index colors using a CLUT (Color Lookup Table).

The composition unit 8 synthesizes uncompressed picture data (i) stored in the video plane 5 with what is stored in the Presentation Graphics plane 7.

The font generator 9 uses a character font to expand text code included in textST streams in a bitmap, and writes the expanded code to the Presentation Graphics plane 7.

The I-graphics decoder 10 decodes IG streams read from BD-ROM or the Local Storage 18 in a DVD-like mode, and writes the uncompressed graphics to the Interactive Graphics plane 12.

The switch 11 selectively writes one of a font sequence generated by the font generator 9 and graphics resulting from the decoding by P-Graphics decoder 6 to Presentation Graphics plane 7.

The Interactive Graphics plane 12 is written with uncompressed graphics resulting from the decoding by I-graphics decoder 10. Characters and graphics drawn by an application are written into the Interactive Graphics plane 12 in BD-J mode in full colors of αRGB.

The composition unit 13 synthesizes what is stored in the Interactive Graphics plane 12 with composite images output from the composition unit 8 (i.e. composite of uncompressed picture data and what is stored in the Presentation Graphics plane 7). The synthesizing enables characters and graphics written to I-graphics decoder 10 by an application to be overlaid on uncompressed picture data and displayed.

The CLUT unit 14 converts index colors in uncompressed graphics stored in the video plane 5 to Y, Cr, Cb values.

While operating in a DVD-like mode, the CLUT unit 15 converts index colors in uncompressed graphics stored in Interactive Graphics plane 12 to Y, Cr, Cb values. While operating in a BD-J mode, the CLUT unit 15 converts the full colors of αRGB into Y, Cr, and Cb.

The audio decoder 16 decoded PES packets output from demultiplexer 3 and outputs uncompressed audio data.

This completes description of the constituent elements pertaining to AVClip playback. The following describes constituent elements pertaining to operations in BD-J mode (the network device 17—the De-MUX 20).

The network device 17 realizes communication functions in the playback device. In the case of an application specifying an URL in BD-J mode, the network device 17 establishes a TCP connection, an FTP connection, or the like, with the website indicated by the URL. The Java application is enabled to download from the website as the result of the connection being established.

The Local Storage 18 is a hard disk for storing, together with metadata, contents supplied from communication and recording media other than BD-ROM, such as contents downloaded from a website via a connection established by the network device 17. Metadata is information for binding and managing downloaded contents in the Local Storage 18. By accessing the Local Storage 18, applications in BD-J mode are able to perform a variety of processing using downloaded contents.

The Read buffer 19 is a FIFO memory that stores TS packets constituting SubClips on a first-in first-out basis in the case where the SubClips are included in contents stored on a BD-ROM or in the Local Storage 18.

The demultiplexer (De-MUX) 20 takes out TS packets from read buffer 19 and converts the read TS packets to PES packets. Out of the PES packets obtained through the conversion, PES packets having desired PIDs are then output to the font generator 9, the P-Graphics decoder 6, and the audio decoder 16.

The above elements, namely the Network device 17 to the De-MUX 20, enable contents downloaded by a Java application via a network to be played back in a similar manner to contents recorded on a BD-ROM. The following describes constituent elements (the instruction ROM 21—the switch 27) for realizing collective controls in the playback apparatus.

The instruction ROM 21 stores software that prescribes controls relating to the playback apparatus.

The user event processing unit 22, in response to key operations of a remote controller or the front panel of the playback apparatus, outputs user events for performing these operations to the CPU 24.

The PSR set 23 is a resister built in the playback apparatus composed of a 64 individual player status registers (PSRs) and 4096 individual general purpose registers (GPRs). PSR4 to PSR8 are the PRSs to express the current playback point in time.

PSR4 indicates the Title of the current playback point by having been set to a value from 1-100. When PSR4 is set to "0", it means that the current playback point is the top menu.

PSR5 indicates the chapter number of the current playback point by having been set to a value from 1-999. When PSR5 is set to "0xFFFF" it means that the chapter number in the playback apparatus is null.

PSR6 indicates the number of the PL (current PL) to which the current playback point belongs by having been set to a value from 0-999.

PSR7 indicates the number of the PlayItem (current PlayItem) to which the current playback point belongs by having been set to a value from 0-255.

PSR8 indicates the current playback point (current presentation time or "PTM") using 45-KHz time accuracy, by having been set to a value from 0-0xFFFFFFFF. PSR4 to PSR8 enable the current point in time of playback to be specified on a time axis for the entire BD-ROM.

The CPU 24 runs software stored in the instruction ROM 21 to execute controls relating to the entire playback apparatus. These controls change dynamically depending on user events output from the user event processing unit 22 and the set values of PSRs in the PSR set 23.

The scenario memory 25 is for storing current PL information and current clip information. The current PL information is the piece of PL information recorded on a BD-ROM that is currently targeted for processing. The current clip information is the piece of clip information recorded on a BD-ROM that is currently targeted for processing.

The Local Memory 26 is a cache memory for temporarily storing what is recorded on a BD-ROM given the slow reading speed from BD-ROM. The provision of Local Memory 26 allows applications in BD-J mode to run efficiently.

The switch 27 selectively delivers data read from BD-ROM and the Local Storage 18 to one of the Read Buffer 2, the Read Buffer 19, the scenario memory 25, and the Local Memory 26.

Thus completes the description of the hardware configuration of the playback apparatus of the present embodiment. The following describes the software structure in the playback apparatus of the present embodiment.

Figure 19:
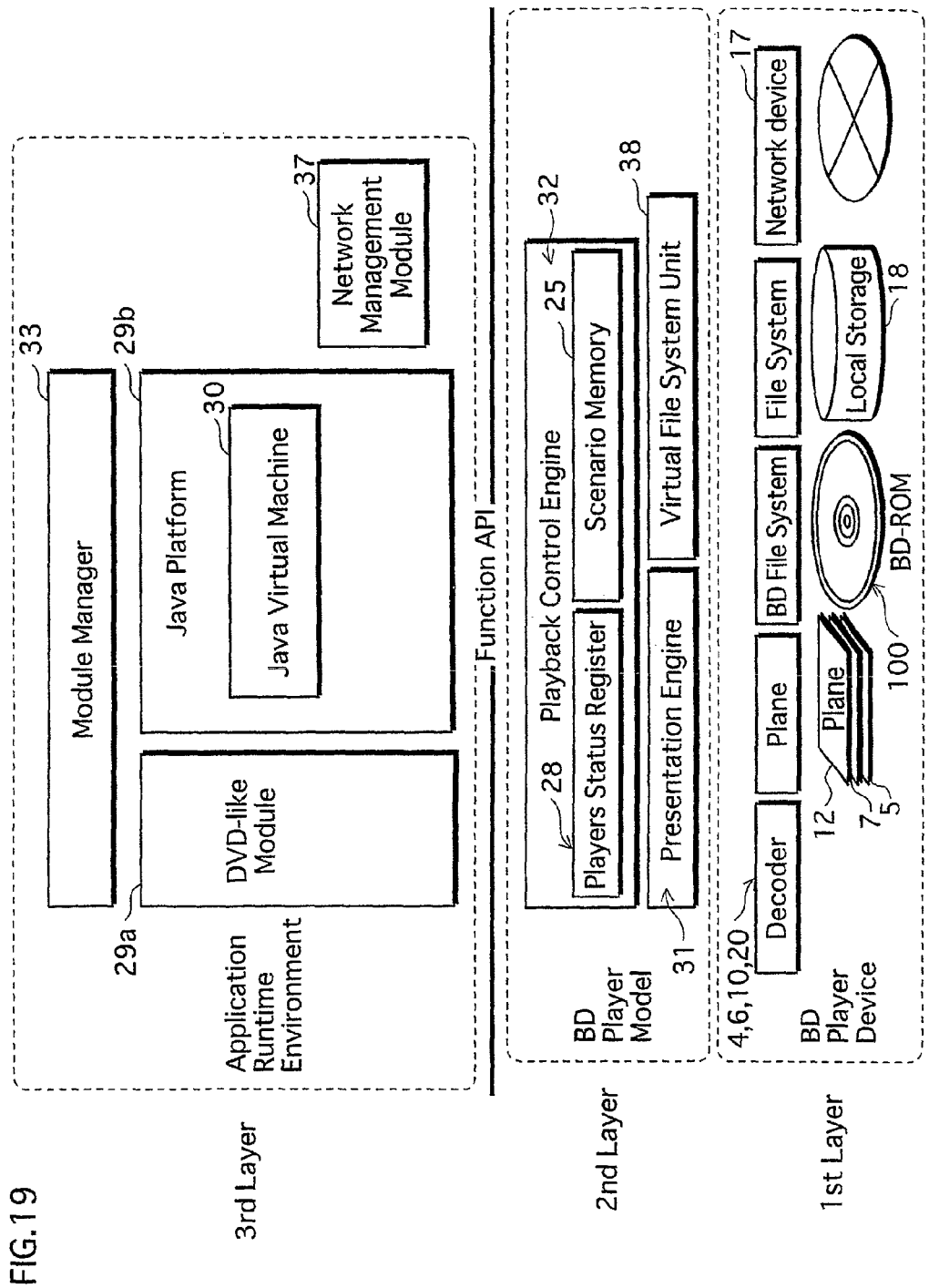
FIG. 19 illustrates a configuration made up of software stored in the instruction ROM 21 and hardware in the form of a layer structure.

FIG. 19 illustrates a configuration made up of software stored in the instruction ROM 21 and hardware in the form of a layer structure. As shown in the drawing, the layer structure of the playback apparatus is made up of the following:

(a) The first layer for the BD Player Device
(b) The second layer for the BD Player Model and
(c) The third layer for the Application Runtime Environment Among these layers, the hardware structure of the playback apparatus shown in FIG. 18 belongs to the first layer. The first layer shown in the drawing "BD Player Device" includes, out of the hardware structure shown in FIG. 18, a "decoder" which is made up of the video decoder 4, the P-Graphics decoder 6, the I-Graphics decoder 10, the audio decoder 16; a "plane" which is made up of the video plane 5, the Presentation Graphics plane 7, the Interactive Graphics plane 12; the BD-ROM and the file system therefor; and the Local Storage 18 and the file system therefor.

The second layer "BD Player Model" is made up of the following two layers, (b1) and (b2):

(b2) the layer for the Playback Control Engine 32 and
(b1) the layer for the Virtual File System unit 38 and the Presentation Engine 31.

A function API is provided by the second layer for a layer positioned above.

Among these layers, the PSR set 23 and the scenario memory 25 shown in FIG. 18 are inside the Playback Control Engine 32.

The third layer "Application Runtime Environment" is made up of the following stack layers, (c2) and (c1):

(c2) The layer in which the module manager 33 is present
(c1) The layer in which the DVD-like module 29*a* and the Java platform 29*b* are present.

The following describes the constituent elements in this software structure.

<The DVD-Like Module 29*a* and the Java Platform 29*b*>

The DVD-like module 29*a* decodes a navigation command and executes a function call for the Playback Control Engine 32 based on the result of the decoding.

Prior Art related to the DVD-like module and Movie Objects executed by the DVD-like module is published in the following international publication, which should be referred to for further details:

International Publication WO 2004/074976

The Java platform 29*b* is a so-called Java platform and has a structure in which the following are arranged in layers:

(d1-1) The Java virtual machine 30
(d1-2) Middleware for enabling the Java virtual machine to operate <The Java Virtual Machine 30>

The Java virtual machine 30 loads an xlet program that constitutes an application into a work memory, decodes the xlet program, and exerts control over the layers positioned below according to the result of the decoding. The control over the layers positioned below is achieved by issuing a method to the middleware so that the method is replaced with a function call to which the BD playback apparatus corresponds, and issuing the function call after the replacement to the Playback Control Engine 32.

<The Internal Structure of the Java Virtual Machine 30>

Figure 20:
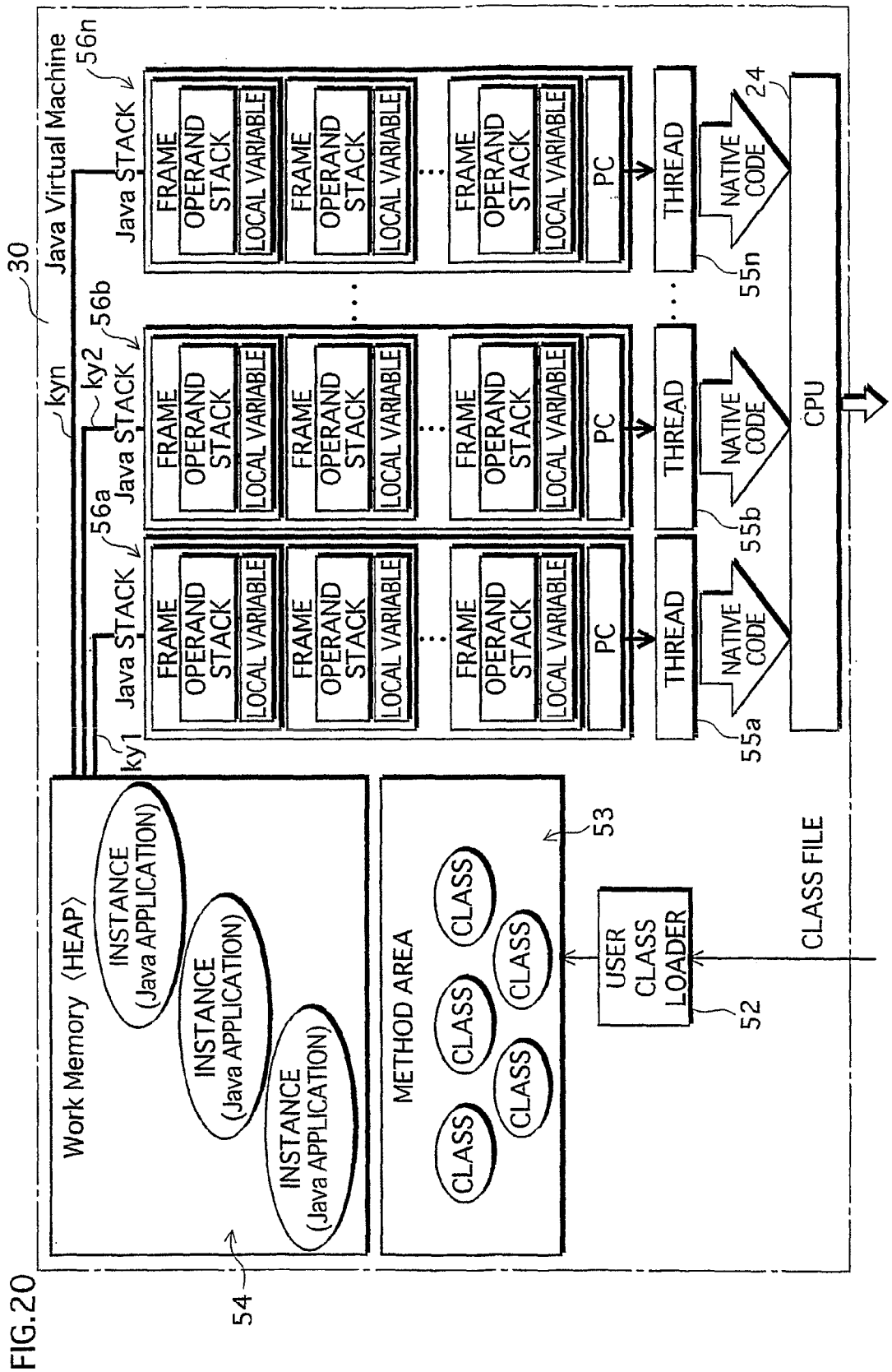
FIG. 20 shows an internal structure of a Java virtual machine 30.

The following describes the internal structure of the Java virtual machine 30. FIG. 20 shows the internal structure of the Java virtual machine 30. As shown in the drawing, the Java virtual machine 30 comprises a CPU 24, a user class loader 52, a method area 53, a work memory 54, threads 55*a*, 55*b*, ... 55*n*, and Java stacks 56*a*, 56*b*, ... 56*n*.

The user class loader 52 reads a class file out of the Java archive files in the BDJA directory from the Local Memory 26 or the like and stores the read class file into the method area 53. The user class loader 52 reads the class file when the application manager 36 specifies a file path and instructs the user class loader 52 to perform the reading. In the case where the file path indicates the Local Memory 26, the user class loader 52 reads a class file out of the Java archive files constituting the application, from the Local Memory 26 into the work memory 54. In the case where the file path indicates a directory within the File System, the user class loader 52 reads a class file out of the Java archive files constituting the application, from the BD-ROM or the Local Storage 18 into the work memory 54.

The method area 53 stores therein the class file read from the Local Memory 26 by the user class loader 52.

The work memory 54 is a so-called heap area and stores therein instances for various class files. The work memory 54 stores therein instances that correspond to resident-type applications called resident applications and class files read into the method area 53. Each of these instances is an xlet program that constitutes an application. The application becomes executable when such an xlet program is located into the work memory 54.

The threads 55*a*, 55*b*, ... 55*n* are logical subjects of execution to execute the methods stored in the work memory 54. The threads 55*a*, 55*b*, ... 55*n* perform calculation using a local variable or an argument stored in an operand stack as an operand, and stores the result of the calculation into the local variable or the operand stack. The arrows ky1, ky2, and kyn in the drawing symbolically indicate methods supplied from the work memory 54 to the threads 55*a*, 55*b*, ... 55*n*. Although the physical subject of execution is only the CPU, there is a possibility that as many as sixty-four threads which are the logical subjects of execution exist in the Java virtual machine 30. Within the range of sixty-four and below, it is possible to newly generate a thread and to delete an existing thread. The number of threads in operation may increase or decrease while the Java virtual machine 30 is in operation. Since the number of the threads may be increased when appropriate, it is possible to execute one instance in parallel with the use of a plurality of threads so that the instance is executed at a higher speed.

The Java stacks 56*a*, 56*b*, ... 56*n* and the threads 55*a*, 55*b*, 55*n* exist in the proportion of one to one. Each of the Java stacks 56*a*, 56*b*, ... 56*n* has, within itself, a program counter (referred to as "PC" in the drawing) and one or more frames. The "program counter" shows which part of an instance is currently being executed. The "frame" is a stack-type area assigned to one call for a method and is made up of an "operand stack" in which an argument in the one call is to be stored and a "local variable stack (referred to as "local variable" in the drawing) to be used by the called method. One frame is stacked up on the Java stacks 56a, 56b, . . . 56n every time a call is made; likewise, when a method calls itself recursively, one frame is stacked up.

Thus completes the description of the internal structure of the Java virtual machine. The Java virtual machine with such a structure serves as the subject of execution driven by an event (i.e. the subject of event-driven execution). Thus completes the description of the Java virtual machine.

<Presentation Engine 31>

The Presentation Engine 31 executes AV playback functions. The AV playback functions of a playback apparatus are traditional functions that are inherited from DVD players and/or CD players, such as to start playback (Play), to stop playback (Stop), to pause playback (Pause On), to cancel the pause in playback (Pause Off), to cancel a Still function (Still Off), to forward at a designated speed (Forward Play (speed)), to rewind at a designated speed (Backward Play (speed)), to change audio (Audio Change), to change a sub-image (Sub-Title Change), and to change the angle (Angle Change). In order to realize the AV playback functions, the Presentation Engine 31 controls the video decoder 4, the P-Graphics decoder 6, the I-Graphics decoder 10, and the audio decoder 16 so that a portion of an AV Clip which has been read into the Read Buffer 2 and which corresponds to a desired time is decoded. With regard to such a desired time, it is possible to play back a portion of an AV clip corresponding to an arbitrary time by having the portion indicated by the PSR 8 (the current PTM) decoded.

<The Playback Control Engine 32>

The Playback Control Engine 32 (PCE 32) executes various functions such as (i) playback control function for a PlayList and (ii) a function of obtaining/setting a state of the PSR set 23. The playback control function for a PL is to have, out of the AV playback functions performed by the Presentation Engine 31, starting and stopping of playback performed according to current PL information and Clip information. These functions (i) and (ii) are executed in accordance with a function call from the DVD-like module 29a—the Java platform 29b.

The following describes synchronization between the processing performed by the Playback Control Engine 32 and the processing performed by the Java virtual machine. When a function is called, the Playback Control Engine 32 executes the processing procedure based on the PL information. In the case where an AV Clip to be played back has a playback period of fifteen minutes or thirty minutes, the processing mentioned above is continued for this duration. A problem is that there is a gap between the time at which the Java virtual machine 30 returns a success response and the time at which the Playback Control Engine 32 actually finishes the processing. Since the Java virtual machine 30 is the subject of an event-driven processing, it returns a response indicating whether the playback is successful or failed immediately after the call; however, the Playback Control Engine 32 finishes the playback of the AV Clip and a Play Item after fifteen or thirty minutes. Consequently, if the time at which a success response is returned to the application is used as a reference point, it is impossible to detect the end of the processing that occurs fifteen or thirty minutes later. In the case where fast forward or rewinding is performed during a PL playback, such a playback period of fifteen or thirty minutes is shifted forward or backward, and detecting the end of the processing becomes even more difficult. In order to cope with this problem, when the playback of a Play Item is finished or when the playback of an AV Clip is finished, the Playback Control Engine 32 outputs an event to the application, the event indicating that the playback of the Play Item or the AV Clip is finished. Because of such an output, the application is able to find out the time at which the Playback Control Engine 32 has finished the playback of the Play Item or the AV Clip.

<The Module Manager 33>

The module manager 33 reads INDEX.BDMV and selects a piece of title information out of the plurality of pieces of title information included in INDEX.BDMV, as a piece of current title information. The module manager 33 then reads a BD-J object indicated by the piece of current title information and controls the playback control engine so that playback control is performed based on the PlayList information written in the BD-J object. Further the module manager 33 controls the Java virtual machine so as to read and execute the Java archive files written in the BD-J object.

Here, in the case where the playback of a digital stream based on the PlayList information is finished or where the user calls a menu, the module manager 33 reads another piece of title information that defines another Title so that the piece of title information is selected as a piece of current title information. The processing of selecting another piece of title information as a piece of current title information in accordance with playback of a digital stream or a menu call by a user will be referred to as a "title switching".

Figure 21:
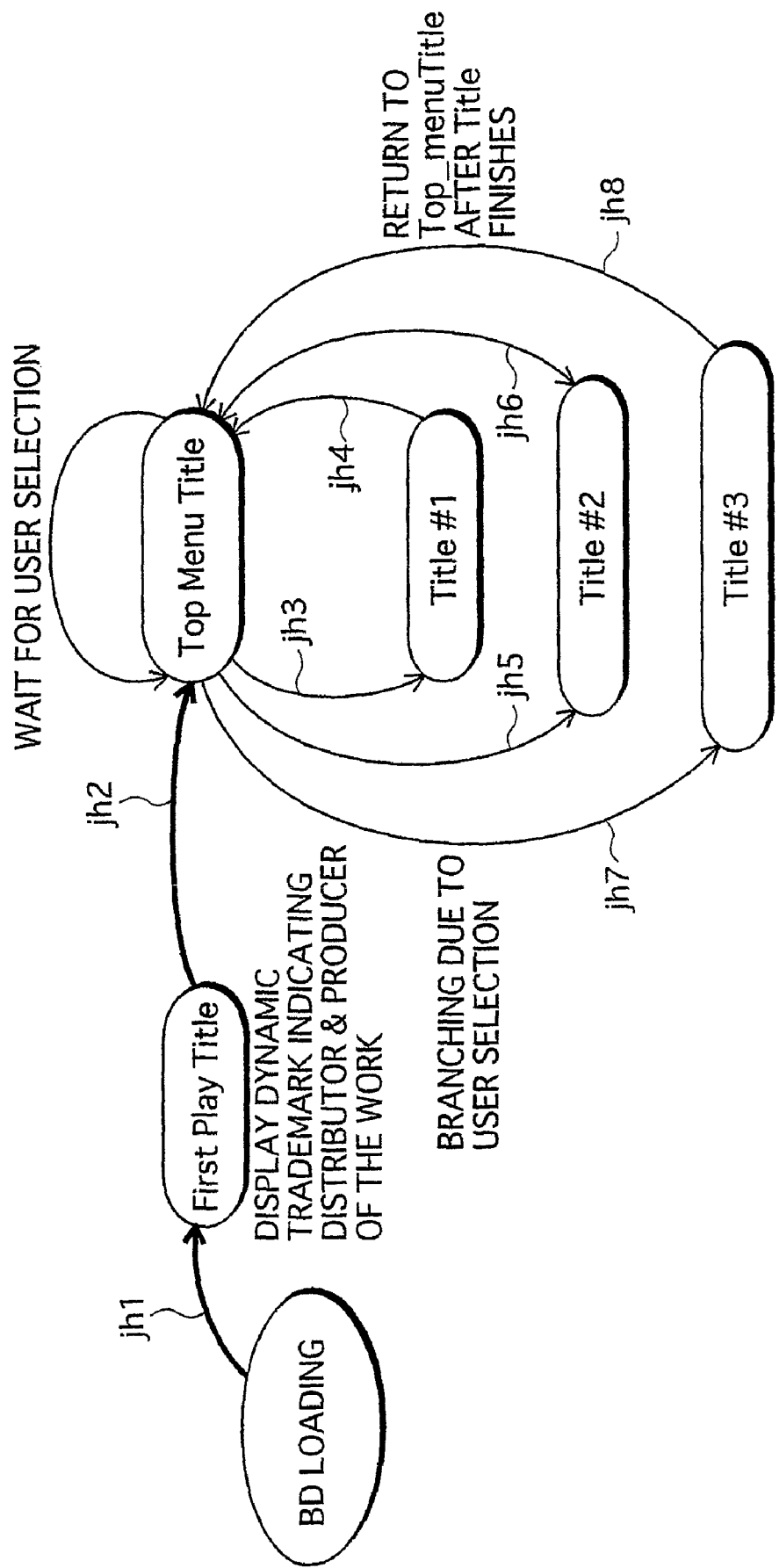
FIG. 21 shows shifting of the playback state.

When such a "title switching" is repeatedly performed, it is possible to realize a state shifting as indicated in FIG. 21. The elongated circles in the drawing represent Titles.

Titles includes a "First Play Title" which is to be played back when a BD-ROM is loaded, a "TOP_menu Title" which constitutes a Top Menu, and other "Titles" that are generic Titles. The arrows jh1, jh2, jh3, jh4, jh5, jh6, jh7, and jh8 in the drawing symbolically indicate branching between Titles. The state shifting shown in this drawing is that a "First Play Title" is played back when a BD-ROM is loaded, branching to a "Top_menu Title" occurs, and a selection in the Top menu is awaited.

The state shifting peculiar to disc contents is that the processing as follows is repeated over and over until the BD-ROM is ejected: When a user performs an operation to make a selection from the menu, the corresponding Title is played back according to the selection, and the procedure goes back to the Top_menu Title. Such state shifting is realized under the control by the module manager 33 described above.

Selections of a Title and a current Title are published in the following international applications, which should be referred to for further details.

International Publication WO 2005/036555
International Publication WO 2005/036540
International Publication WO 2005/036547

Thus completes the description of the Java virtual machine 30, the Presentation Engine 31, the Playback Control Engine 32, and the Module Manager 33.

The control over the Playback Control Engine 32 by the Java virtual machine is exerted through a Virtual Package. In order to realize the control over the Playback Control Engine 32 through a Virtual Package, the playback apparatus comprises constituent elements such as a network management module 37, a Virtual File System unit 38, a management information conversion module 39, and a method execution module 40. The following describes these constituent elements.

<The Network Management Module 37>

The network management module 37 downloads data required for construction of a Virtual Package from a WWW site run by the provider of the movie, according to a method call from the application. The data required for construction of a Virtual Package includes a merge management information file, a signature information file, a file that replaces a file on a BD-ROM or that is added to the files on a BD-ROM, (for example, PlayList information, Clip information, AV Clips, and Java archive files). When a download request is made by an application in the Work Memory 54, the network management module 37 downloads the data required for the construction of the Virtual Package via a network and writes the downloaded data into the Local Storage 18.

<The Virtual File System Unit 38>

The Virtual File System unit 38 is one of the constituent elements belonging to the second layer and constructs a Virtual Package according to a method call from the application. A Virtual Package construction processing includes state management of AV Clips that constitute the Virtual Package and generation processing of Virtual Package information.

1. Virtual Package information

Virtual Package information is obtained by extending volume management information recorded on a BD-ROM. The volume management information mentioned here is information for defining a directory-file structure existing on a recording medium and is made up of directory management information regarding the directories and file management information regarding the files.

Virtual Package information extends the directory-file structure on the BD-ROM by adding new file management information to the volume management information indicating the directory-file structure on the BD-ROM. The new file management information to be added to the BD volume management information is file management information of PlayList information, Clip information, AV Clips, and the Java archive files that are stored in the Local Storage 18. Because Virtual Package information to which such file management information has been added is generated and provided for the Playback Control Engine 32, the Playback Control Engine 32 is able to recognize as if the PlayList information, the Clip information, the AV Clips, and the Java archive files stored in the Local Storage 18 existed on the BD-ROM. FIG. 22 shows an example of construction of Virtual Package information performed by the Virtual File System unit 38. At the top left of the drawing is the directory-file structure on the BD-ROM and is the same as the one shown in FIG. 2. At the bottom left of the drawing is the directory-file structure in the Local Storage 18 and is the same as the one shown in FIG. 14. The file management information of the PlayList information, the Clip information, the AV Clips, and the Java archive file that are stored in the Local Storage 18 is added to the volume management information on the BD-ROM according to the merge management information.

To be more specific, the following procedure is performed:

(i) The file management information of the PlayList (00002.MPLS) in the Local Storage 18 is added to the directory management information of the MPLS directory in the BD volume management information.

(ii) The file management information of the Clip information #2, the Clip information #3, and the Clip information #4 (00002.CLPI, 00003.CLPI, and 00004.CLPI) in the Local Storage 18 is added to the directory management information of the CLPI directory in the BD volume management information.

(iii) The file management information of the AV Clip #2, the AV Clip #3, and the AV Clip #4 (00002.M2TS, 00003.M2TS, 00004.M2TS) in the Local Storage 18 is added to the directory management information of the STREAM directory in the BD volume management information.

It should be noted that in the case where a file having the same file path as the one in the Virtual Package specified by the merge management information file exists on the BD-ROM, the file management information in the Local Storage is overwritten into the volume management information. With this arrangement, the file that is stored in the Local Storage and is referenced by the merge management information file will be used by priority in the Virtual Package.

As a result, Virtual Package information has been obtained. Virtual Package information has been obtained by making such additions to the volume management information.

The Virtual Package information that has been generated this way is provided for the Playback Control Engine 32. Accordingly, the Playback Control Engine 32 is able to treat the PlayList information, the Clip information, and the AV clips stored in the Local Storage 18 equally as the PlayList information, the Clip information, and the AV Clips recorded on the BD-ROM by specifying a locator indicating the Virtual Package when the file is accessed.

More specifically, the Playback Control Engine 32 requests a file access with the use of the locator for the Virtual Package indicated by the Virtual Package information. In response to the request, the Virtual File System unit 38 judges whether the substance of the file being the access request destination is recorded on the BD-ROM or in the Local Storage 18, based on the merge management information file. In the case where the judgment result is that the substance of the file is recorded in the Local Storage 18, the Virtual File System unit 38 converts the access request destination to a file path to a file that is specified by the merge management information file and is stored in the Local Storage 18.

Thus completes the description for generation of Virtual Package information.

The following explains the timing with which the Virtual Package Information is updated.

Figure 23A:
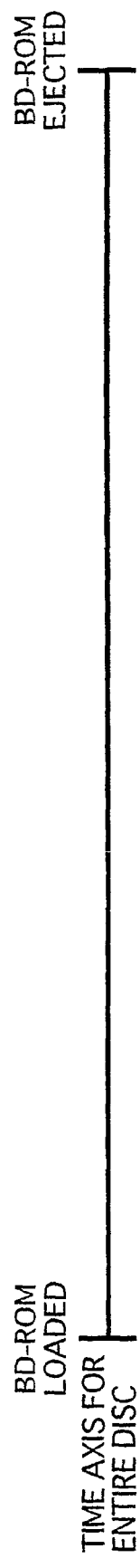
FIG. 23A shows the time axis for an entire disc.
Figure 23B:
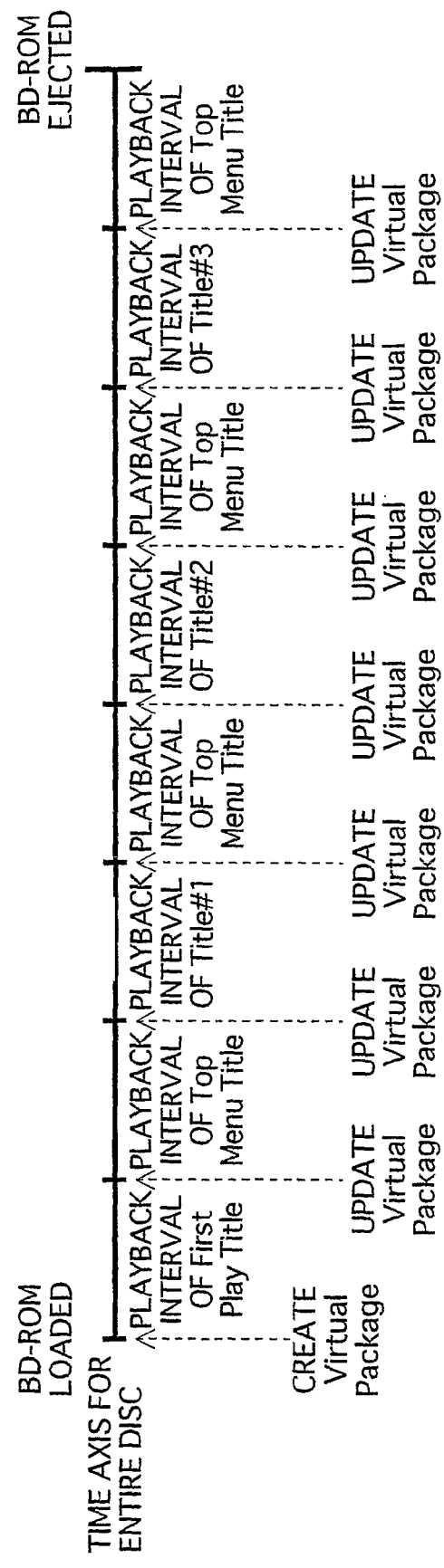
FIG. 23B shows the structure of the time axis for an entire disc.

Explanation is provided for a case where branching is performed in the order of the numerical values of the reference numbers indicated with the arrows jh1, jh2, jh3, jh4 and so on in FIG. 21, and the D-ROM is then ejected. In such a case, the continuous time line from when the BD-ROM is loaded to when the BD-ROM is ejected can be regarded as one time axis. Such a time axis is taken as the time axis for an entire disc. FIG. 23A shows a time axis for the entire disc. FIG. 23B shows the configuration of the time axis. As shown in FIG. 23B, the time axis of the entire disc is made up of an interval during which the First Play Title is played back, an interval during which the Top_menu Title is played back, an interval during which Title #1 is played back, and so forth. These playback intervals of the Titles are defined based on an idea that since each Title is constituted with a single BD-J object, a period during which a certain BD-J object is valid is regarded as a playback interval of one Title. A transition portion between playback intervals of Titles, in other words, the portion at which a Title is switched to another Title (referred to as a Title Change), is the time period at which the Virtual Package information is updated.

Figure 24:
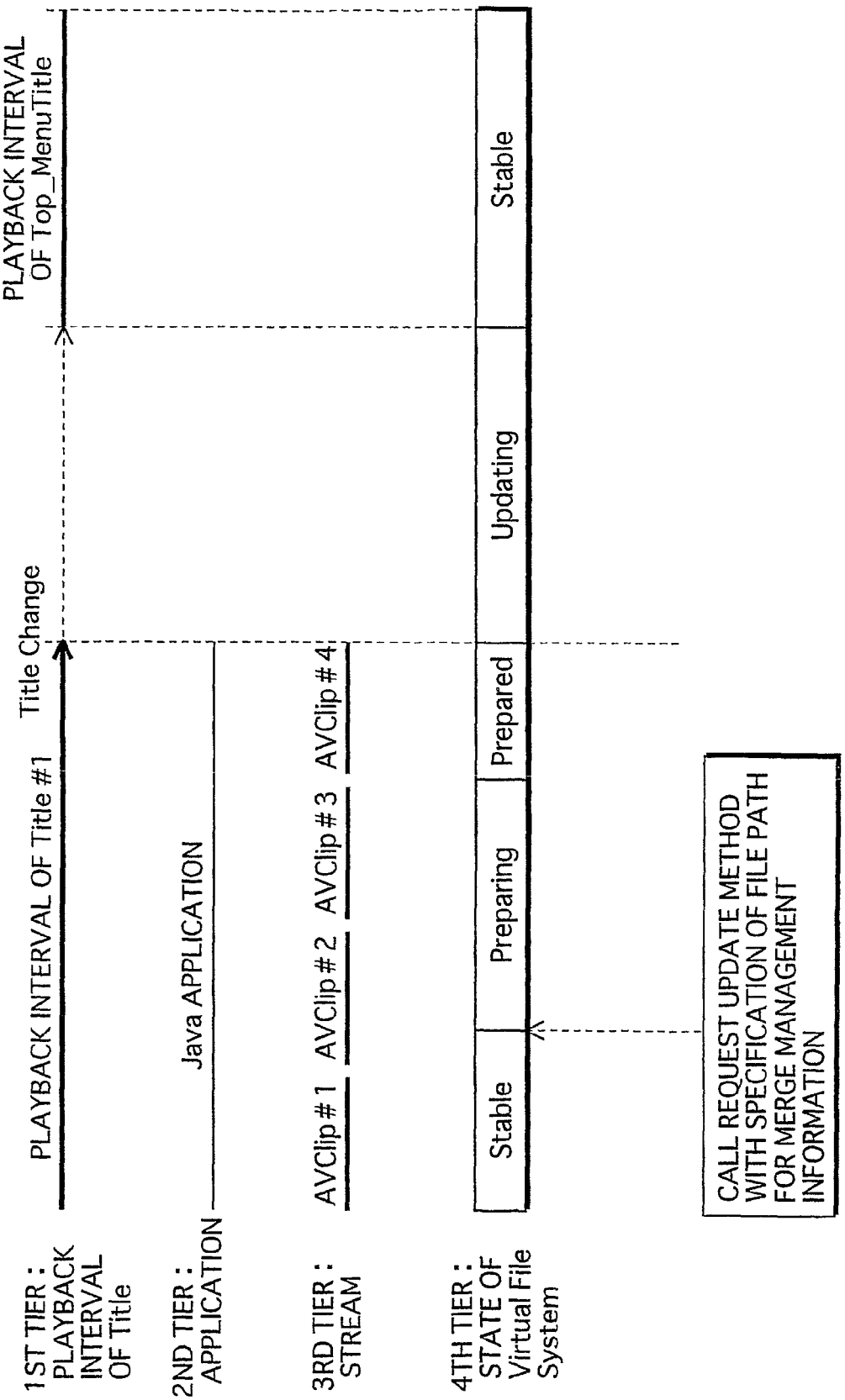
FIG. 24 shows how Virtual Package information is updated due to a Title Change.

FIG. 24 shows how the Virtual Package information is updated when a Title Change occurs.

The first tier of FIG. 24 shows a playback interval of a Title on the time axis. The second tier shows an execution state of a Java application that constitutes the Title. The third tier shows a playback state of a digital stream. The fourth tier shows a state of the Virtual File System unit 38.

During the playback interval of Title #1 shown in the first tier, the Java application and the AV Clips specified by a BD-J object are run and played back, as shown in the second and third tiers. In the case where the Virtual Package information is updated during such a playback interval of a Title, the constituent elements of the Title may change places with one another during the execution processing or the playback processing. When the constituent elements change places with one another, the playback apparatus operates abnormally, and there is a possibility that an unrecoverable situation such as a blackout in the playback image may be experienced.

To cope with this situation, when an update of the Virtual Package information is requested during the playback of Title #1, the Virtual File System unit 38 goes into a "Preparing state" in which, out of processing procedures required for construction of a Virtual Package, only some processings are executed which are executable in parallel during the playback interval of the Title without changing the constituent elements of the Virtual Package. After the processings in the Preparing state is completed, the Virtual File System unit 38 shifts into a "Prepared" state and waits until a Title Change occurs. When a Title Change has occurred, the Virtual File System unit 38 goes into an "Updating" state and, before the playback interval of the next Title starts, executes the processing of updating the Virtual Package information by adding the file management information of the file referenced by the merge management information file to the BD volume management information. After the update is completed, the Virtual File System unit 38 goes into a "Stable" state and the playback of the next Title starts. In such a state, in the case where a jump from the Top_menu Title after the Title Change back to Title #1 is selected, Title #1 will be played back to reflect the updated information.

As explained above, with regard to a Title Change, since the Virtual Package information is updated, even if an update of the Virtual Package information is requested while Title #1 is being played back, the constituent elements of the Title will not be changed while Title #1 is being played back; therefore, there is no possibility that abnormality occurs during the playback processing.

The following describes the details of construction of a Virtual Package, with reference to FIGS. 25 to 28.

Files that constitute a Virtual Package are supplied by a server installed by a provider, for example. These files are downloaded under control of a Java application, via a network such as the Internet. It should be noted that a communication protocol such as HTTP or HTTPS that is normally used in the Internet is used in the download.

Figure 25:
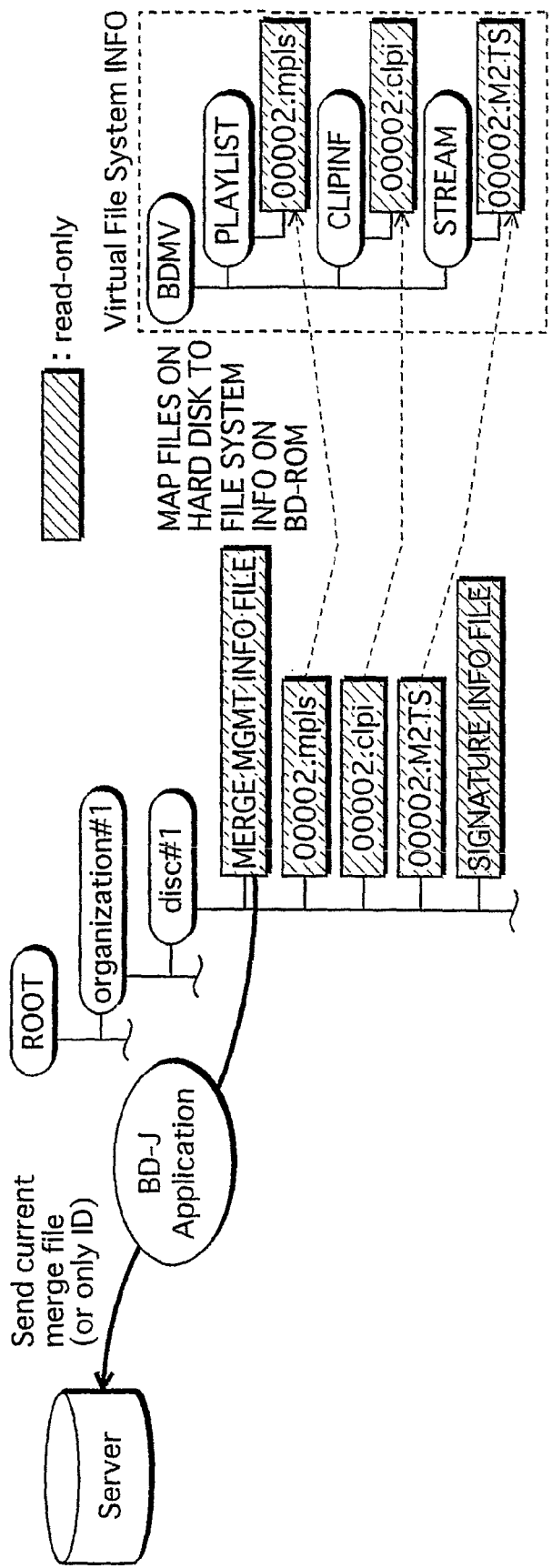
FIG. 25 schematically shows how a Java application requests a server to transmit files that constitute a Virtual Package.

FIG. 25 shows how a Java application requests the server to transmit files that constitute a Virtual Package. The directory tree under the ROOT directory shown in the middle of the drawing indicates a directory structure in the Local Storage. The Java application requests the server that the files constituting the Virtual Package should be downloaded by transmitting a merge management information file recorded in the Local Storage.

It should be noted that when a BD-ROM is mounted to a playback apparatus for the first time, no merge management information file is recorded in the Local Storage, and no Virtual Package has been constructed. In such a situation where a Virtual Package is to be constructed for the first time, the Java application requests the server that the files constituting the Virtual Package should be downloaded by notifying a disc ID to the server.

Figure 26:
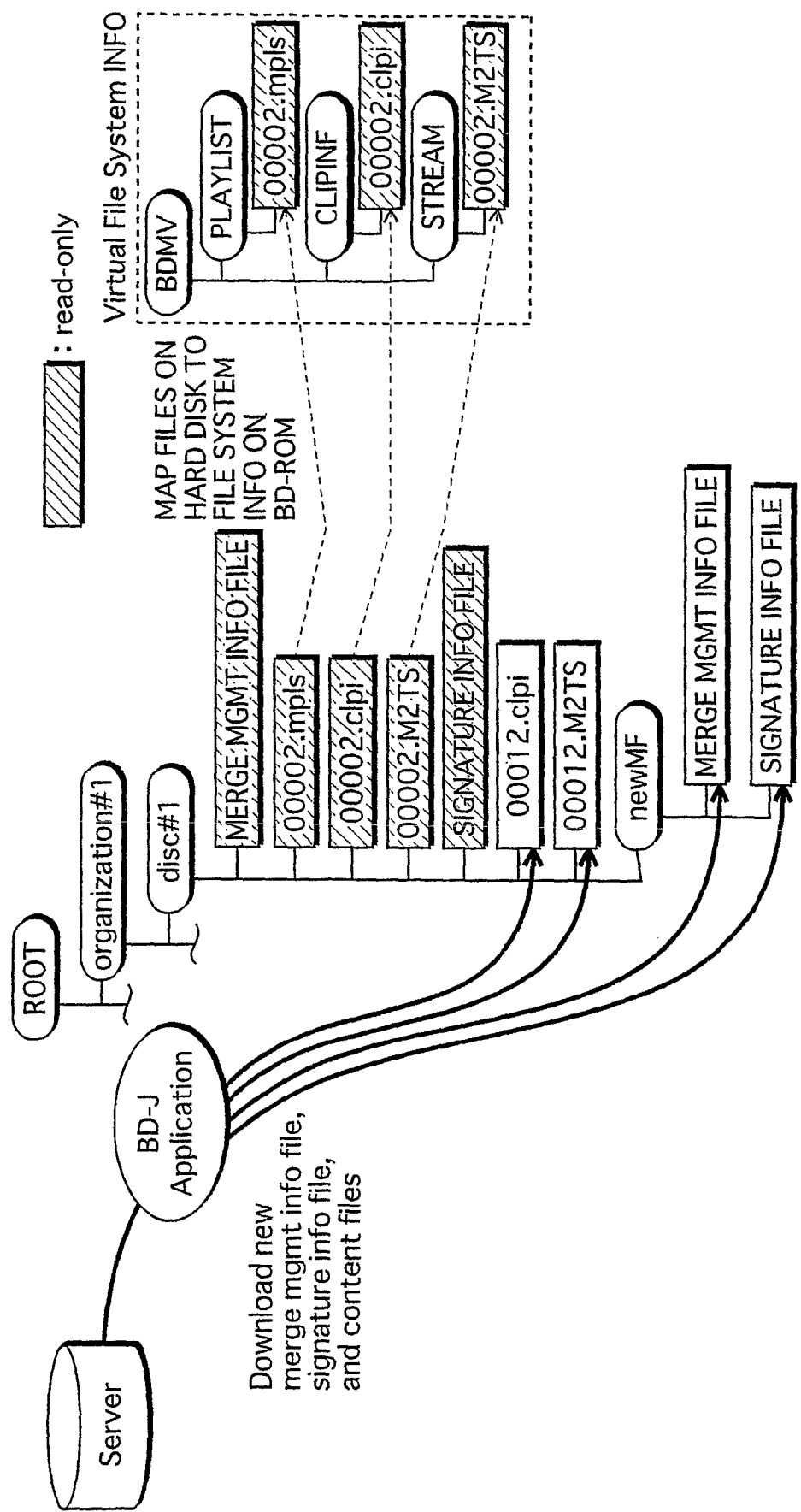
FIG. 26 schematically shows how the Java application stores the files transmitted from the server into the Local Storage.

Next, FIG. 26 shows how the Java application records the files transmitted from the server into the Local Storage.

As shown in FIG. 26, the Java application generates a new directory (new MF directory) under the disc #1 directory that corresponds to the disc ID, and records the new merge management information file and a signature information file that corresponds to the management information file, out of the files transmitted from the server in response to the request, into the newly generated directory. The other files are recorded immediately under the disc #1 directory. It should be noted that the recording of the files is performed by specifying a locator into the Local Storage with the use of an API that provides a file I/O function. It should be noted that it is acceptable to record the downloaded files immediately under the disc #1 directory without generating a new directory if the existing merge management information file and signature information file immediately under the disc #1 directory do not have the same file names as the merge management information file and signature information file to be newly downloaded.

Figure 27:
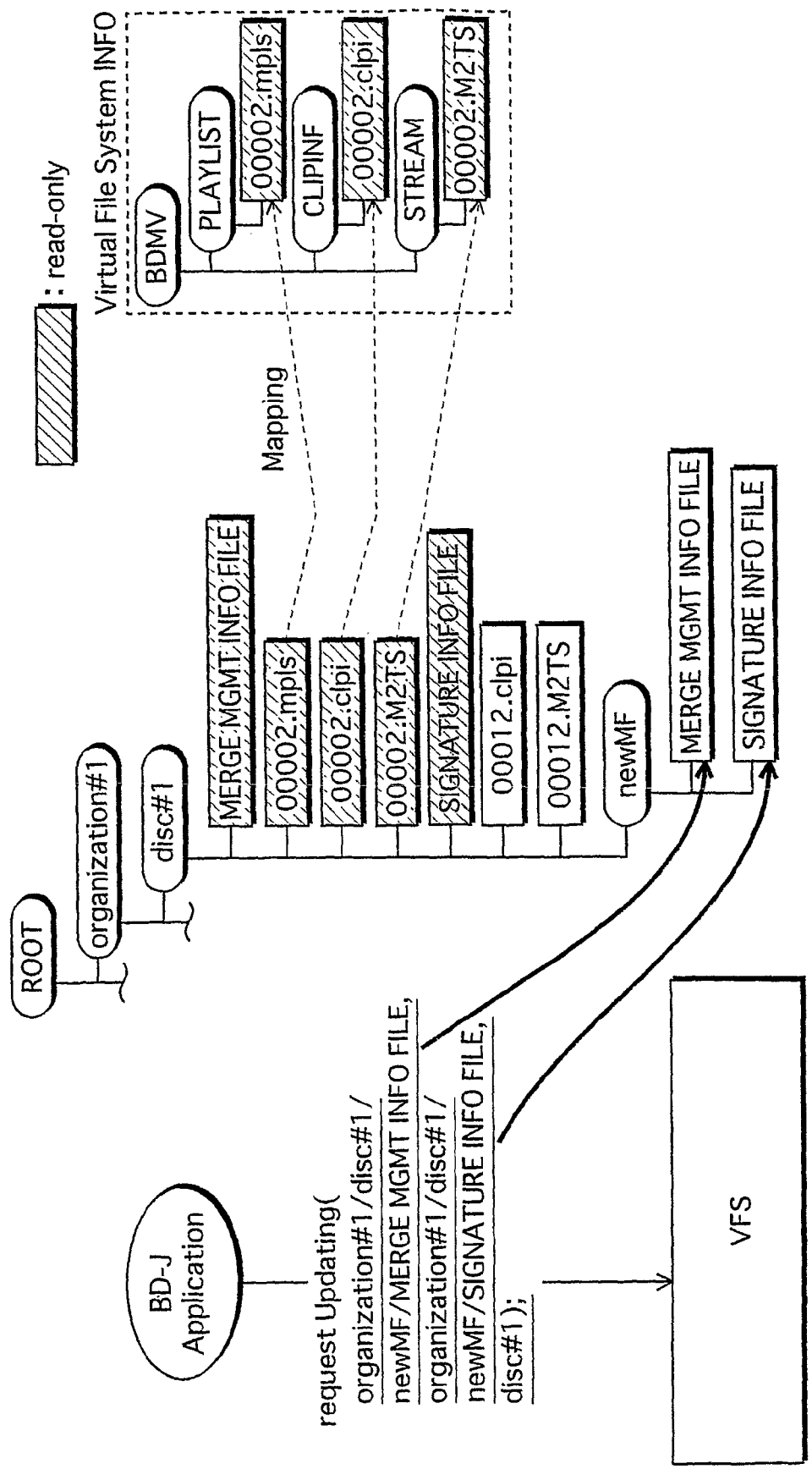
FIG. 27 schematically shows how the Java application requests the Virtual File System to update the Virtual Package information.

FIG. 27 shows how the Java application requests the Virtual File System unit that Virtual Package information should be updated. As shown in the drawing, the Java application which has obtained the files that constitute the Virtual Package calls an update request method, using the file path for the new merge management information file recorded in the new MF directory, the file path for the signature information file, and the disc ID as an argument, so that the Virtual Package information is updated.

Figure 28:
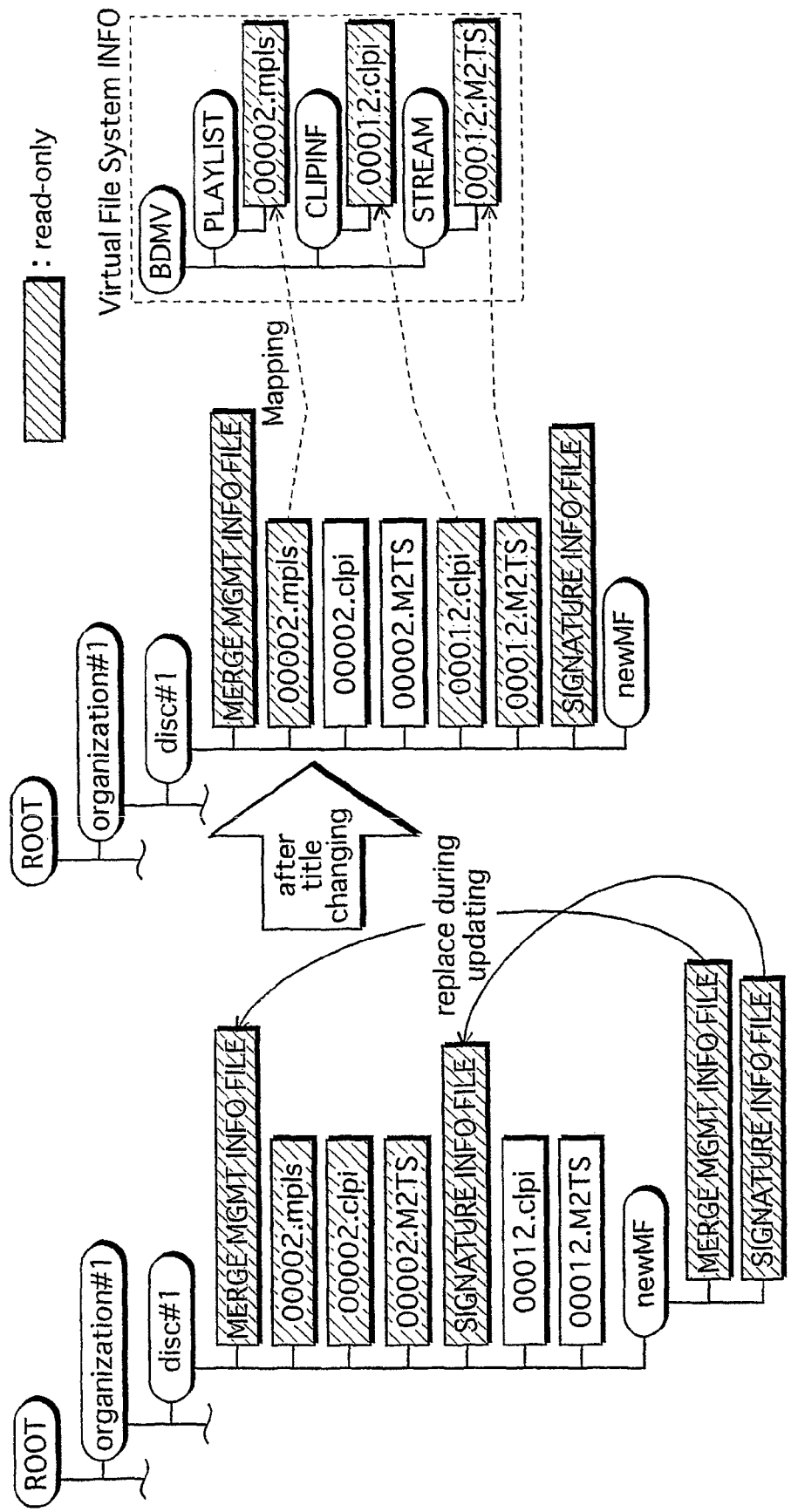
FIG. 28 schematically shows how Virtual Package information is updated.

FIG. 28 shows how Virtual Package information is updated.

When the update request method is called, the Virtual File System unit 38 shifts into a Preparing state and executes some processings that are executable without changing the constituent elements of the Virtual Package related to the Title currently being played back. The directory tree shown on the left side of the drawing shows the Local Storage in a Preparing state.

More specifically, the following processings are performed in the Preparing state:

(1) Judge if the new merge management information file indicated by the file path being the argument is authentic.

(2) Judge if files referenced by the new merge management information file are present at the specified storage locations.

(3) Change the file attributes of the files referenced by the new merge management information file and the new merge management information file into the Read-Only attribute.

When these processings performed in the Preparing state are completed, the Virtual File System unit 38 shifts into a Prepared state. It should be noted that the attributes of the files within the Local Storage to be mapped onto the Virtual Package are set to be the Read-Only attribute; therefore, in the case where the Java application requests that data should be written into some of these files by specifying a locator into the Local Storage with the use of an API that provides a file I/O function, the API will return an exception which indicates that writing is not permitted.

When a Title Change has occurred thereafter, the Virtual File System unit 38 replaces the files existing in the disc #1 directory with the new merge management information file and signature information file and maps the files recorded in the Local Storage onto the Virtual Package by adding file management information to the BD volume management information based on the merge management information file in the disc #1 directory after the replacement. At this time, the attributes of some of the files in the Local Storage that were referenced by the old merge management information file but are not referenced by the new merge management information file are changed from the Read-Only attribute to the readable/writable attribute. Thus completes the description of the details for construction of the Virtual Package information.

Figure 29:
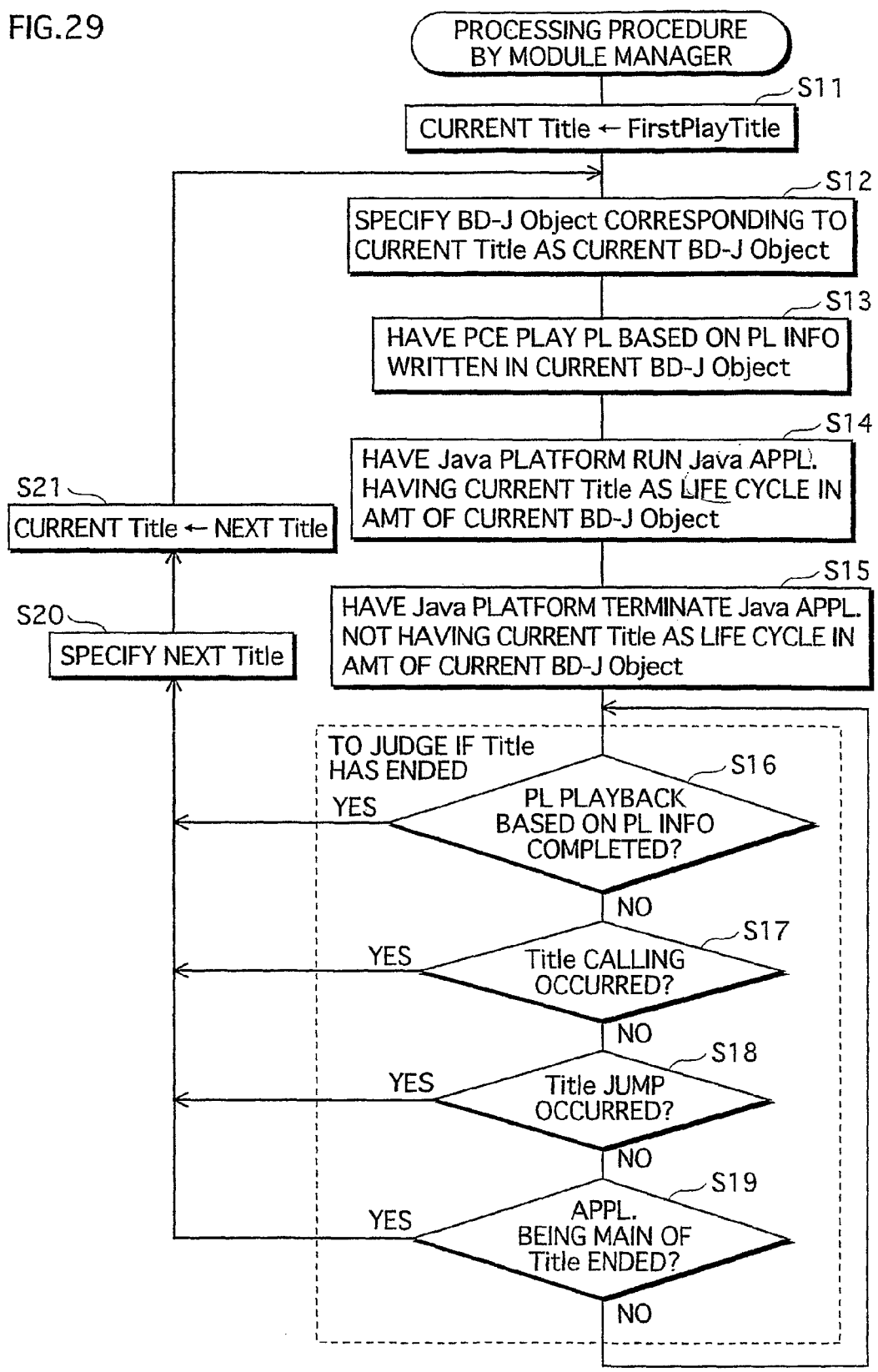
FIG. 29 is a flow chart that shows the processing of Title playback control performed by the module manager 33.

The following describes the details of the playback processing performed by the playback apparatus according to the present invention, with reference to a flow chart. FIG. 29 is a flow chart that shows the processing for Title playback control performed by the module manager 33. This flow chart shows the processing procedure to be executed after a BD-ROM is mounted to a playback apparatus and before it is ejected. After the processing in Step S11 is executed in which the First Play Title specified in the INDEX.BDMV file is set to be a current Title, the loop processing in Steps S12 through S21 is executed.

Out of the loop processing in Steps S12 through S21, the processing in Steps S12 through S15 is a procedure for playing back the current Title. In Step S12, a piece of title information that corresponds to the current Title is obtained from the INDEX.BDMV, and a BD-J object specified in the obtained piece of title information is taken as a current BD-J object. In Step S13, the Playback Control Engine 32 is controlled so that PL playback is performed based on a piece of PlayList information whose reference value is written in the current BD-J object. In Step S14, the Java platform 29b is controlled so that a Java application is run whose identifier is specified in the application management table of the current BD-J object. In Step S15, the Java platform 29b is controlled so that other Java applications are terminated whose identifiers are not specified in the application management table of the current BD-J object.

The processing in Steps S16 through S19 is a procedure for judging whether the Title has ended. It is judged that the Title had ended in the case where one of the following has occurred: the PL playback based on the PlayList is completed (Step S16); a Title calling such as a menu call instruction due to a user operation has occurred (Step S17); a Title jump such as a scenario branching has occurred (Step S18); and the application being the main element of the Title has ended (Step S19).

The processing in Steps S20 and S21 is performed in the case where it is judged that the Title has ended. Depending on which one of the judgments in Steps S16 through S19 is used to confirm the ending of the Title, a next Title is specified (Step S20), and the specified Title is set to be a new current Title (Step S21). As a result of the processing described above, the Title playback is performed between the insertion and the ejection of a BD-ROM.

Figure 30:
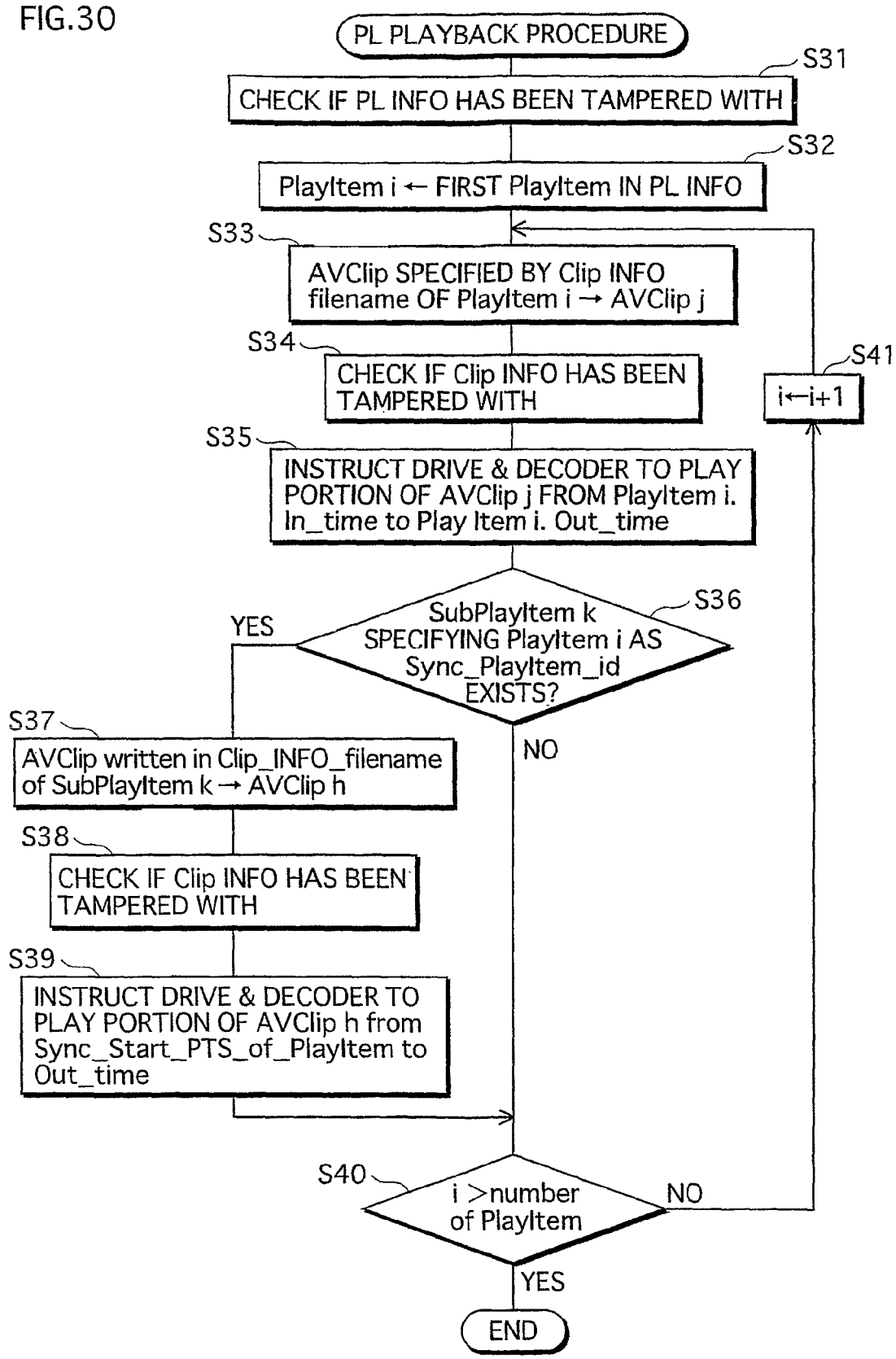
FIG. 30 is a flow chart that shows the processing procedure for PlayList playback processing performed by the Playback Control Engine 32.

The following describes the details of the PlayList playback performed by the Playback Control Engine 32. FIG. 30 is a flow chart that shows a processing procedure for the PlayList playback processing performed by the Playback Control Engine 32. This flow chart shows a processing procedure for playing back from the beginning to the end of an AV clip specified by a PlayList based on a piece of PlayList information instructed by the module manager 33.

First, in the case where an MPLS file which is the substance of the specified piece of PlayList information is a file within the Local Storage that has been mapped based on the merge management information file, it is checked whether the specified filed has been tampered with (Step S31). In the case where the specified file is judged to have been tampered with in Step S31, the procedure exits the flow chart so that the processing is terminated. In the case where the specified file is judged to have not been tampered with, the processing in and after Step S32 will be continued.

After the processing in Step S32 is performed in which the first piece of Play Item information in the PlayList information is set to be a piece of Play Item Information to be processed (hereafter simply referred to as "Play Item information i"), a loop processing in Steps S33 through S41 is executed.

In the loop processing in Steps S33 through S41, the control variable is Variable i. After the processing in Steps S33 through S40 is performed, the control Variable i is incremented (Step S41) until the Variable i exceeds the number of Play Items ("Number Of Play Items").

Out of the loop processing in Step S33 through S41, the processing in Steps S33 through S35 is a processing for playing back the Main Path. In the processing in Step S33, an AV Clip written in the Clip_information_file_name in the Play Item information i is taken as an AV Clip j which serves as a playback target. In the processing in Step S34, in the case where a CLPI file which is the substance of a piece of Clip information that corresponds to the AV Clip j is a file within the Local Storage that has been mapped based on the merge management information file, it is checked whether such a file within the Local Storage has been tampered with. When one or more of such files have been tampered with, the procedure exits the flow chart so that the processing is terminated. In the processing in Step S35, the drive apparatus and the decoder are instructed to play back a portion of the AV Clip j from the PlayItem.In_time to the PlayItem.Out_time.

The processing in Steps S36 through S39 is a procedure for playing back a SubPath. In Step S34, it is judged if there exists a Sub Play Item k that specifies the Play Item information i as a Sync_PlayItem_id. If it does not exist, the procedure advances to Step S40.

If it exists, in the processing in Step S37, an AV Clip written in the Clip_information_file_name of the Sub Play Item k is taken as an AV Clip h. In the processing in Step S38, in the case where a CLPI file which is the substance of the piece of Clip information that corresponds to the AV Clip h is a file within the Local Storage that has been mapped based on the merge management information file, it is checked if such a file within the Local Storage has been tampered with. When such a file has been tampered with, the procedure exits the flow chart so that the processing is terminated. In the processing in Step S39, the drive apparatus and the decoder are instructed to play back a portion of the AV Clip from the Sync_Start_PTS_of_PlayItem to the Out_time, and the procedure advances to Step S40.

The processing described above is repeated for all the pieces of Play Item information that constitute the PlayList information. Thus, the playback of the stream sequence defined by the PlayList information is performed.

It should be noted that the checking of whether the files have been tampered with or not in Step S31, Step S34, and Step S38 is performed with the following procedures, to be more specific:

(a) A hash value for the file to be checked is read from the merge management information file.

(b) A hash value is calculated using the file to be checked.

(c) It is judged that the file has not been tampered with if the values obtained in (a) and (b) are equal. It is judged that the file has been tampered with if the values obtained in (a) and (b) are not equal to each other.

It is acceptable to omit the checking for tampering of a stream file (xxxxx.M2TS). The reason is because a stream file normally has a larger file size than other files and may take an extremely long time to calculate a hash value depending on the file size. In addition, a stream file itself is often encrypted with a key recorded on a BD-ROM and is more difficult to tamper with, compared to other files.

The following describes the details of the procedure for constructing a Virtual Package performed by the playback apparatus according to the present invention, with reference to a flow chart. Construction of a Virtual Package is divided into three stages such as downloading of the files constituting the Virtual Package by a Java application, Preparing by the Virtual File System unit 38, and Updating by the Virtual File System unit 38.

Figure 31:
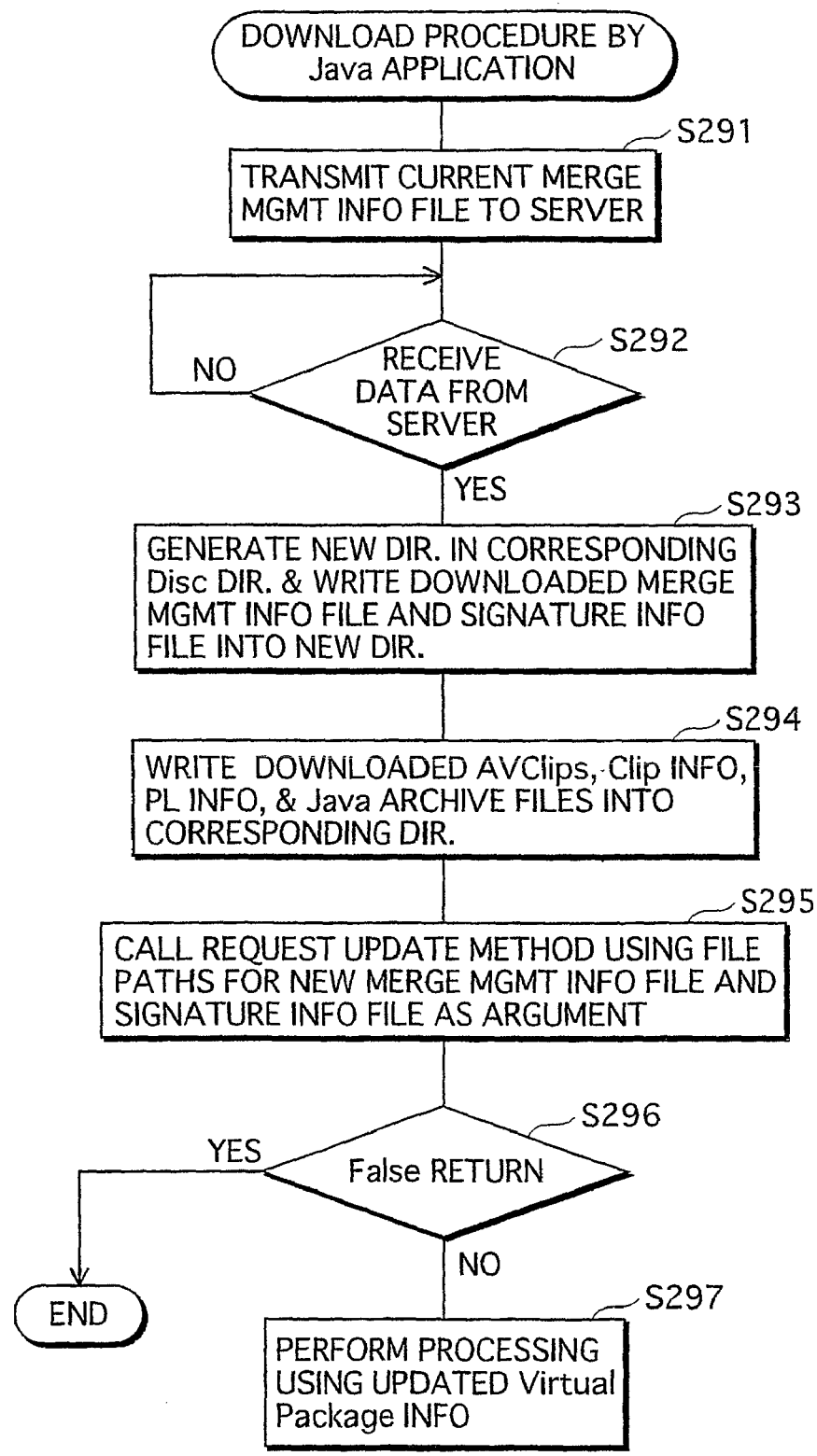
FIG. 31 is a flow chart that shows the procedure for downloading files that constitute a Virtual Package, to be performed by a Java application.

First, description is provided in detail for the procedure for downloading the files that constitute the Virtual Package, to be performed by a Java application. FIG. 31 is a flow chart that shows the procedure for downloading the files that constitute the Virtual Package, to be performed by a Java application.

At first, a Java application requests that the files should be transmitted by sending, to the server, a merge management information file that is recorded in a directory within the Local Storage that corresponds to the disc ID of the BD-ROM (Step S291). In Step S292, the Java application waits until the files are received from the server. It should be noted that sometimes no merge management information file is recorded in the Local Storage, for example, when the BD-ROM is mounted to the playback apparatus for the first time. In such a case, it is acceptable to have an arrangement wherein, in the processing in Step S291, the Java application requests the server that the files should be transmitted by notifying the disc ID of the BD-ROM to the server.

When data of the files is received from the server during the standby in Step S292, the files are recorded into the Local Storage in Steps S293 and S294. In Step S293, a new directory is generated in a directory that corresponds to the disc ID and the received merge management information file and signature information file are recorded into the new directory. In Step S294, the AV Clip, the Clip information, the PlayList information, and the Java archive files that have been downloaded are written into the directory that corresponds to the disc ID.

When the recording of the files into the Local Storage has been completed, the Java application calls an update request method using the file paths of the merge management information file and the signature information file in the new directory as an argument (Step S295). In Step S296, the Java application waits for a returned value from the method.

In the case where the returned value is FALSE (Step S296: YES), the construction processing of the Virtual Package is discontinued. In the case where the returned value is not FALSE (Step S296: NO), the Virtual File System unit 38 goes into a Prepared state, and the Virtual Package is updated at the time when the Title is switched (Step S297).

Figure 32:
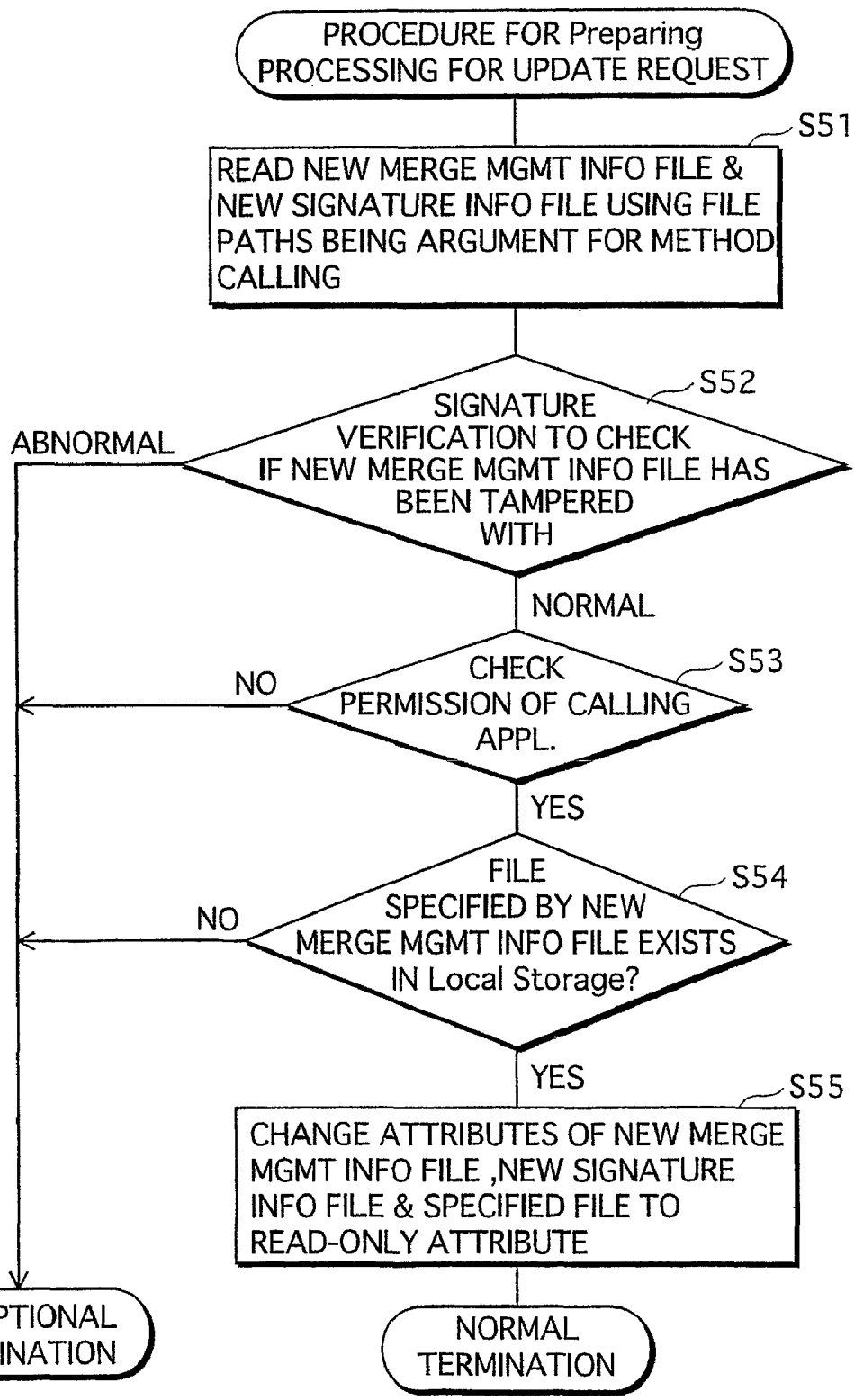
FIG. 32 is a flow chart that shows the Preparing processing performed by the Virtual File System unit 38.

The following describes in detail the Preparing processing to be performed by the Virtual File System unit 38. FIG. 32 is a flow chart that shows the Preparing processing to be performed by the Virtual File System unit 38.

This flow chart shows a processing procedure to be performed by the Virtual File System unit 38 which has shifted into a Preparing state in the case where an upload request method has been called.

After the processing in Step S51 is performed in which the merge management information file and the signature information file are read using the file paths that serve as an argument for calling the method, the processing in Steps S52 through S54 is performed in which it is judged whether or not it is acceptable to construct a Virtual Package. In Step S52, it is judged whether or not the merge management information file read in Step S51 has been tampered with. In the case where the merge management file is judged to have been tampered with, construction of a Virtual Package will not be permitted.

To be more specific, the following procedure is performed:

(a) The encrypted hash value in the signature information file is decrypted using a public key in a merge certificate held by the playback apparatus.

(b) The hash value of the merge management information file is calculated.

(c) It is judged that the merge management information file has not been tampered with and is authentic if the value obtained through the decryption process in (a) is equal to the value calculated in (b). It is judged that the merge management information file has been tampered with and is not authentic if the value obtained through the decryption processing (a) is not equal to the value calculated in (b).

Step S53 is a processing for judging whether or not the Java application that has called the method is permitted to update the Virtual Package. In the case where the caller is not permitted to update the Virtual Package, construction of the Virtual Package will not be permitted.

Step S54 is a processing for judging whether or not the file specified by the merge management information file actually exists in the Local Storage. In the case where the specified file does not exist, construction of the Virtual Package will not be permitted.

In the case where the judgment result in one of Steps S52 through S54 is that construction of the Virtual Package will not be permitted, a returned value "FALSE" is returned to the Java application that has called the method, and the processing is terminated.

On the other hand, in the case where the judgment result in one of Steps S52 through S54 is that construction of the Virtual Package will be permitted, the processing in Step S55 is to be performed.

Step S55 is a processing for reading the merge management information file, the signature information file, and the files specified by the merge management information file and changing their attributes to the Read-Only attribute. Thus completes the description of the details of the Preparing processing.

It should be noted that in the case where the judgment result in one of Steps S52 through S54 is that construction of the Virtual Package is not permitted, it is acceptable to have an arrangement wherein the volume management information of the BD-ROM is provided for the Java application that has called the update request method, as Virtual Package information, and the processing of the update request method is terminated. With this arrangement, the playback apparatus is able to inhibit construction of the Virtual Package containing the files in the Local Storage if the merge management information file has been tampered with and is in an illegitimate state, and the playback apparatus is also able to access the files on the BD-ROM in the same manner as to access the Virtual Package.

Figure 33:
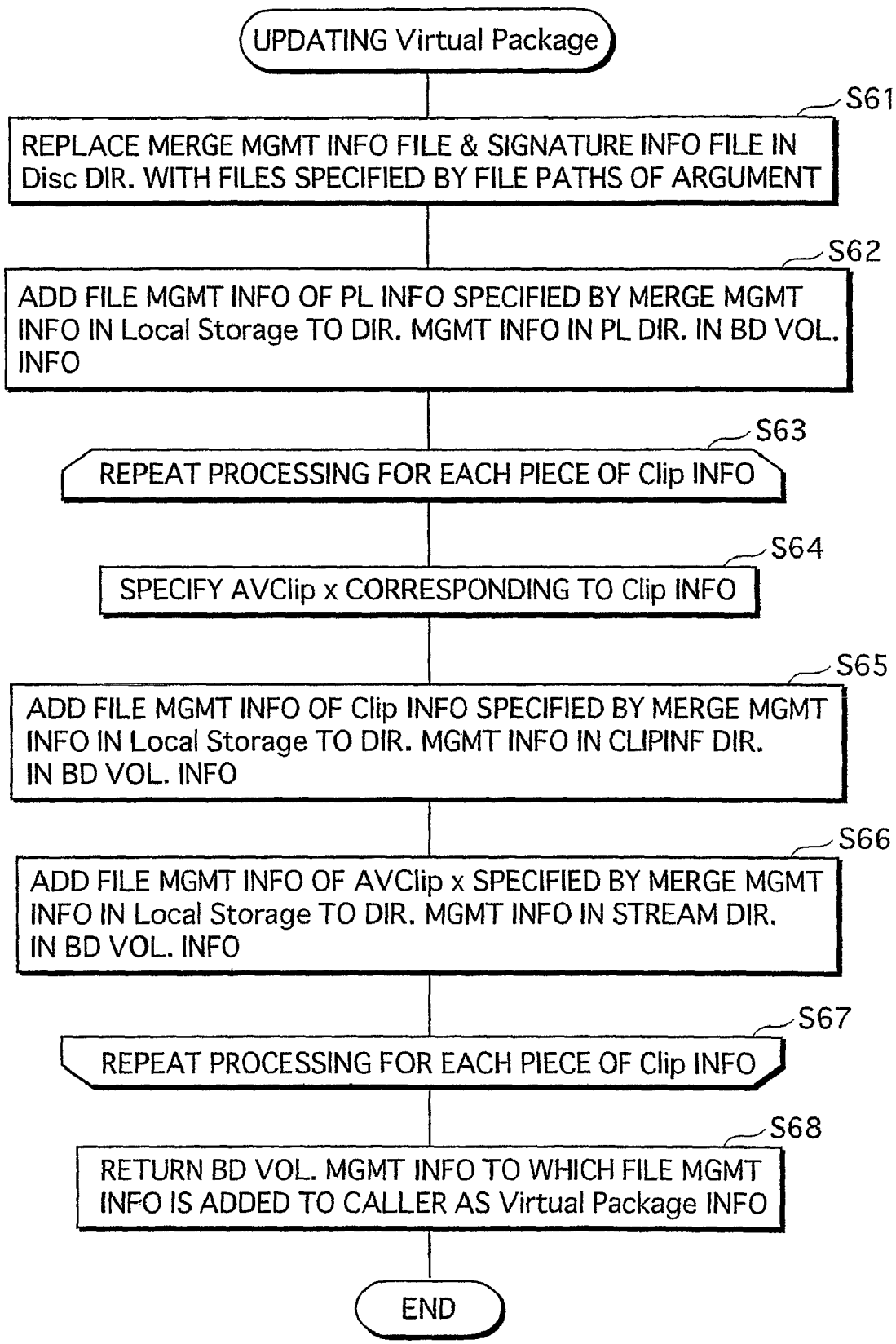
FIG. 33 is a flow chart that shows the Updating processing performed by the Virtual File System unit 38.

The following describes in detail the Updating processing performed by the Virtual File System unit 38. FIG. 33 is a flow chart that shows the Updating processing to be performed by the Virtual File System unit 38.

The flow chart shows a processing procedure to be performed by the Virtual File System unit 38 in the case where a Title Change occurs after the Preparing processing is completed due to the update request method.

First, the merge management information file and the signature information file specified by the file paths being the argument of the method are moved to the directory within the Local Storage that corresponds to the disc ID of the BD-ROM currently being played back. At this time, in the case where a merge management information file and a signature information file already exist in the directory being the destination of the moving, the existing files are overwritten with the new merge management information file and the signature information file (Step S61). Subsequently, the file management information of a piece of PlayList information specified by the merge management information file within the Local Storage 18 is added to the directory management information in the PLAYLIST directory within the BD volume management information (Step S62).

Subsequently, the loop processing in Step S63 through S67 is performed. In this loop processing, the processing in Steps S64 through S66 is repeated for each of the pieces of Clip information that are stored in the Local Storage 18 (Step S63, Step S67).

In this loop processing, one of the pieces of Clip information specified by the merge management information file is taken as Clip information x, and the file management information of the Clip information x is added to the directory management information of the CLIPINF directory within the BD volume management information (Step S64). Further, AV Clip x that corresponds to the Clip information x is specified (Step S65) and the file management information of AV Clip x is added to the directory management information of the STREAM directory within the BD volume management information (Step S66).

When this processing mentioned above is repeated for all the pieces of Clip information and all the AV Clips, the file management information for the pieces of Clip information and the AV Clips will be added to the BD volume management information. Such BD volume management information obtained as a result of this addition will be taken as Virtual Package information. Such Virtual Package information is provided for the Java application that has called the update request method (Step S68), and the processing will be completed. Thus completes the description of the details of the Updating processing.

As explained so far, according to the present embodiment, authenticity of the merge management information is verified based on signature information. In the case where the merge management information cannot be confirmed to be authentic, constructing a Virtual Package with the use of the files recorded in the Local Storage will be avoided. With this arrangement, even if some data within the Local Storage has directly been tampered with while construction of the Virtual Package is not performed, it is possible to avoid a situation where the tampered illegitimate data is executed and played back in combination with the data recorded on the Read-Only recording medium. Thus, there is no possibility of suffering from disadvantage due to illegitimate use of the data.

Further, when a Virtual Package is constructed, the attributes of the files within the Local Storage, which is a readable/writable recording medium, are locked into the Read-Only attribute; therefore, it is possible to prevent the files from being rewritten due to an unprepared file access from an application after the Virtual Package has been constructed. With this arrangement, it is possible to avoid a situation where there is discordance between the Virtual Package information and the substance of the files within the Local Storage.

Second Embodiment

The second embodiment relates to an improvement for when a Title calling is performed. A Title calling is to temporarily suspend the playback of a current Title, to play back the called Title, and after the execution of the called Title is finished, to resume the playback of the originally-played Title.

Since resuming the playback of the originally-played Title is set forth as a premise, when a Title calling is performed, the Playback Control Engine 32 saves system parameters that are stored in the PSRs and are used for playback control into the backup PSRs, and after the called Title is played back, the Playback Control Engine 32 restores the parameters saved in the backup PSRs into the PSRs.

The following is a list of the system parameters stored in the PSRs. PSR (0) to PSR (12) store therein system parameters that indicate the playback state. PSR (13) to PSR (19) store therein system parameters that are set by the player as preferences. PSR (20) to PSR (32) are PSRs for backup.

PSR (0): IG Stream Number
PSR (1): Audio Stream Number
PSR (2): PG Stream/Text Subtitle Stream Number
PSR (3): Angle Number
PSR (4): Title Number currently being played back
PSR (5): Chapter Number currently being played back
PSR (6): PlayList Identifier currently being played back
PSR (7): Play Item Identifier currently being played back
PSR (8): Playback Time Information
PSR (9): Navigation Timer
PSR (10): Selection Key Information
PSR (11): Current Page Identifier in IG Stream
PSR (12): User Style Identifier in PG stream and Text Subtitle Stream
PSR (13): Parental Level
PSR (14): Subtitle Support Information
PSR (15): Player Setting Value (Audio)
PSR (16): Language Code for Audio Stream
PSR (17): Language Code for PG Stream and Text Subtitle Stream
PSR (18): Language Code for Menu
PSR (19): Version Information of Player
PSR (20): Backup for PSR (0)
PSR (21): Backup for PSR (1)
PSR (22): Backup for PSR (2)
PSR (23): Backup for PSR (3)
PSR (24): Backup for PSR (4)
PSR (25): Backup for PSR (5)
PSR (26): Backup for PSR (6)
PSR (27): Backup for PSR (7)
PSR (28): Backup for PSR (8)
PSR (29): Backup for PSR (9)
PSR (30): Backup for PSR (10)
PSR (31): Backup for PSR (11)
PSR (32): Backup for PSR (12)

Here, if Virtual Package information goes through an update after a Title calling is performed, there will be some differences in the Virtual Package information before and after the Title calling.

When a Title (i.e. the calling Title) that calls the other Title (i.e. the called Title) is to be resumed, the Virtual Package Information has already been changed; therefore, there is a possibility that an error may occur when an attempt is made to play back the calling Title using the backup value, since the backup value remains the same as before. Thus, when the Java application requests that the Virtual Package information should be updated, this problematic situation will be avoided by clearing the Backup PSRs. However, there may be some cases where the change does not have any influence depending on the contents of the merge management information file in the Virtual Package information; therefore, it is acceptable to leave it up to the Java application whether or not the values in the system parameters should be cleared.

Figure 34:
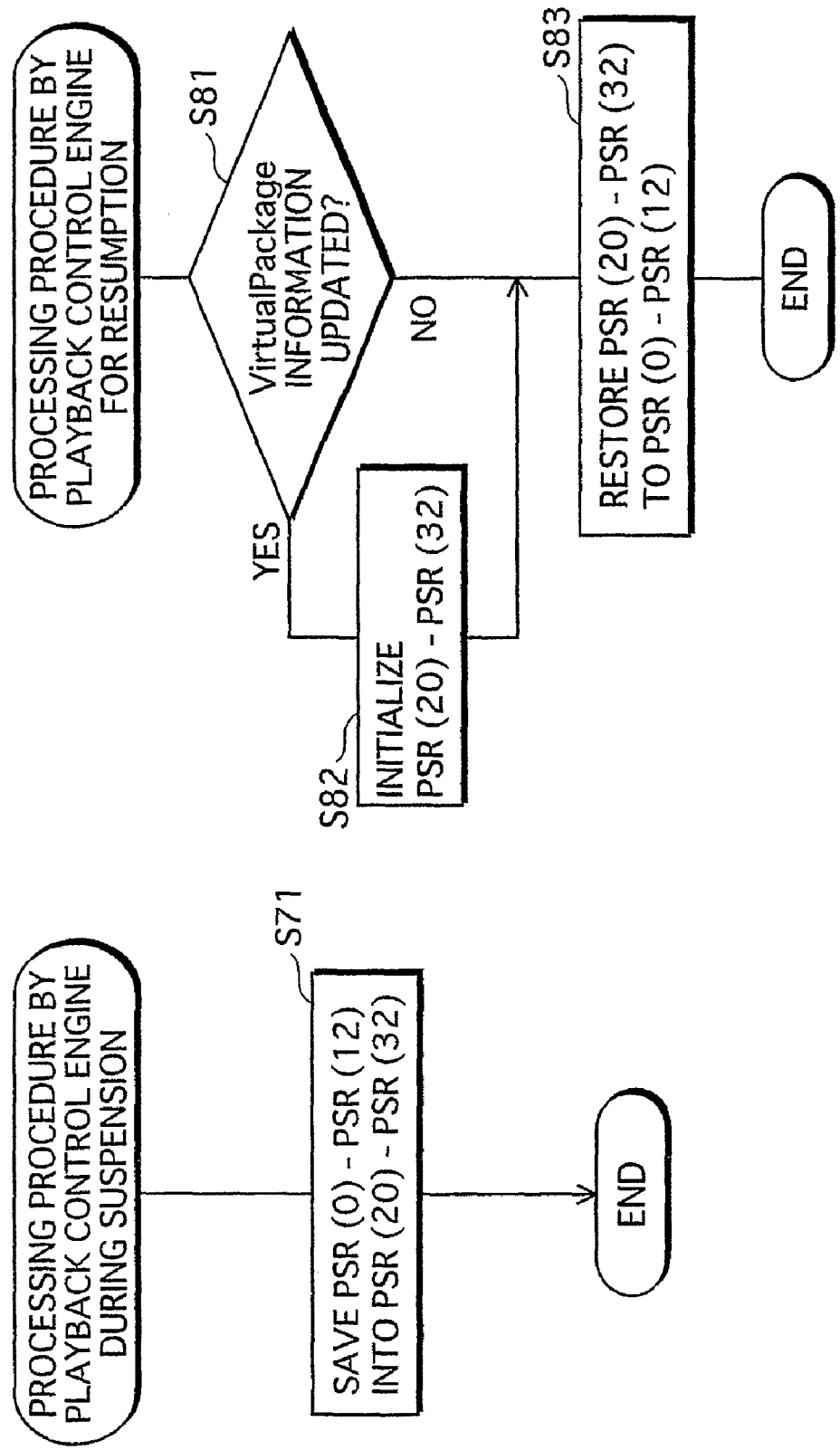
FIG. 34 is a flow chart that shows the processing procedure performed by the Playback Control Engine when the playback of a current Title is temporarily suspended due to a Title calling, and the processing procedure to be performed by the Playback Control Engine when the playback of the originally-played Title is resumed.

FIG. 34 is a flow chart that shows the processing procedure performed by the Playback Control Engine when the playback of a current Title is temporarily suspended in order to perform a Title calling, and the processing procedure to be performed by the Playback Control Engine when the playback of the originally-played Title is resumed.

In order to temporarily suspend the playback of the current Title, SPRM (0) to SPRM (12) are saved into SPRM (20) to SPRM (32) in Step S71.

When the playback of the originally-played Title is resumed after the playback of the called Title is finished, it is judged whether or not the Virtual Package information has been updated during the suspension in Step S81.

In the case where the Virtual Package information has not been updated, SPRM (20) to SPRM (32) are restored into SPRM (0) to SPRM (12) (Step S83). In the case where the Virtual Package information has been updated, SPRM (20) to SPRM (32) are initialized (Step S82) and the processing in Step S83 is to be performed.

As explained so far, according to the present embodiment, in the case where the Virtual Package information is updated after a Title calling is performed, the contents of the backup PSRs are initialized; therefore, there is no possibility that the Playback Control Engine performs wrong playback processing based on the PSRs before the Title calling. Thus, it is possible to realize stable operation of the Playback Control Engine.

It should be noted that it is acceptable to have an arrangement wherein, when the Virtual Package information is updated, the values of the system parameters are forcefully cleared on the system side, instead of leaving it up to the Java application whether the values in the backup PSRs should be cleared.

Third Embodiment

In the first embodiment, the description has been provided for the configuration in which a directory that is within the Local Storage and corresponds to the organization ID and the disc ID of a BD-ROM is used as a place for storing the files that constitute a Virtual Package. In the third embodiment, description is provided for a configuration in which a Virtual Package is constructed with files recorded in an arbitrary directory within the Local Storage.

Such construction of a Virtual package is realized through a Java application's specifying a disc ID and a directory path in the Local Storage in which the files to be used for the construction of the Virtual Package are recorded as an argument for an update request method.

In the playback apparatus according to the third embodiment, the Virtual File System unit 38 holds a Virtual Package management table. FIG. 35 shows an example of a Virtual Package management table. The Virtual Package management table shows disc Ids identifying BD-ROMs in correspondence with paths indicating directories in the Local Storage specified in update request method. When generating Virtual Package information in response to an update request, the Virtual File System unit 38 is able to specify the storing destinations of files to be used in the Virtual Package, according to the information registered in the Virtual Package management table.

Figure 36:
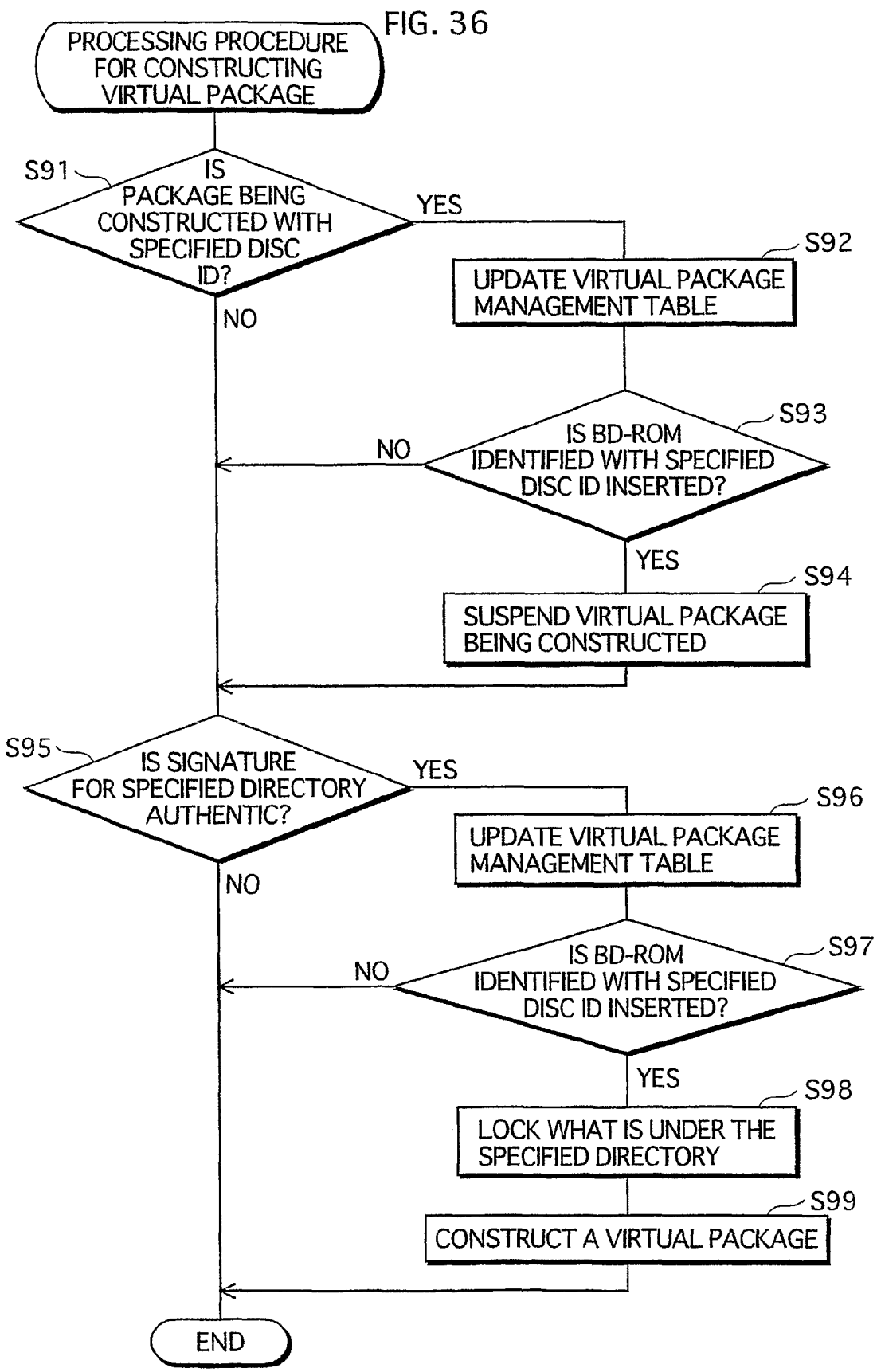
FIG. 36 is a flow chart that shows the processing procedure for construction of a Virtual Package according to the third embodiment.

The following explains the Virtual Package construction processing performed by the Virtual File System unit 38 according to the present embodiment. FIG. 36 is a flow chart that shows the processing procedure of Virtual Package construction performed by the Virtual File System unit 38 according to the third embodiment.

The flow chart shows a processing procedure performed by the Virtual File System unit 38 in the case where a Java application has issued an update request method.

In Step S91, it is judged whether the disc ID specified as an argument for the update request method has already been registered in the Virtual Package management table.

In the case where the specified disc ID has already been registered in the Virtual Package management table (Step S91: YES), after the processing procedure in Steps S92 through S94 is executed, the processing procedure in Steps S95 through S99 is executed. On the other hand, in the case where the judgment result is that the specified disc ID has not been registered in the Virtual Package management table, the procedure advances to execute the processing procedure in Steps S95 through S99.

In Step S92 through S94, the entry with the specified disc ID is deleted from the Virtual Package management table (Step S92), and it is judged whether or not the BD-ROM identified with the specified disc ID is inserted in the BD-ROM drive 1 (Step S93). In the case where the BD-ROM identified with the specified disc ID is inserted (Step S93: YES), the procedure advances to Step S94. In other cases (Step S93: NO), the procedure advances to Step S95. In Step S94, the construction of the Virtual Package in correspondence with the specified disc ID is suspended.

Step S95 is a processing procedure for judging whether or not the signature for the specified directory is authentic or not. The processing for judging whether or not the signature for the specified directory is authentic is, in the present example, (a) to check if the merge management information file under the specified directory has not been tampered with, and then (b) to check if the files specified by the merge management information file have not been tampered with.

In order to confirm that the merge management information file has not been tampered with, the following procedure is performed:

(a-1) A hash value is calculated for the merge management information file.

(a-2) The encrypted hash value in the signature information file under the specified directory is decrypted using a public key in the merge certificate held by the playback apparatus.

(a-3) The calculated hash value is compared with the decrypted signature value, and if the values are the same, the merge management information file is confirmed to have not been tampered with.

In order to confirm that the files specified by the merge management information file have not been tampered with, the following procedure is performed:

(b-1) A hash value is calculated for each files specified by the merge management file.

(b-2) The calculated hash value is compared with the hash value written in the merge management information file and, if the values are the same, each file specified by the merge management information file is confirmed to have not been tampered with.

As a judgment result in Step S95, in the case where the signature for the specified directory is authentic (Step S95: YES), the procedure advances to Step S96. In other cases, the procedure is terminated.

In Step S96, a new entry is added to the Virtual Package management table using the disc ID and the directory path specified as the argument for the update request method. In Step S97, it is judged whether a BD-ROM identified with the specified disc ID is inserted in the BD-ROM drive 1. In the case where the BD-ROM identified with the specified disc ID is inserted (Step S97: YES), the procedure advances to Step S98. In other cases (Step S97: NO), the processing is terminated. In Step S98, the contents under the directory in the Local Storage whose path is specified as the argument is read, and the attribute is set to be the Read-Only attribute. In Step S99, a Virtual Package is constructed with the directory in the Local Storage whose file path is specified and the BD-ROM.

Thus completes the description of the processing procedure for constructing a Virtual Package according to the third embodiment.

It should be noted that the processing procedure described above is one for constructing a Virtual Package in response to an update request; however, as for a processing procedure for constructing a Virtual package in a case where a BD-ROM is newly inserted into a playback apparatus, a directory path corresponding to the disc ID of the inserted BD-ROM is searched for from the Virtual Package management table, and the processing procedure in and after Step S95 in FIG. 36 is executed using the detected directory path as a specified directory path so that a Virtual Package can be constructed.

Further, during the processing for constructing a Virtual Package in response to an update request, as the processing for judging whether or not the signature of the specified directory is authentic in Step S95, firstly (a) it is checked if the merge management information file under the specified directory has not been tampered with, and then (b) it is checked if the files specified by the merge management information file have not been tampered with; however, as for a processing procedure for constructing a Virtual package in a case where a BD-ROM is newly inserted into a playback apparatus, it is acceptable to judge whether the signature of the specified directory is authentic in Step S95 only by the processing of (a) checking if the merge management information file under the specified directory has not been tampered with, so that the Virtual Package is constructed through the processing in Steps S96 through S99. In such a case, when the Java application makes an access request for the files whose file paths are written in the merge management information file, the processing of (b) checking if the files specified by the merge management information file have not been tampered with is performed. Only in the case where the files are confirmed to have not been tampered with, the Java application is permitted to access the specified files. With this arrangement wherein part of the calculation processing of hash values is executed at the time when the files are accessed instead of at the time when the Virtual Package is constructed, the amount of the processing required to be performed after a BD-ROM is inserted and loaded is reduced. Consequently, it is possible to achieve an effect of making the activation faster.

The following describes the operation to be performed in the case where a Java application specifies a locator for the Local Storage and access a file for writing data into the file, while a Virtual Package is being constructed.

Figure 37:
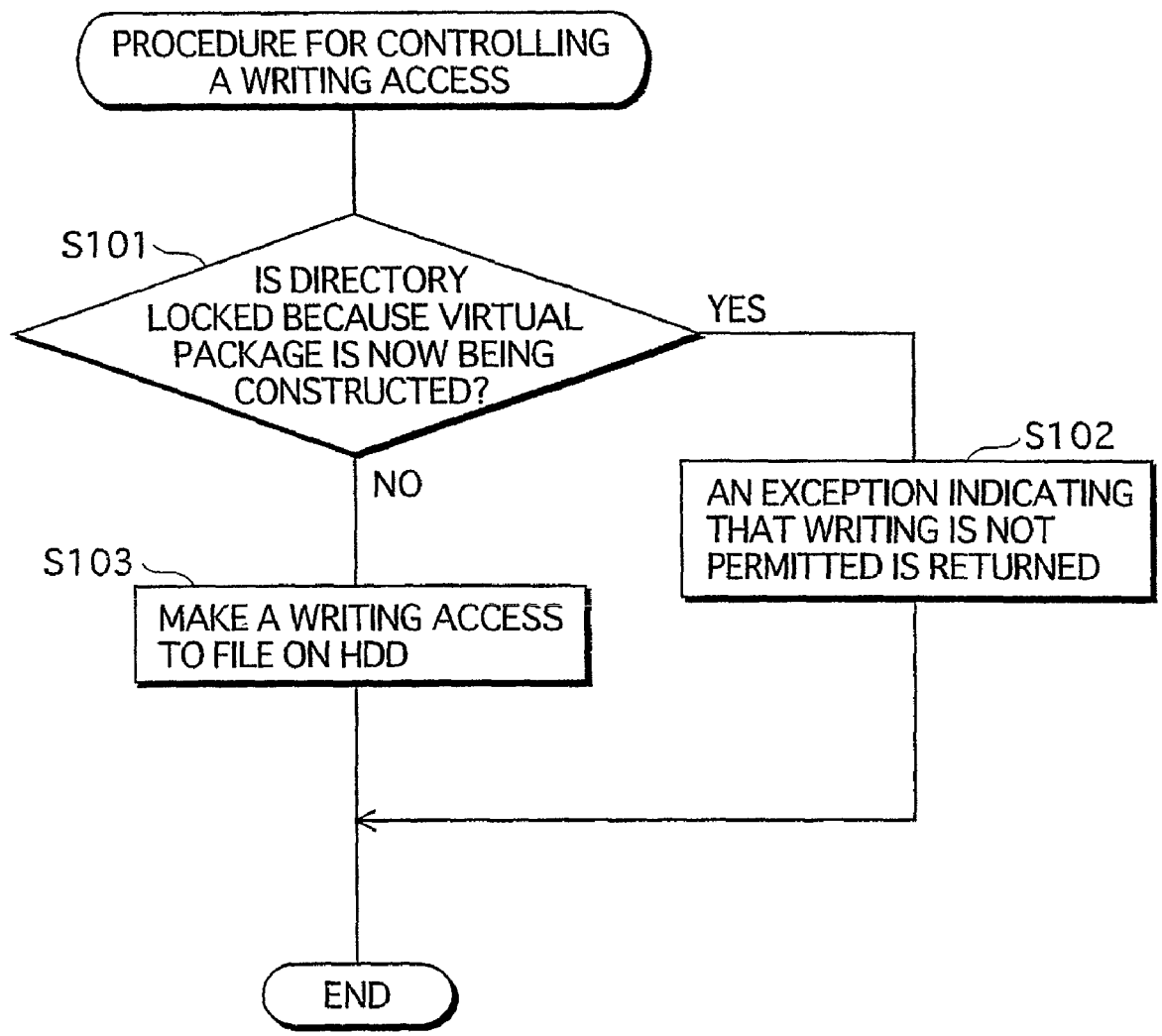
FIG. 37 is a flow chart that shows a processing procedure of an API that controls a writing access to a file.

FIG. 37 is a flow chart that shows a processing procedure of an API for controlling the writing access to a file. When a Java application requests a writing access with specification of a Local Storage locator, it is judged whether or not the attribute of the directory is set to be the Read-Only attribute, because a Virtual Package is now being constructed (Step S101). In the case where the attribute of the directory containing the specified file is locked in the Read-Only attribute (Step S101: YES), an exception indicating that writing into the file is not permitted is returned to the Java application, and the processing is terminated (Step S102). In other cases (Step S101: NO), the procedure advances to Step S103.

In Step S103, a processing is performed for making a writing access to the files in the Local Storage.

According to the processing procedure described above, if the file specified as the access destination is the file constituting the Virtual package and also the Virtual Package is being constructed when the access request is made, it is not permitted to access the file.

Figure 38:
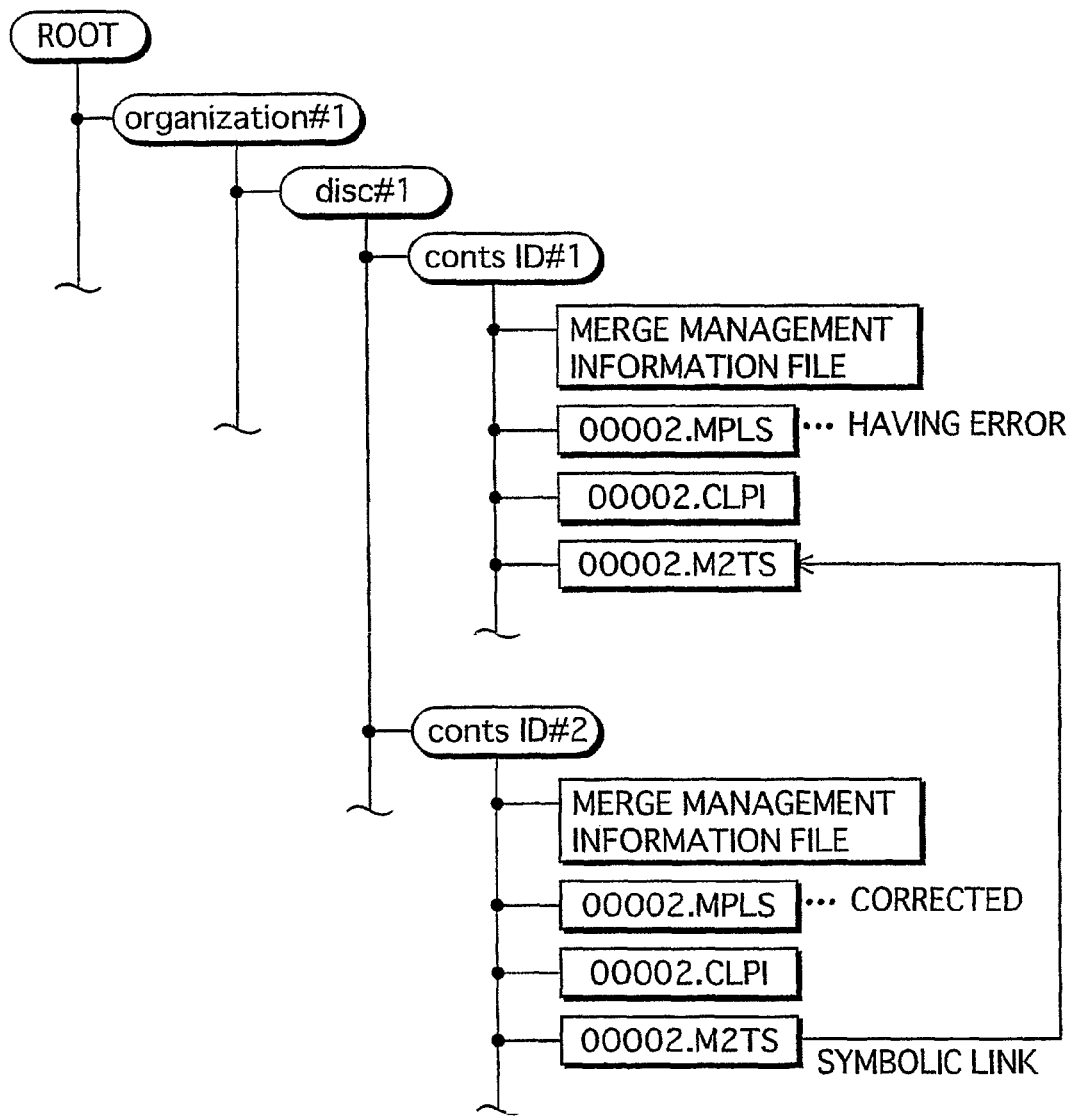
FIG. 38 shows, in the case where one of the files constituting a Virtual Package has an error, how a correction file in which the error is corrected is generated.

Here, even if a file under the contsID#1 directory shown in FIG. 38 has an error while a Virtual Package is being constructed with specification of the contsID#1 directory, since the attribute of the contsID#1 directory is set to be the Read-Only attribute while the Virtual Package is being constructed, it is not possible to correct the error of the file.

In such a situation, a Java application having a file correction function generates a directory called contsID#2 using an API that provides a file I/O function, as shown in FIG. 38, and copies the files below the contsID#1 directory into the contsID#2 directory so as to correct the error in the file. At this time, if there is no change in the contents of the M2TS file, which is for AV data, it is acceptable to generate a symbolic link for the M2TS file under the contsID#1 directory, instead of generating the duplicated files under the contsID#2 directory.

After generating the files under the contsID#2, the Java application issues an update request method using the path ("ROOT/organization#1/disc#1/contsID#2" in the example shown in FIG. 38) for the contsID#2 directory as an argument.

As a result, according to the flow chart shown in FIG. 36, the construction of the Virtual Package using the files under the contsID#1 directory is suspended, and then a Virtual Package is constructed using the files under the contsID#2 directory. When a new Virtual Package has been constructed, the attributes of the contsID#2 and thereunder within the Local Storage are set to be the Read-Only attribute.

It should be noted that although a symbolic link is used in the present embodiment, it is acceptable to utilize a mechanism of indirect reference where the contents of the "ROOT/organization#1/disc#1/contsID#2/00002.M2TS" file is a character string such as " . . . /contsID#1/00002.M2TS".

As explained so far, according to the present embodiment, it is possible to construct a Virtual Package with specification of an arbitrary directory with in the Local Storage. Further, in the case where a Virtual Package is constructed by merging files recorded on a plurality of recording media, it is possible to prohibit rewriting of the files during the construction of the Virtual Package by having an arrangement wherein the attributes of the files stored in the Local Storage, which is a readable/writable recording medium, are locked in the Read-Only attribute. Thus, it is possible to prevent an error that may be caused by an illegitimate alteration in the files made by the application itself or other applications.

Further, even if a substance file is tampered with while no Virtual Package is being constructed, it is possible to detect tampering of the substance file by judging whether or not the signature is authentic, and to avoid having a Virtual Package constructed. Thus, it is possible to prevent a malfunction that may be caused by use of an illegitimate file, before it happens.

It should be noted that the present embodiment includes the processing in Step S95 in which it is judged whether the signature of the specified directory is authentic as a criterion judgment to be used when a Virtual Package is constructed; however, it is acceptable to construct a Virtual Package without making judging on the authenticity of the signature.

It should be noted that, in the present embodiment, after a Virtual Package has been constructed, the attributes of the specified directory and thereunder in the Local storage are locked in the Read-Only attribute; however, it is acceptable to have an arrangement wherein the attributes of the directories and the files positioned under specified directory are also recursively set to be the Read-Only attribute.

It should be noted that in the present embodiment, when a Virtual Package is constructed, the path in the Local Storage such as "ROOT/organization#1/disc#1/contsID#1" is specified as the argument for the update request method; however, it is acceptable to have an arrangement wherein only a contsID is specified so that an organizationID and a disc ID are obtained from the BD-ROM.

Fourth Embodiment

In the third embodiment, the description is provided for the configuration in which alteration of the files that constitute a Virtual package and are recorded in the Local Storage is prevented by setting the attribute of the directory specified as the argument for the update request method to be the Read-Only attribute so that the situation is avoided where there is discordance between Virtual Package information and the actual directory-file structure within the Local Storage.

In the fourth embodiment, an improvement is discussed by which it is possible to make a writing access to the files within the Local Storage that constitute a Virtual package, while the situation is avoided where there is discordance between the Virtual Package information and the actual directory-file structure in the Local Storage.

Figure 39:
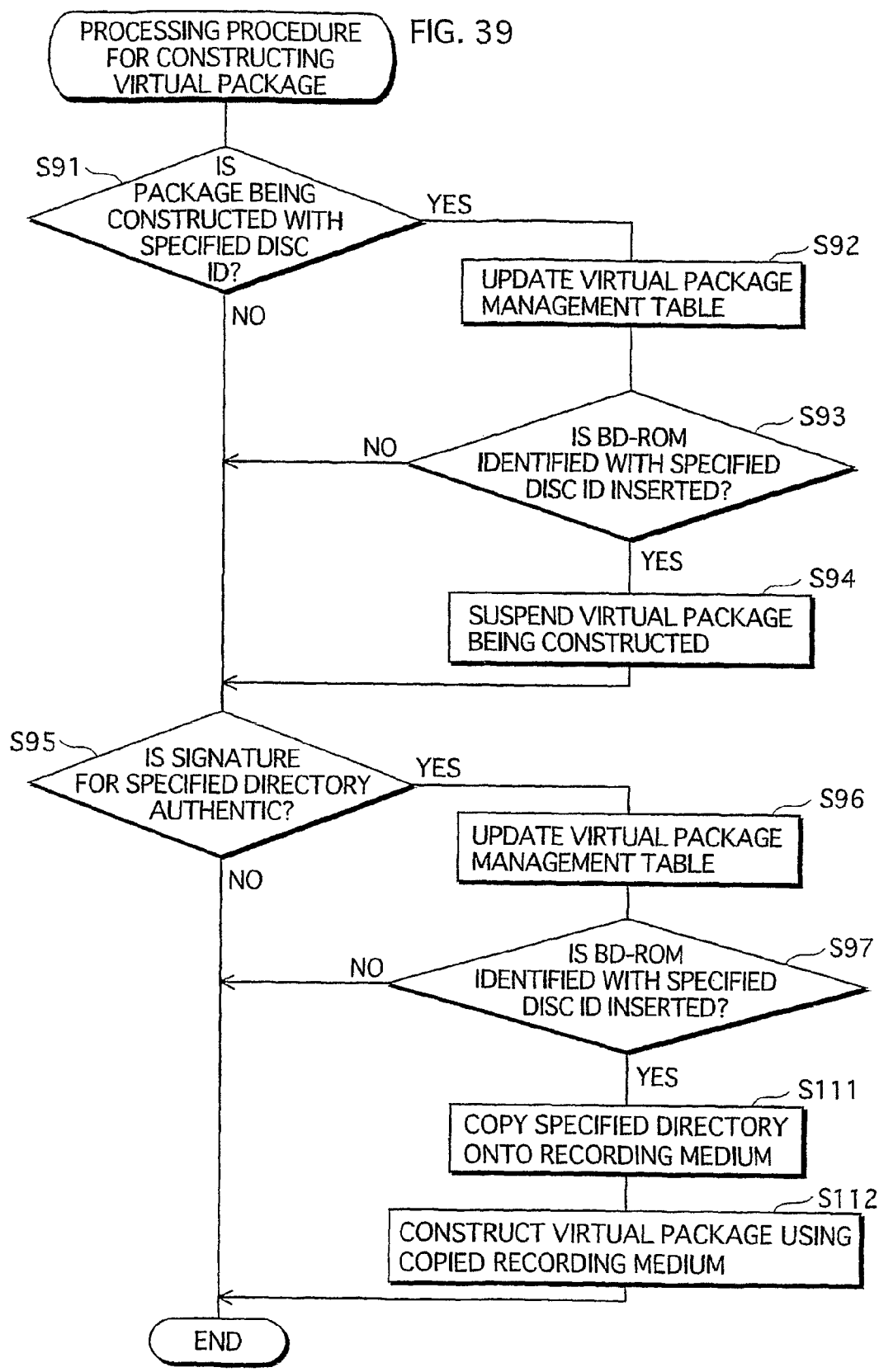
FIG. 39 is a flow chart that shows the processing procedure for construction of a Virtual Package according to the fourth embodiment.

FIG. 39 is a flow chart that shows the processing procedure for constructing a Virtual Package according to the fourth embodiment. The difference between this flow chart and the flow chart shown in FIG. 36 lies in that Steps S98 and S99 are changed to Steps S111 and S112, respectively. In Step S111, the directory and thereunder that are within the Local Storage and are specified as the argument for the update request method are copied onto another recording medium. In Step S112, a Virtual Package is constructed using the directory and thereunder that have been copied onto said another recording medium and the BD-ROM. Thus completes the description of the processing procedure for constructing a Virtual Package.

Figure 40:
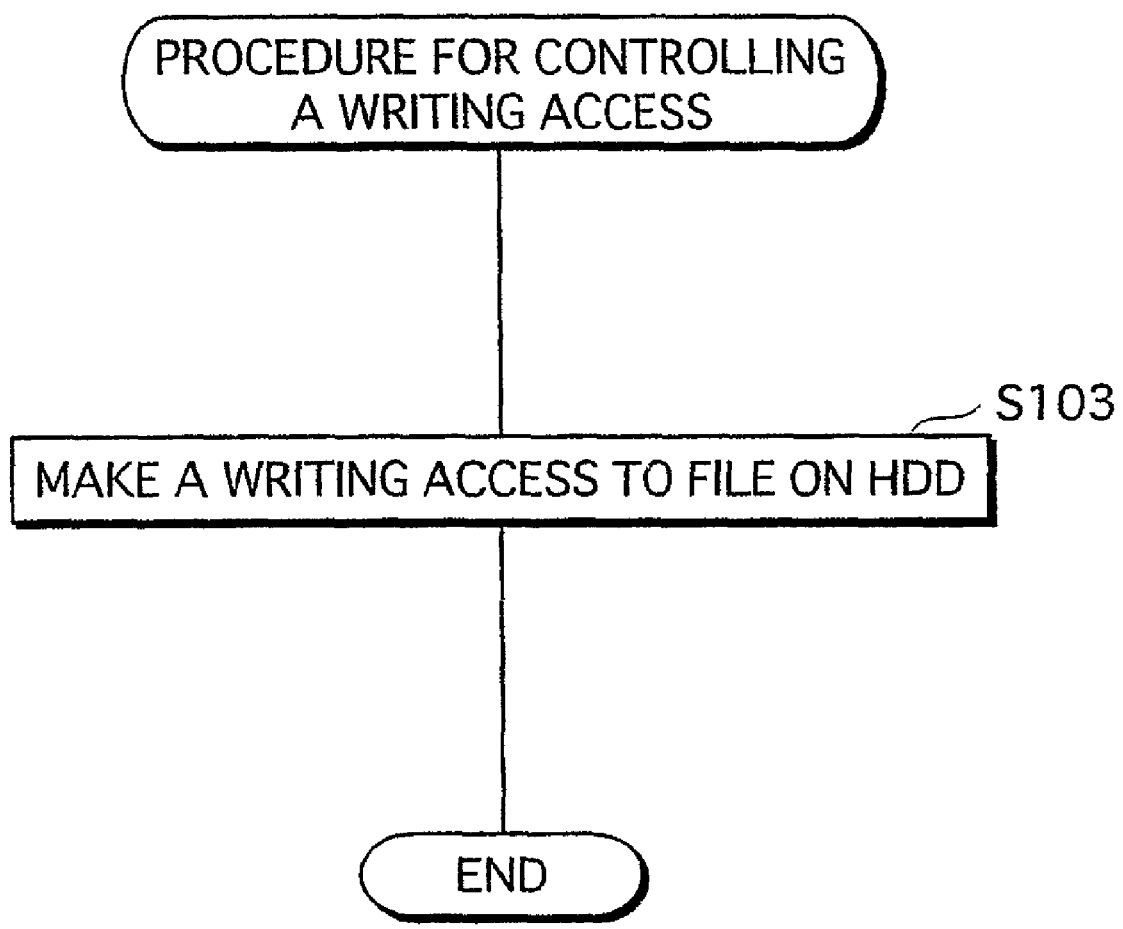
FIG. 40 is a flow chart that shows the processing of API which provides a file I/O function in the case where a writing access is made to a file within the Local Storage after a Virtual Package has been constructed.

The following describes the processing procedure for a writing file access made by a Java application. FIG. 40 is a flow chart that shows the processing of API which provides a file I/O function in the case where a writing access is made to a file within the Local Storage after a Virtual Package has been constructed. The difference between this flow chart and the flow chart shown in FIG. 37 lies in that Steps S101 and S102 are deleted. When a writing access to a file within the Local Storage is requested with specification of Local Storage locator, the writing access is made to the file in the Local Storage in Step S103, and the processing is completed.

Thus completes the description of the processing procedure for the writing access to a file by an application.

As explained so far, according to the present embodiment, when a Virtual Package is constructed by merging files recorded on a plurality of recording media, the files within the Local Storage, which is a readable/writable recording medium, is copied onto another recording medium, even if the substance file within the Local Storage is rewritten while the Virtual Package is being constructed, the Virtual Package refers to the file that has been copied onto the recording medium and that reflects the state before the rewriting. Accordingly, even if the application itself or other applications performs an illegitimate file alteration, it is possible to prevent malfunctions that may be caused.

It should be noted that in the present embodiment the copying destination of the files in the Local Storage is another recording medium; however, it is acceptable to have an arrangement wherein the files are copied into a directory within the Local Storage that cannot be directly referenced from Java applications or a directory that may be accessed for reading only.

It should be noted that in the present embodiment, the specified directory and thereunder in the Local storage are copied onto another recording medium; however, the size of a file that has AV streams and the like stored is large, and copying takes time and also the storage area of the recording medium is occupied. In order to cope with this situation, it is also acceptable to use a symbolic link for such a file having a large size, as shown in the example in FIG. 38.

Fifth Embodiment

The fifth embodiment discusses an improvement for preventing files from being illegitimately altered when a Virtual Package is to be constructed.

Figure 41:
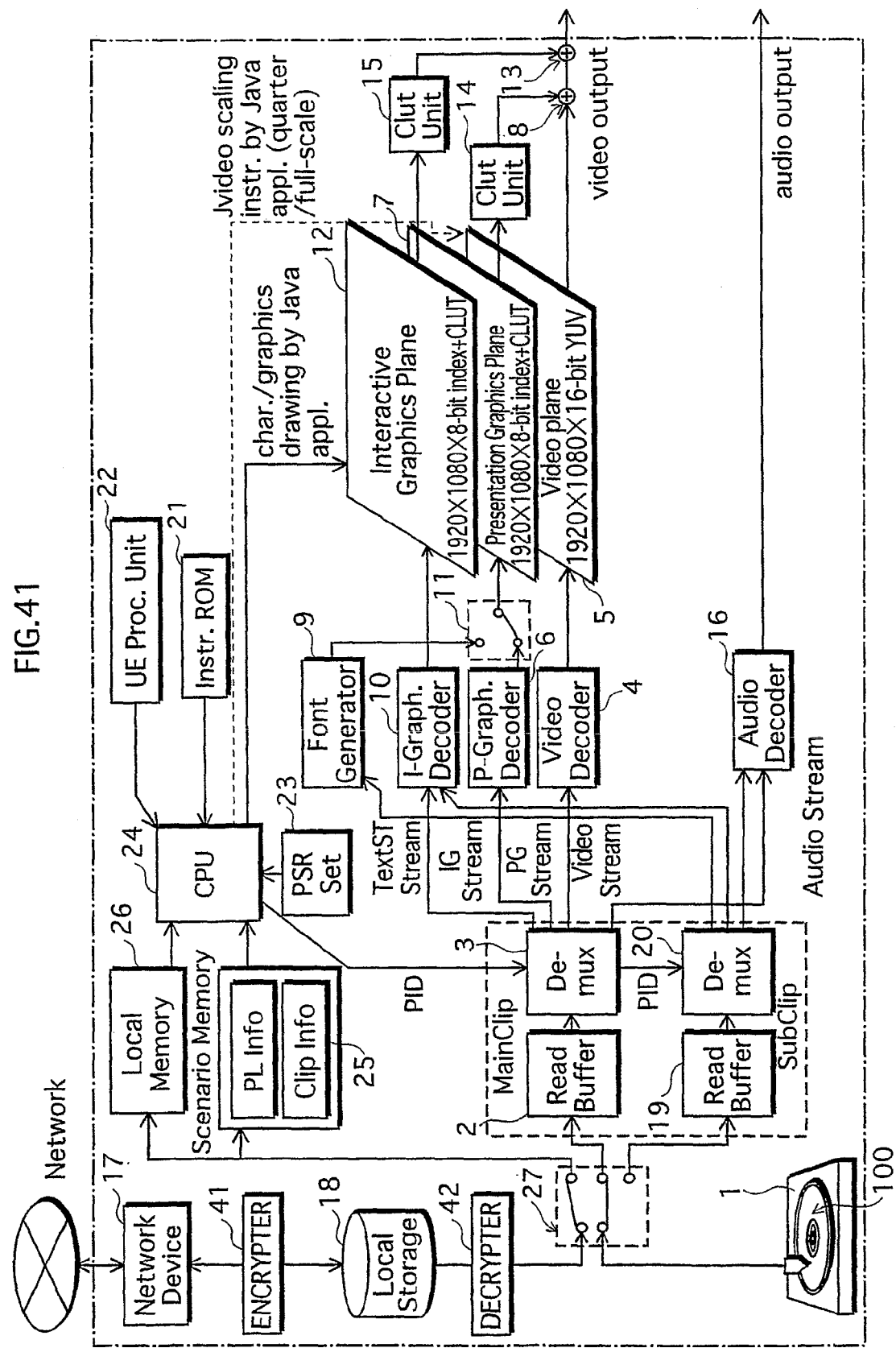
FIG. 41 shows the internal structure of the playback apparatus according to the fifth embodiment.

FIG. 41 shows the internal structure of the playback apparatus according to the fifth embodiment. The playback apparatus according to the present embodiment has a configuration in which an encrypter 41 and a decrypter 42 are added to the configuration shown in FIG. 18. The constituent elements that are common in FIG. 18 have the same reference characters, and explanation thereof will be omitted.

The encrypter 41 selectively encrypts a file to be written into the Local Storage, with the use of key information that is recorded in the BCA (Burst Cutting Area) of BD-ROM inserted in the BD-ROM drive 1 and is unique to the disc. The file to be encrypted by the encrypter 41 is an M2TS file which is for AV data, out of the files that constitute a Virtual Package and have been downloaded from the server. The encryption method used here is, for example, a conventional encryption method such as AES, DES or the like. A BCA is a special area inside the lead-in area of a disc which can be read by only a drive apparatus. Since no application is able to read data from BCA areas, BCA areas are often used for copyright protection techniques.

The decrypter 42 decrypts a file with the use of key information that is recorded in the BCA of BD-ROM inserted in the BD-ROM drive 1 and is unique to the disc. The data to be decrypted by the decrypter 42 is an M2TS file read from the Local Storage. The decrypter 42 obtains and decrypts ACCESS UNITs of the AV data and outputs the decrypted data to a playback mechanism. The encryption method used here is the same as the encryption method used by the encrypter 41 and used for decrypting the file encrypted by the encrypter 41.

In addition, according to the playback apparatus of the present embodiment, the structure of the Virtual Package management table held in the Virtual File System Unit 38 is different from that of the third embodiment. FIG. 42 shows an example of a Virtual Package management table of the fifth embodiment. The Virtual Package management table of the present embodiment is different from the one shown in FIG. 35 in that it has signature data added thereto. The signature data in the Virtual Package management table is signature for verifying that, in the directory for constructing the Virtual Package, the files have not been rewritten after being recorded into the Local Storage.

Out of pieces of registration information in the signature data 607, each of the pieces of registration information 601, 602, and 603 which are respectively in correspondence with a BDMV file, a MPLS file, and a CLPI file having small file sizes is made up of a file name used in the Virtual Package and a hash value of the file substance recorded in the Local Storage. The hash value that is set here has been calculated when the file was downloaded from the server. It should be noted that a hash value is calculated using a one-way function for obtaining a value that is uniquely determined from the data stored in a file. An example of a one-way function is MD 5, which is a conventional method. On the other hand, out of the pieces of registration information in the signature data, the piece of registration information 606 for the M2TS file having a large file size only includes only a file name used in the Virtual Package and does not include a hash value. The signature data 607 is encrypted with the use of the key information that is recorded in the BCA of BD-ROM and is unique to the disc.

Figure 43:
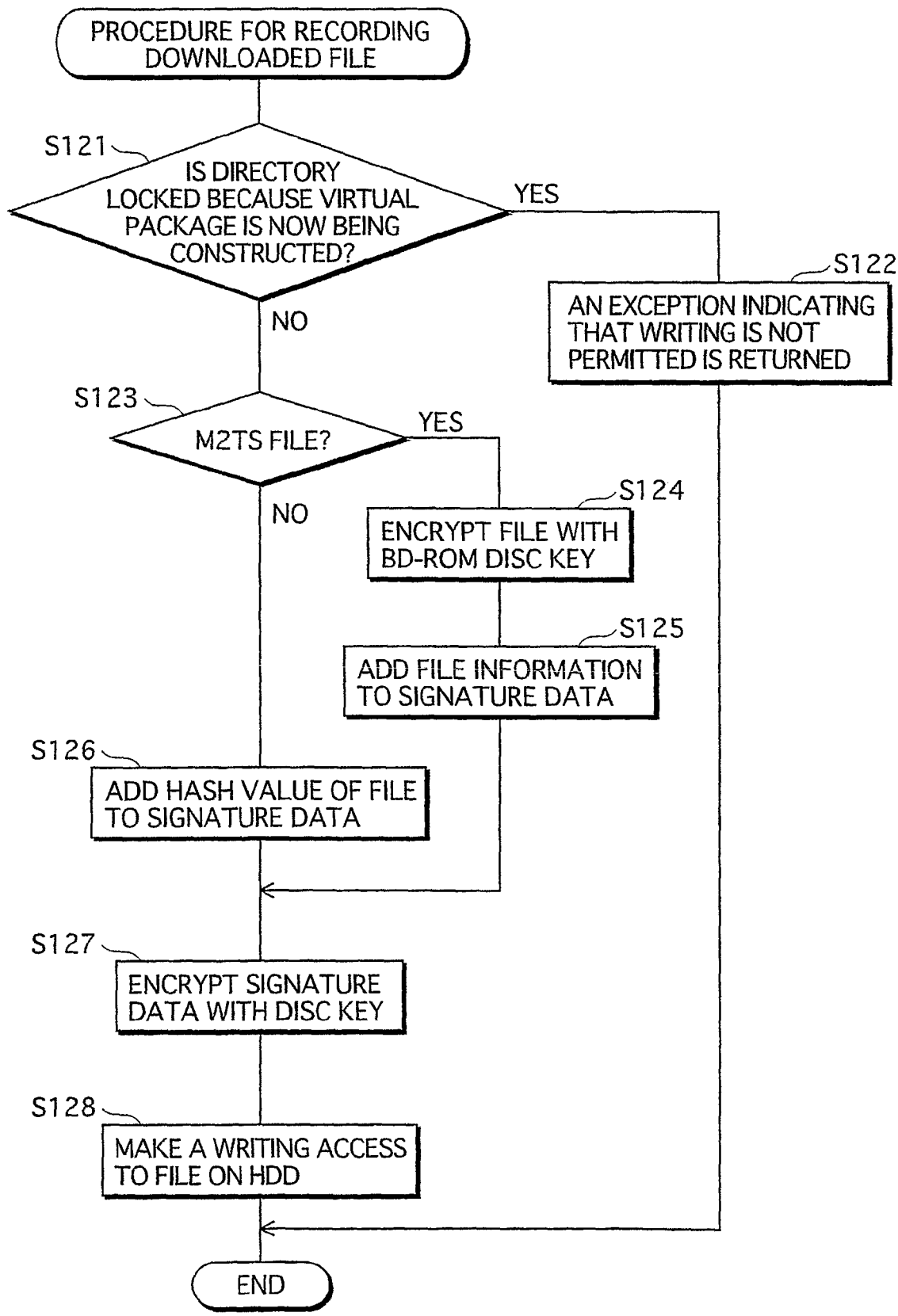
FIG. 43 is a flow chart that shows the processing procedure for recording a downloaded file into the Local Storage.
Figure 44:
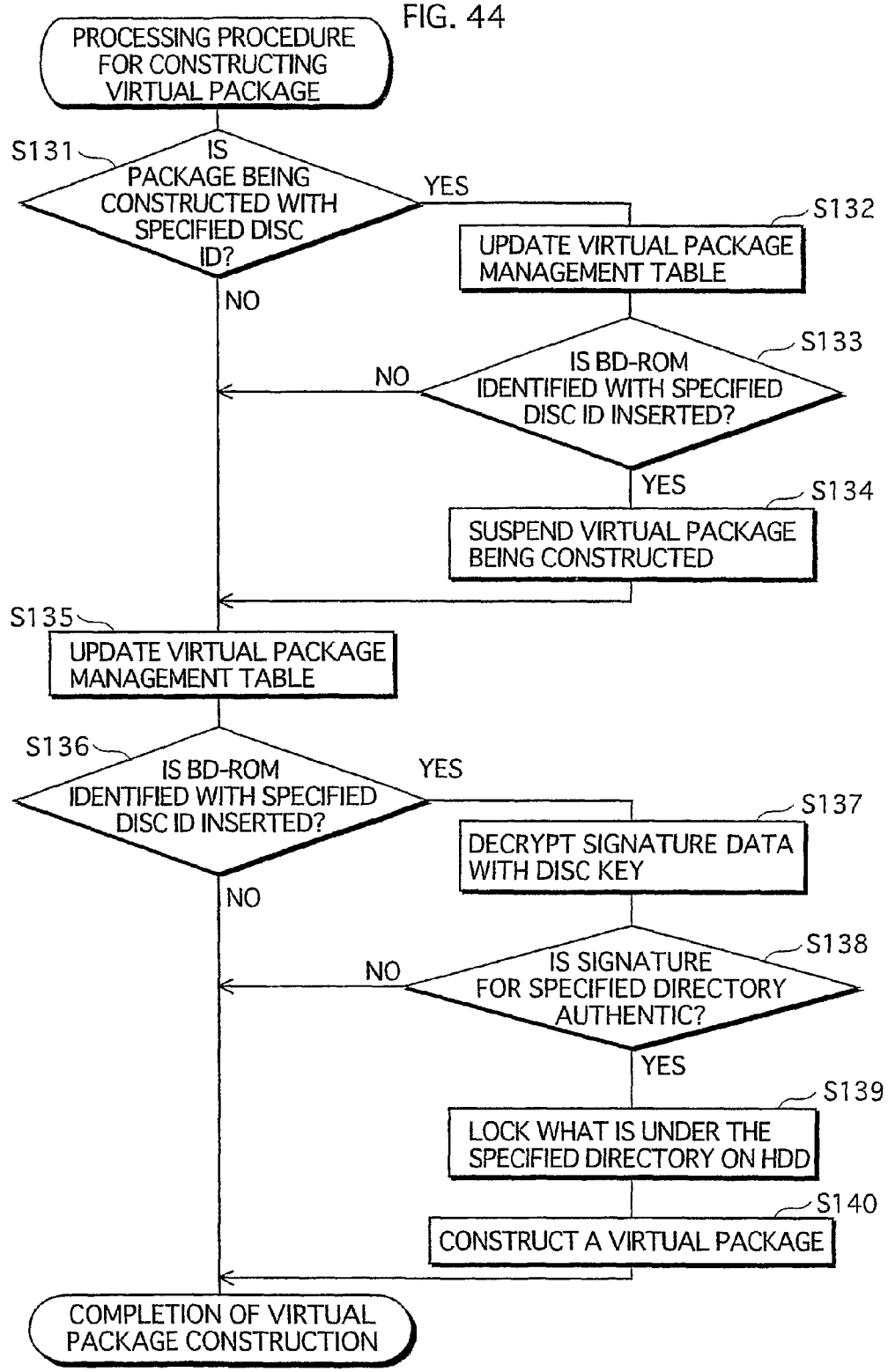
FIG. 44 is a flow chart that shows the processing procedure for construction of a Virtual Package according to the fifth embodiment.

The following describes the flow of the operation of the playback apparatus of the fifth embodiment, with reference to FIGS. 43 and 44. Firstly, description is provided for a processing of recording a file downloaded from a server into the Local Storage. FIG. 43 is a flow chart that shows the processing procedure for recording a downloaded file into the Local Storage.

The processing shown in this flow chart is performed when a Java application downloads a file to be used in construction of a Virtual Package from a server and writes the downloaded file into the Local Storage.

When a Java application requests a writing access with specification of a Local Storage locator, it is judged whether or not the attribute of the directory is set to be the Read-Only attribute, because a Virtual Package is now being constructed (Step S121). In the case where the attribute of the directory containing the specified file is locked in the Read-Only attribute (Step S121: YES), an exception indicating that writing into the file is not permitted is returned to the Java application, and the processing is terminated (Step S122). In other cases (Step S121: NO), the procedure advances to Step S123.

In step S123, it is judged whether the specified file is an M2TS file which is for AV data.

In the case where the specified file is an M2TS file (Step S123: YES), the file is encrypted by the encrypter 41 with the use of the key information that is recorded in the BCA of BD-ROM inserted in the BD-ROM drive 1 and is unique to the disc (Step S124). Then, a piece of registration information which includes only a file name of the specified file to be used in the Virtual Package is added to the signature data (Step S125), and the processing in and after Step S127 is performed.

When the specified file is not an M2TS file (Step S123: NO), a hash value for the specified file is calculated. Then, a piece of registration information which includes the calculated hash value and the file name of the specified file to be used in the Virtual Package is added to the signature data (Step S126), and the processing in and after Step S127 is performed.

In Step S127, the signature data is encrypted by the encrypter 41 with the use of the key information that is recorded in the BCA of BD-ROM and is unique to the disc. In Step S128, a writing access is made to the Local Storage, and the signature data encrypted in Step S127 is recorded into the Local Storage together with the specified file. Thus completes the description of the processing for recording the file downloaded from the server into the Local Storage.

The following describes the processing for constructing a Virtual Package, to be performed by the Virtual File System unit 38. FIG. 44 is a flow chart that shows the processing procedure for constructing a Virtual Package. This flow chart shows a processing procedure to be performed in the case where a Java application issues an update request method using a disc ID and a path for the directory in which the data used for constructing the Virtual Package is stored as an argument.

In Step S131, it is judged whether a Virtual Package has already been constructed for a BD-ROM identified with the specified disc ID.

In the case where a Virtual Package has already been constructed for the BD-ROM identified with the specified disc ID (Step S131: YES), the procedure advances to Step S132. In other cases, the procedure advances to Step S135. In Step S132, the entry for the specified disc ID is deleted from the Virtual Package management table. In Step S133, it is judged whether or not the BD-ROM identified with the specified disc ID is inserted in the BD-ROM drive 1. In the case where the BD-ROM identified with the specified disc ID is inserted (Step S133: YES), the procedure advances to Step S134. In other cases (Step S93: NO), the procedure advances to Step S135. In Step S134, the construction of the Virtual Package in correspondence with the specified disc ID is suspended.

In Step S135, the directory path specified as the argument and the signature data recorded in the specified directory are added to the entry for the disc ID specified as the argument.

In Step S136, it is judged whether or not a BD-ROM identified with the specified disc ID is inserted in the BD-ROM drive 1. In the case where the BD-ROM identified with the specified disc ID is inserted (Step S136: YES), the procedure advances to Step S137. In other cases, the processing is terminated.

In Step S137, the signature data of the Virtual Package management table is decrypted by the decrypter 42, with the use of key information that is recorded in the BCA of the BD-ROM and is unique to the disc.

In Step S138, it is judged whether or not the decrypted signature data is authentic. The signature data is judged to be authentic when all three of the following conditions are satisfied:

(a) A hash value is calculated for each of all the files whose signature data has a hash value having been set, and the calculated values are equal to the hash values included in the signature data;

(b) An M2TS file whose signature data does not have a hash value having been set is present in the Local Storage without being deleted;

(c) No file that has not been registered in the signature data exists in the specified directory in the Local Storage.

In the case where the signature data is judged to be authentic (Step S138: YES), the procedure advances to Step S139. In other cases, the processing is terminated. In Step S139, the attribute of the directory and thereunder specified in the Local Storage is set to be the Read-Only attribute. In Step S140, a Virtual Package is constructed using the directory in the Local Storage specified by the argument and the BD-ROM. Thus completes the description of the processing for constructing a Virtual Package.

Further, in the case where a disc is newly inserted into a playback apparatus, a directory path that corresponds to the disc ID of the inserted BD-ROM is searched for from the Virtual Package management table, and the processing in and after Step S136 is performed using the detected directory path as a specified directory path, so that the Virtual Package is constructed.

It should be noted in the present embodiment, only the M2TS file included in the Virtual Package is encrypted/decrypted; however, it is acceptable to have an arrangement wherein other files such as the CLPI file, the BDMV file, and the MPLS file are encrypted/decrypted. Further, although the description has been provided for the case where the downloaded M2TS file is written into the Local Storage after being encrypted; however, it is acceptable to have an arrangement wherein an M2TS file that has been encrypted in advance with the use of key information unique to the disc is downloaded.

It should be noted that the description says that a hash value of an M2TS file is not added to the signature data in order to omit the processing of calculating the hash value when a playback is to be performed because the file size of an M2TS file is large; however, in the case where a playback apparatus having a high enough processing capability is used, it is acceptable to add a hash value of an M2TS file to the signature, as well. Additionally, it is acceptable to have an arrangement wherein other files such as the CLPI file, the BDMV file, and the MPLS file are encrypted/decrypted so that the hash calculation processing for these files is also omitted like the M2TS file.

It should be noted that in the present embodiment the signature data is generated when the file is written into the Local Storage; however, it is acceptable to download the signature data itself and the downloaded signature data is specified when a Virtual Package is constructed.

In the present embodiment the key information unique to the disc is used as the key for encryption/decryption; however, it is acceptable to use key information unique to the disc and information generated from key information unique to a terminal apparatus as the key for encryption/decryption.

As explained so far, according to the present embodiment, when a Virtual Package is constructed by merging files recorded on a plurality of recording media, a file recorded in the Local Storage, which is a readable/writable recording medium, is encrypted with the use of a key unique to the disc. It is possible to prevent, for example, the substance file in the Local Storage from being rewritten by an application on another disc, or to prevent a tampering with insertion of the Local Storage into another apparatus such as a personal computer. Further, since the signature data is encrypted with the key unique to the disc and stored, it is possible to detect tampering to the files in the Local Storage and to prevent construction of Virtual Packages with those files. Accordingly, it is possible to prevent a malfunction caused by utilization of a file that has been illegitimately altered and to prevent illegitimate use that is not intended by the provider.

Sixth Embodiment

The sixth embodiment discusses a method for moving a file from the Local Storage to another recording area while a Virtual Package is being constructed.

Figure 45:
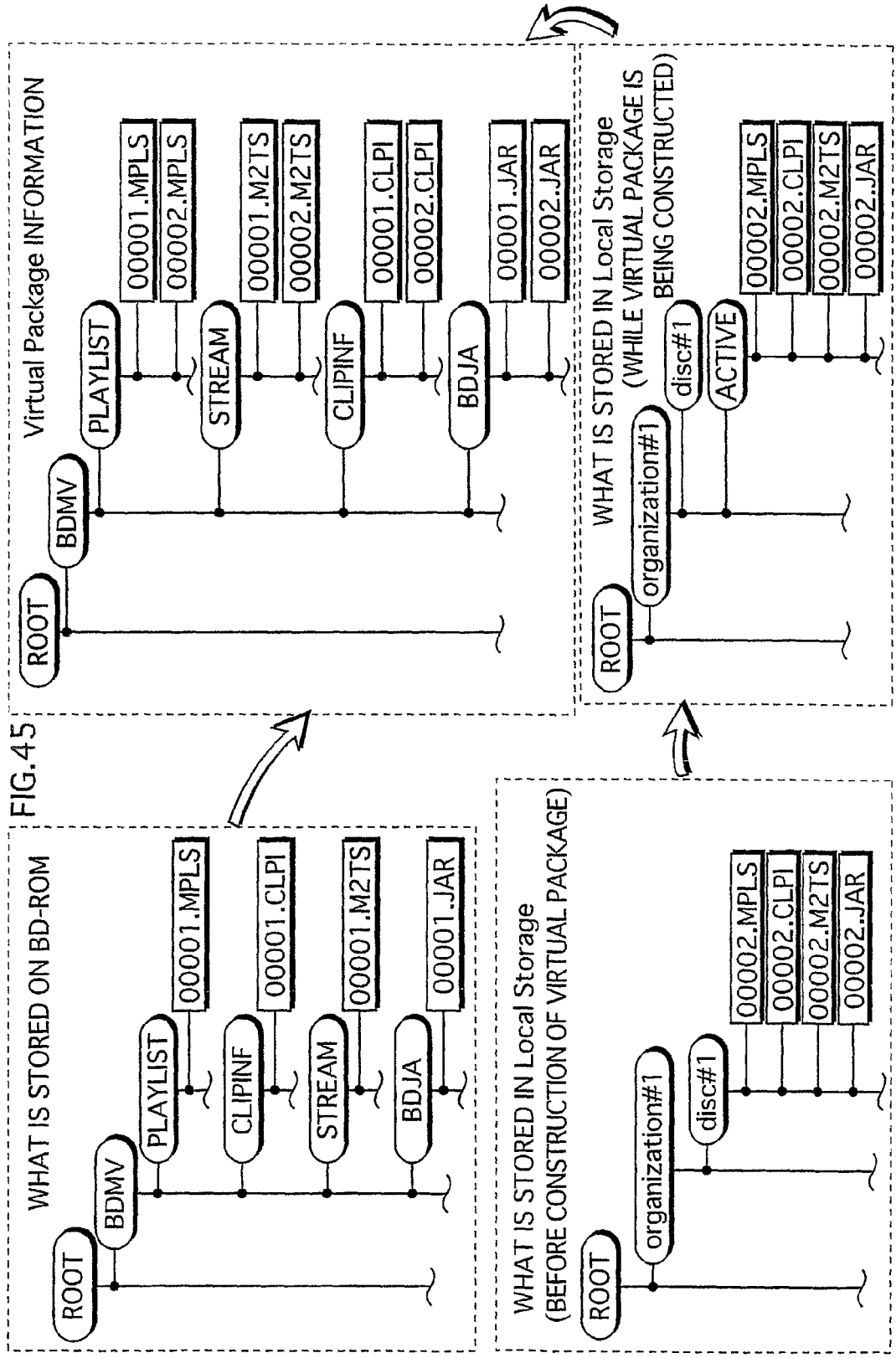
FIG. 45 shows an example of Virtual Package construction according to the sixth embodiment.

FIG. 45 shows an example of Virtual Package construction performed by the Virtual File System unit 38 according to the sixth embodiment. At the top left of the drawing is a directory-file structure in a BD-ROM. At the bottom left of the drawing is a directory-file structure in the Local Storage before a Virtual Package is constructed.

The Virtual File System Unit 38 in the present embodiment moves the files under the directory ("ROOT/organization#1/disc#1/contsID#1" in the example shown in the drawing) specified by the argument for the update request method to under the ACTIVE directory, and constructs a Virtual Package from the BD-ROM and the ACTIVE directory. At the bottom right of the drawing is a directory-file structure in the Local Storage after the files have been moved.

The ACTIVE directory is a directory which constitutes the Virtual Package together with the BD-ROM identified with the disc ID specified by the argument for the update request method. Applications are not able to directly write data into the ACTIVE directory.

The following describes the operation of the playback apparatus according to the sixth embodiment. Firstly, description is provided for a processing procedure for constructing a Virtual package.

Figure 46:
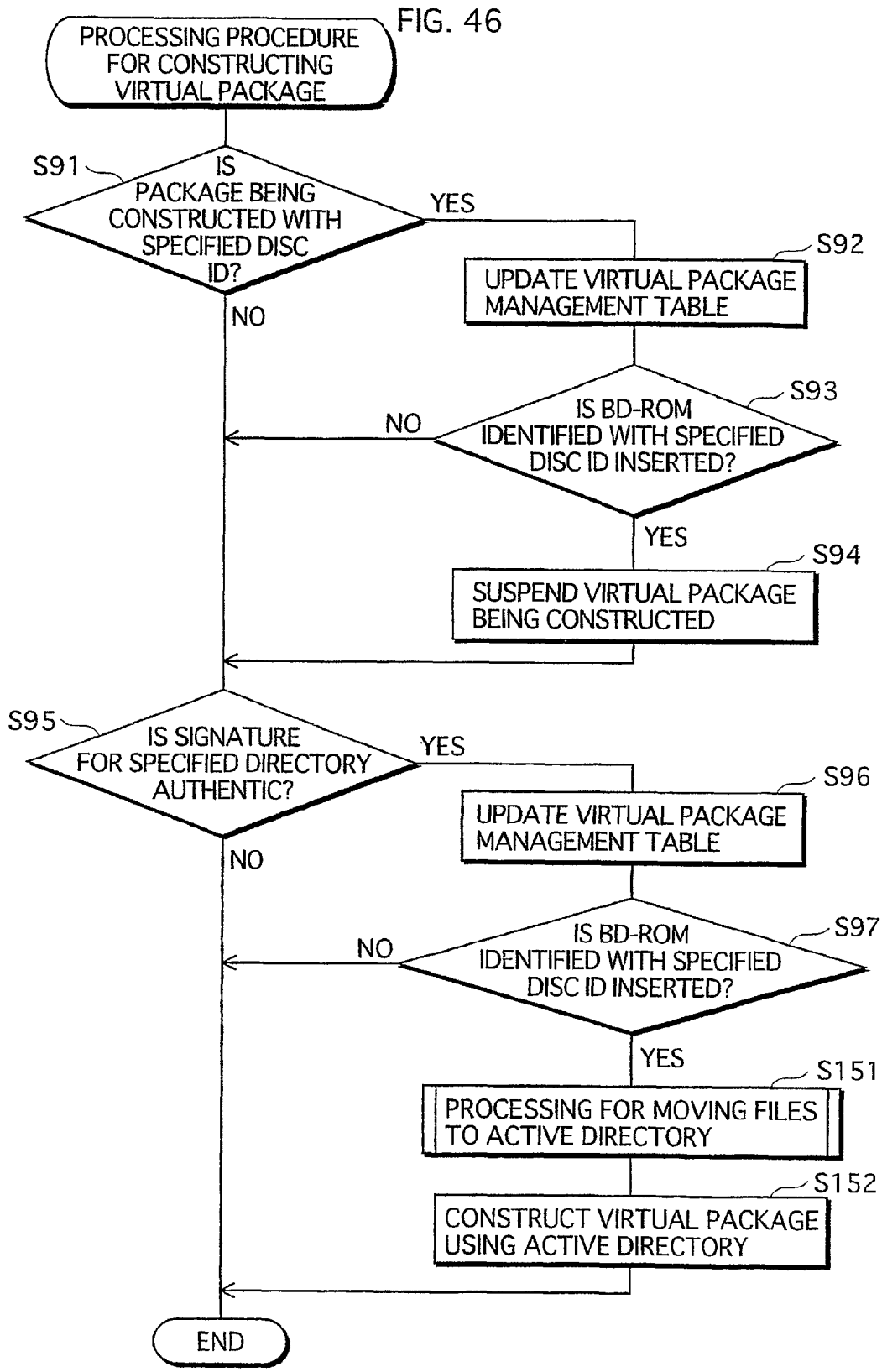
FIG. 46 is a flow chart that shows the processing procedure for construction of a Virtual Package according to the sixth embodiment.

FIG. 46 is a flow chart that shows the processing procedure for constructing a Virtual Package according to the sixth embodiment. The difference between this flow chart and the one shown in FIG. 36 lies in that the Steps S98 and S99 are changed to Steps S151 and S152, respectively. In Step S151, a processing is performed for moving the files under the directory specified by the argument within the Local Storage are moved to the ACTIVE directory. In Step S152, a Virtual Package is constructed from what is in the ACTIVE directory and the BD-ROM. Thus completes the description of the processing procedure for constructing a Virtual Package.

Figure 47:
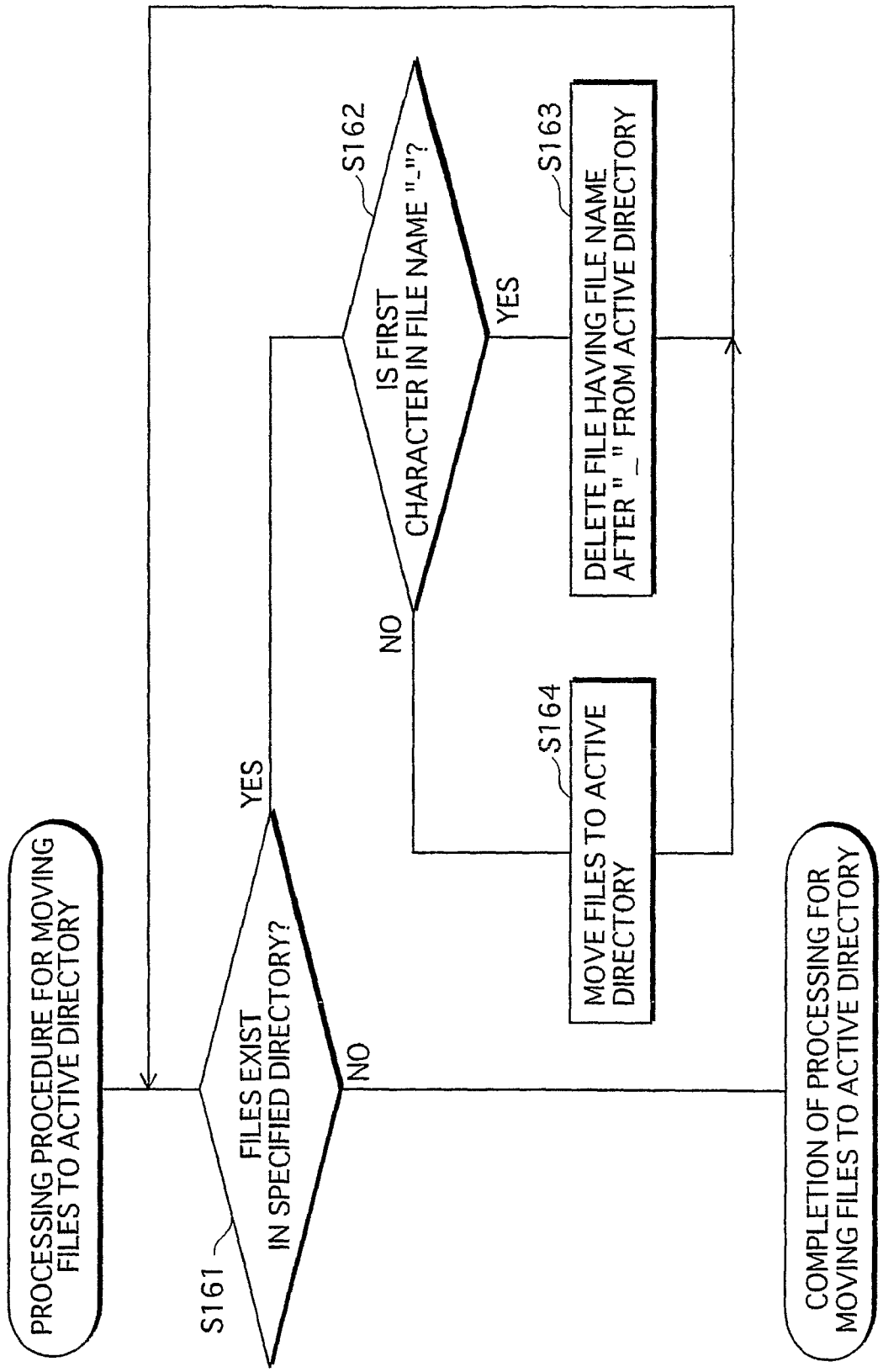
FIG. 47 is a flow chart that shows the processing procedure for moving the files into the ACTIVE directory.

The following describes the details of the processing in Step S151. FIG. 47 is a flow chart that shows the processing procedure for moving the files into the ACTIVE directory.

In this flow chart, it is judged whether or not one or more files exist under a directory in the Local Storage specified by the argument for an update request method (Step S161), and if one or more files exist (Step S161: YES), the processing in Steps S162 through 164 is performed using one of the files in the specified directory as the processing target.

In Step S162, it is judged whether or not the first character in the file name of the target file is "_". In the case where the first character is "_" (Step S162: YES), a file having a file name obtained by taking out the first character "_" from the file name of the target file is deleted from the ACTIVE directory, and the target file itself is also deleted from the specified directory (Step S163). In the case where the first character is not "_" (Step S162: NO), the target file is moved from the specified directory to the ACTIVE directory (Step S164).

The processing in Steps S162 through S164 is performed on each of all the files that exist under the specified directory, and when no files exist under the specified directory (Step S161: NO), the processing is terminated. Thus completes the description of the details of the processing for moving the files under a specified directory within the Local Storage to the ACTIVE directory.

It should be noted that, instead of deleting a file from the ACTIVE directory depending on whether the first character of the file name of the target file is "_", it is acceptable to provide an API that makes a deletion reservation. The API that makes a deletion reservation is used for enabling a Java application to make a deletion reservation for the files in the ACTIVE directory; however, even if the API has made a deletion reservation, the files in the ACTIVE directory will not be deleted immediately. The Virtual File System Unit 38 stores the contents of the file deletion reservation into a memory and when a moving processing of the files in the AV directory is performed, the replacement processing in Steps S162 and S163 is performed by deleting the files in the ACTIVE directory specified by the deletion reservation.

The following describes the processing procedure for a writing file access made by a Java application.

Figure 48:
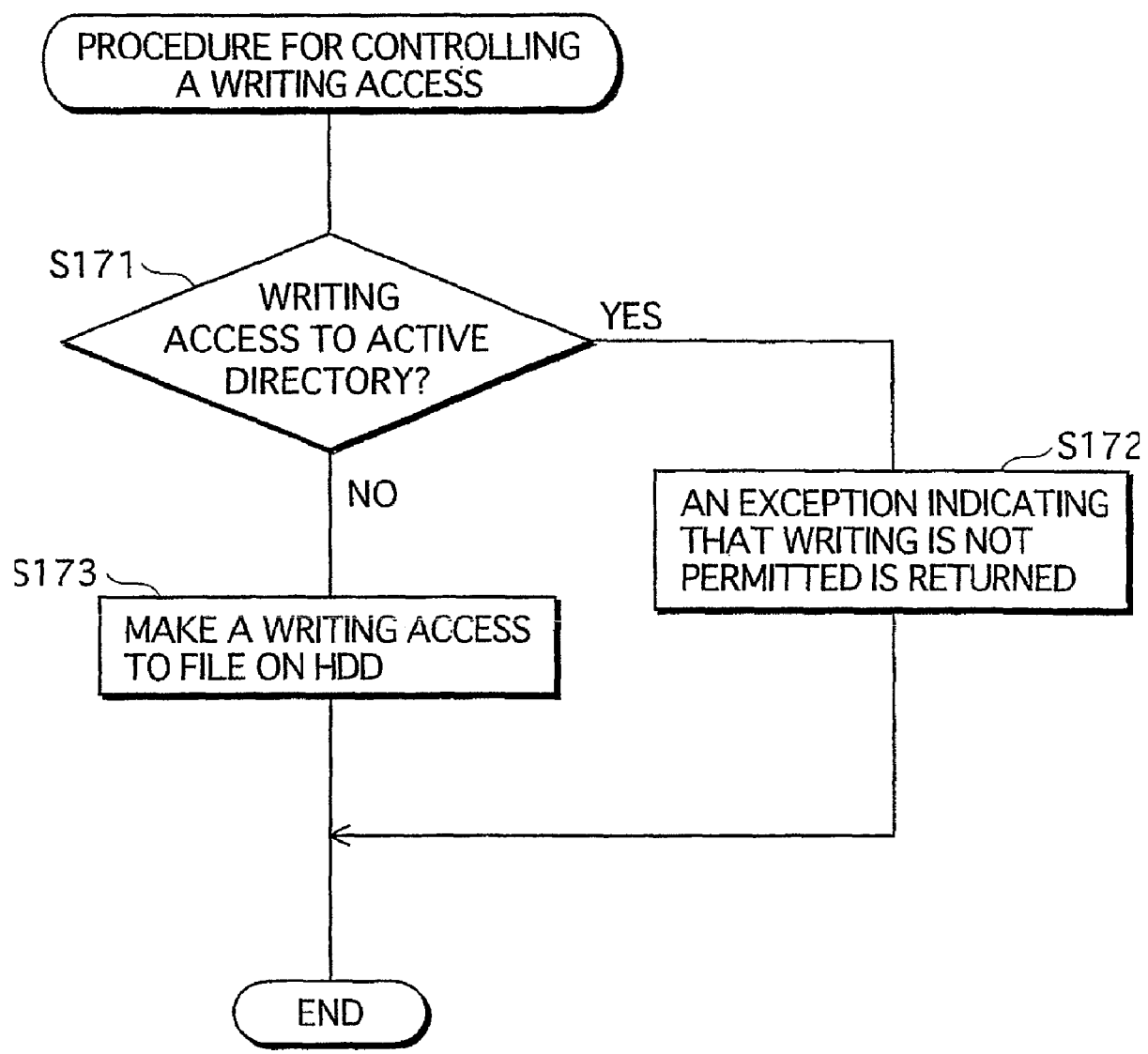
FIG. 48 is a flow chart that shows the processing procedure of an API that controls a writing access to a file according to the sixth embodiment.

FIG. 48 is a flow chart that shows the processing procedure by an API that controls a writing access to a file. When a Java application requests a writing access with specification of a Local Storage locator, it is judged whether the writing access is a writing access made to one of the files under the Active directory (Step S171).

When the writing access is one made to one of the files under the ACTIVE directory (Step S171: YES), an exception indicating that the writing to the file is not permitted is returned to the Java application, and the processing is terminated (Step S172). In other cases (Step S171: NO), the procedure advance to Step S173.

In Step S173, a writing access is made to a file in the Local Storage. Thus completes the description of the processing procedure of a writing access to a file.

According to the processing procedure described above, in the case where a file being the access destination is a file that constitutes a Virtual Package and if the Virtual Package is being constructed when an access request is made, the access to the file will not be permitted.

It should be noted that it is acceptable to have an arrangement wherein the Java application is permitted to write data into the ACTIVE directory during a Virtual Package construction processing so that the Java application performs the processing of moving the files to the ACTIVE directory. To be more specific, in the flow chart shown in FIG. 47, the Virtual File System unit 38 moves the files under the directory specified by the Java application to the ACTIVE directory; however, it is acceptable to have an arrangement wherein the Java application is permitted to write into the ACTIVE directory during the construction processing of a Virtual Package so that the Java application is notified of an event for starting the processing of moving the files to the ACTIVE directory and the Java application itself moves the files to the ACTIVE directory.

As explained so far, according to the present embodiment, in the case where a Virtual Package is constructed by merging files recorded on a plurality of recording media, one or more files stored in the Local Storage, which is a readable/writable recording medium, are moved to the ACTIVE directory to which applications are not allowed to make a writing access; therefore, it is possible to prevent file alterations with an illegitimate file from the application itself or other applications, while a Virtual Package is being constructed.

Seventh Embodiment

The seventh embodiment describes a method of sharing a content within a Local Storage between BD-ROMs from a same provider. In the description of the seventh embodiment, description of the part that is the same as in the sixth embodiment will be omitted.

Figure 49:
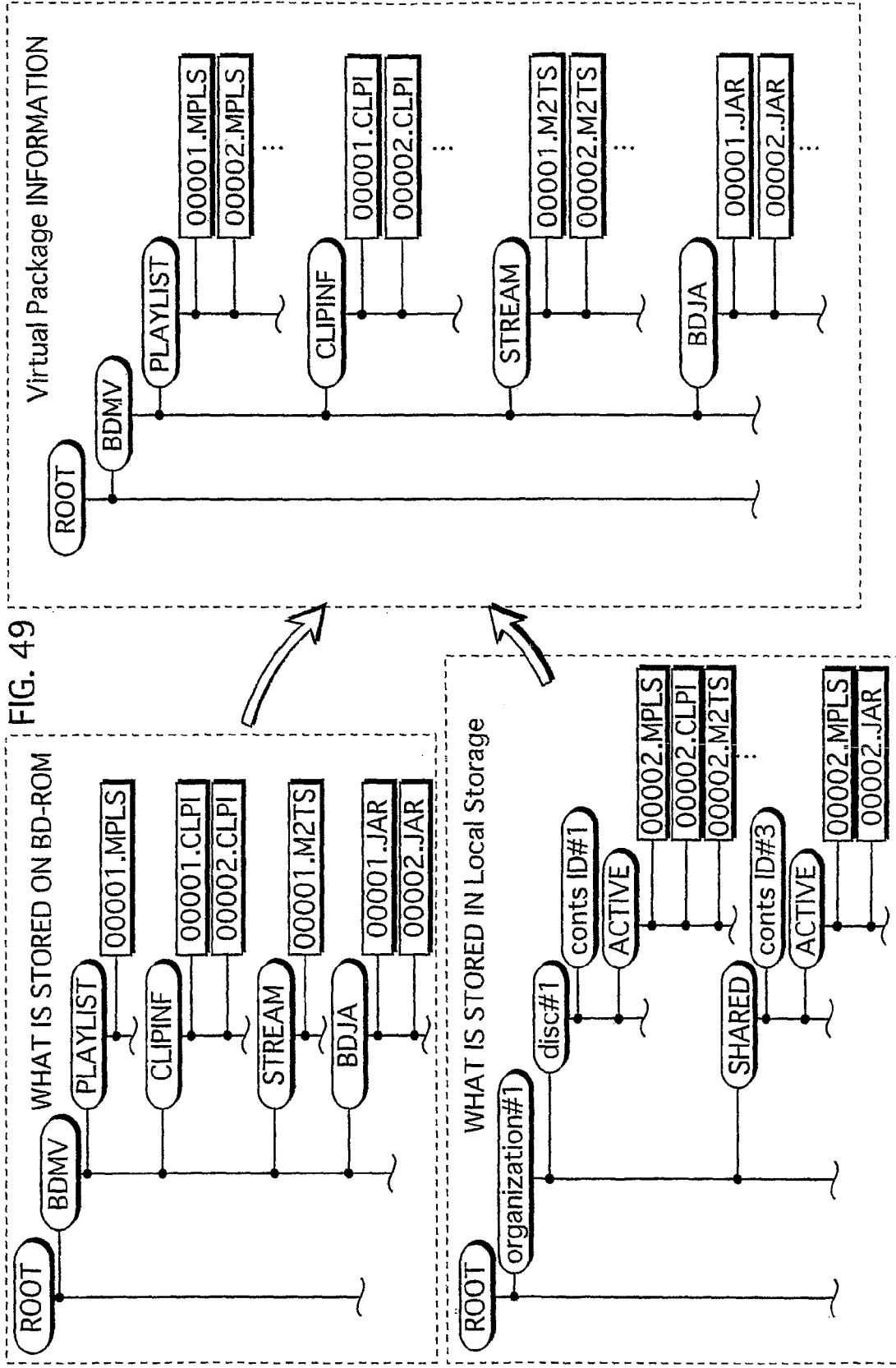
FIG. 49 shows an example of a construction of a Virtual Package according to the seventh embodiment.

FIG. 49 shows an example of construction of a Virtual Package according to the seventh embodiment. At the top left of the drawing is a directory-file structure on a BD-ROM. At the bottom left of the drawing is a directory-file structure in the Local Storage obtained by moving files that constitute a Virtual Package to the ACTIVE directory in order to construct the Virtual Package.

FIG. 49 is different from FIG. 48 in that an ACTIVE directory exists not only under ROOT/organization#1/disc∩1, but also under ROOT/organization#1/SHARED.

The SHARED directory is a directory that data can be read from and written into by any of applications that have been authenticated and that have an organization ID in common.

In the case where the files downloaded from a server need to be used, as the files commonly used, to construct Virtual Packages for a plurality of BD-ROMs whose disc IDs are different, the downloaded files are saved under the ROOT/organization#1/SHARED directory not under the ROOT/organization#1/disc#1 directory. The directory structure under the SHARED directory is the same as that under the disc ID directory. The operation made to the ACTIVE directory is also the same as the one described in the sixth embodiment. It should be noted, however, that when a Virtual Package is to be constructed, not only the files in the ACTIVE directory under the disc#1 directory, but also the files in the ACTIVE directory under the SHARED directory are also merged to construct a Virtual Package.

The Virtual File System Unit 38 of the present embodiment registers, as files used in the Virtual Package, one or more files that exist both under the SHARED directory in the Local Storage and under the disc ID directory in the Local Storage, into Virtual Package information. In addition, in the case where files that have the same name exist in any combination of (i) on the BD-ROM, (ii) under the SHARED directory in the Local Storage, and (iii) under the disc ID directory in the Local storage, (for example, 0002.CLPI exists both on the BD-ROM and under the disc#1 directory in the Local Storage), the Virtual File System Unit 38 uses the files in the Local Storage as the files for the Virtual Package construction. In the case where files that have the same name exist all of (i) on the BD-ROM, (ii) under the SHARED directory in the Local Storage, and (iii) under the disc ID directory in the Local storage, the Virtual File System nit 38 uses the files under the discID directory for the Virtual Package construction. Such a merging processing is recursively repeated for each sub-directory.

Figure 50:
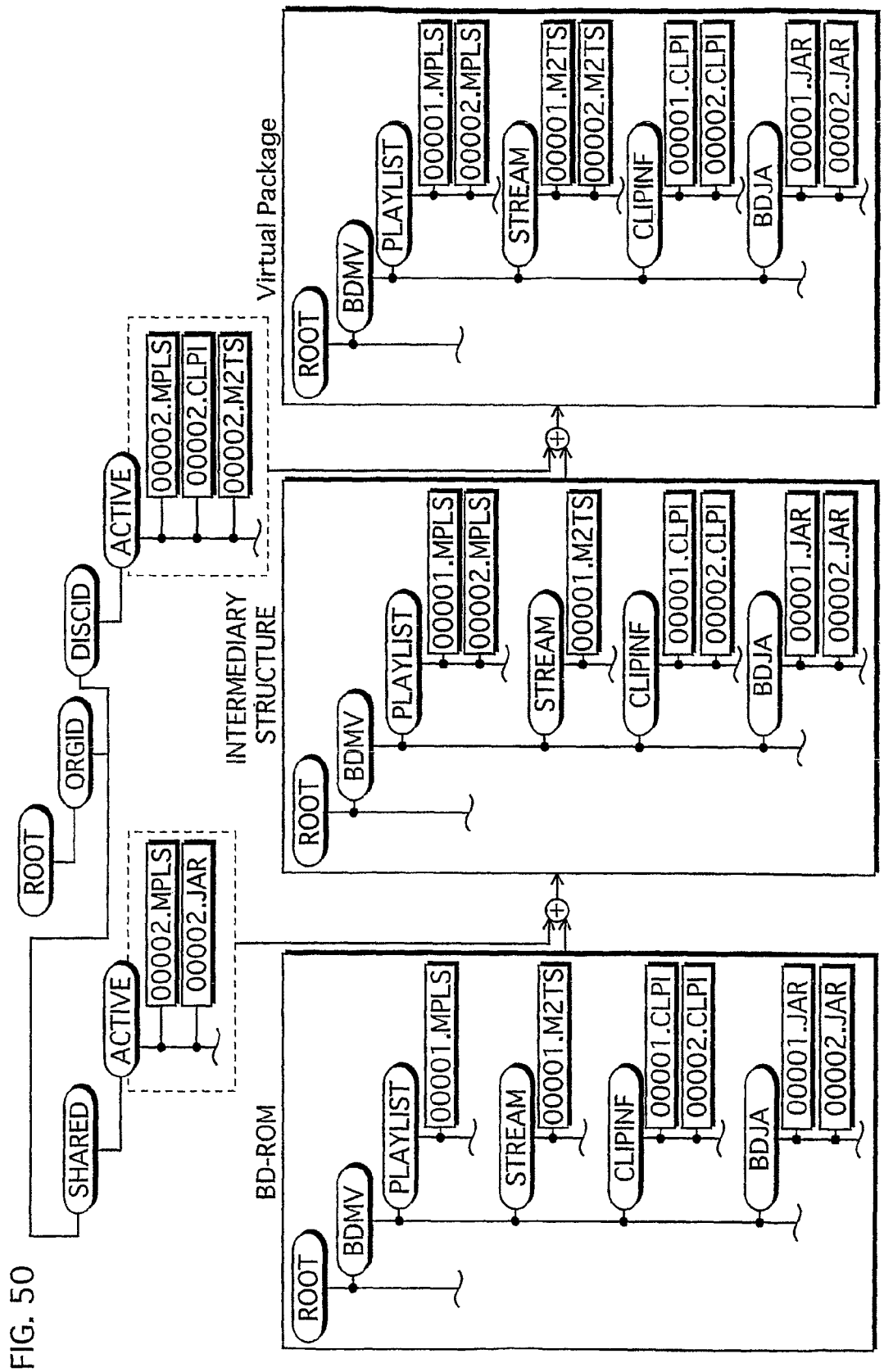
FIG. 50 schematically shows how a Virtual Package is constructed using an ACTIVE directory under the SHARED directory and an ACTIVE directory under the disc#1 directory.

FIG. 50 schematically shows how a Virtual Package is constructed using the ACTIVE directory under the SHARED directory and the ACTIVE directory under the disc#1 directory. When the Virtual Package is constructed, the files in the ACTIVE directory under the SHARED directory are merged with the files on the BD-ROM so as to generate an intermediary file structure. The merging operation is the same as the one described in the fourth embodiment. Subsequently, the intermediary file structure is merged with the files in the ACTIVE directory under the disc#1 directory. As a result a Virtual Package is constructed by merging the BD-ROM, the files in the ACTIVE directory under the SHARED directory and the files in the ACTIVE directory under the disc#1 directory. The merging of the intermediary file structure with the files in the ACTIVE directory under the disc#1 directory is achieved by performing the merging operation in the fourth embodiment while regarding the intermediary file structure as a BD-ROM. In other words, in the case where files having the same name exist both in the intermediary file structure and in the ACTIVE directory under the disc ID, the ACTIVE directory under the disc#1 directory is eventually prioritized. Consequently, the priority level gets higher in the order of: the BD-ROM, the ACTIVE directory under the SHARED directory, and the ACTIVE directory under the disc#1 directory.

Alternatively, it is acceptable to construct a Virtual Package with the priority level of the ACTIVE directory under the SHARED directory being lowered; i.e. the priority level gets higher in the order of: the ACTIVE directory under the SHARED directory, the BD-ROM, and the ACTIVE directory under the disc#1 directory. It means that in the case where files having the same name exist both on the BD-ROM and under the SHARED directory in the Local Storage, the file on the BD-ROM is used. To explain with reference to FIG. 49, although 00002.JAR and 00002.CLPI exist both on the BD-ROM and in the Local Storage, as for 00002.JAR, since it is in the ACTIVE directory under the SHARED directory in the Local Storage, 00002.JAR on the BD-ROM is used; as for 00002.CLPI, since it is in the ACTIVE directory under the disc#1 directory in the Local Storage, 00002.CLPI in the Local Storage is used. To set the priority levels in such a manner is effective in the case where the access restraint to the ACTIVE directory under the SHARED directory is weak and where there is a possibility that a third party may attempt to illegitimately replace a file on the BD-ROM by putting a malicious file under the SHARED directory.

By lowering the priority level of the ACTIVE directory under the SHARED directory than that of the BD-ROM, it is possible to prohibit replacement of the files on the BD-ROM so as to allow only addition of new files. Thus, it is possible to enhance the security level.

It should be noted that it is acceptable to provide, either on the BD-ROM or in the ACTIVE directory under the discID directory, a file which defines priority level information regarding whether the priority level of the ACTIVE directory under the SHARED directory is higher or lower than that of the BD-ROM.

The construction of a Virtual Package described above is achieved by issuing an update request method which specifies, as an argument, (i) the path for the directory in which the files to be shared between Virtual Packages of a plurality of BD-ROMs are recorded ("ROOT/organization#1/SHARED/contsID#3" in the example in FIG. 49), (ii) the path for the directory in which the files unique to the Virtual Package of the BD-ROM identified with the disc ID are recorded ("ROOT/organization#1/disc#1/contsID#1" in the example in FIG. 49), and (iii) the disc ID.

The following describes the operation of the playback apparatus according to the seventh embodiment. Firstly, explanation of the processing procedure for constructing a Virtual Package is provided.

Figure 51:
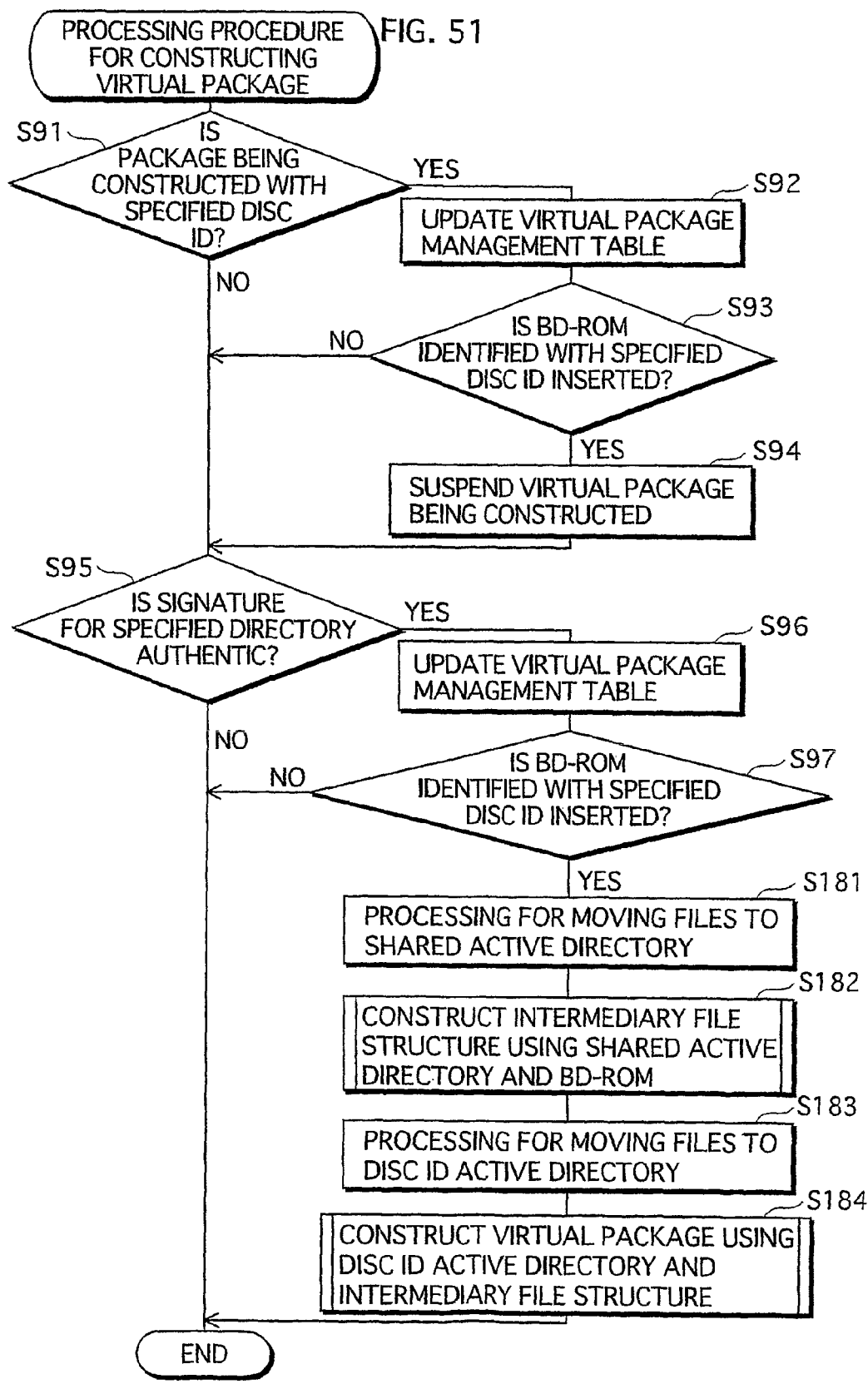
FIG. 51 is a flow chart that shows the processing procedure for a construction of a Virtual Package according to the seventh embodiment.

FIG. 51 is a flow chart that shows the processing procedure for construction of a Virtual Package according to the seventh embodiment. The difference between the flow chart in FIG. 51 and the flow chart in FIG. 36 lies in that Steps S98 and S99 are changed to Steps S181 to S184.

In Step S181, the processing is performed for moving the files stored under a directory within the Local Storage specified by the argument as the file recording destination of the files to be shared between a plurality of BD-ROMs, to the ACTIVE directory under the SHARED directory. The processing of moving the files is performed in the same manner as the procedure shown in FIG. 47. In Step S182, an intermediary file structure is constructed with what is stored in the ACTIVE directory under the SHARED directory and the BD-ROM. In Step S183, the processing is performed for moving the files stored under a directory specified by the argument as the file recording destination of unique files, to the ACTIVE directory under the discID directory. The processing of moving the files is performed in the same manner as the procedure shown in FIG. 47. In Step S184, what is stored in the ACTIVE directory under the discID directory is merged with the intermediary file structure constructed in Step S182, so as to construct a Virtual Package. Thus completes the description of the processing procedure for Virtual Package construction.

It should be noted that the order of (i) the step of constructing the intermediary file structure using the ACTIVE directory under the SHARED directory and the BD-ROM in Step S182 and (ii) the step of moving the files into the ACTIVE directory under the discID directory in Step S183 may be reversed.

Figure 52:
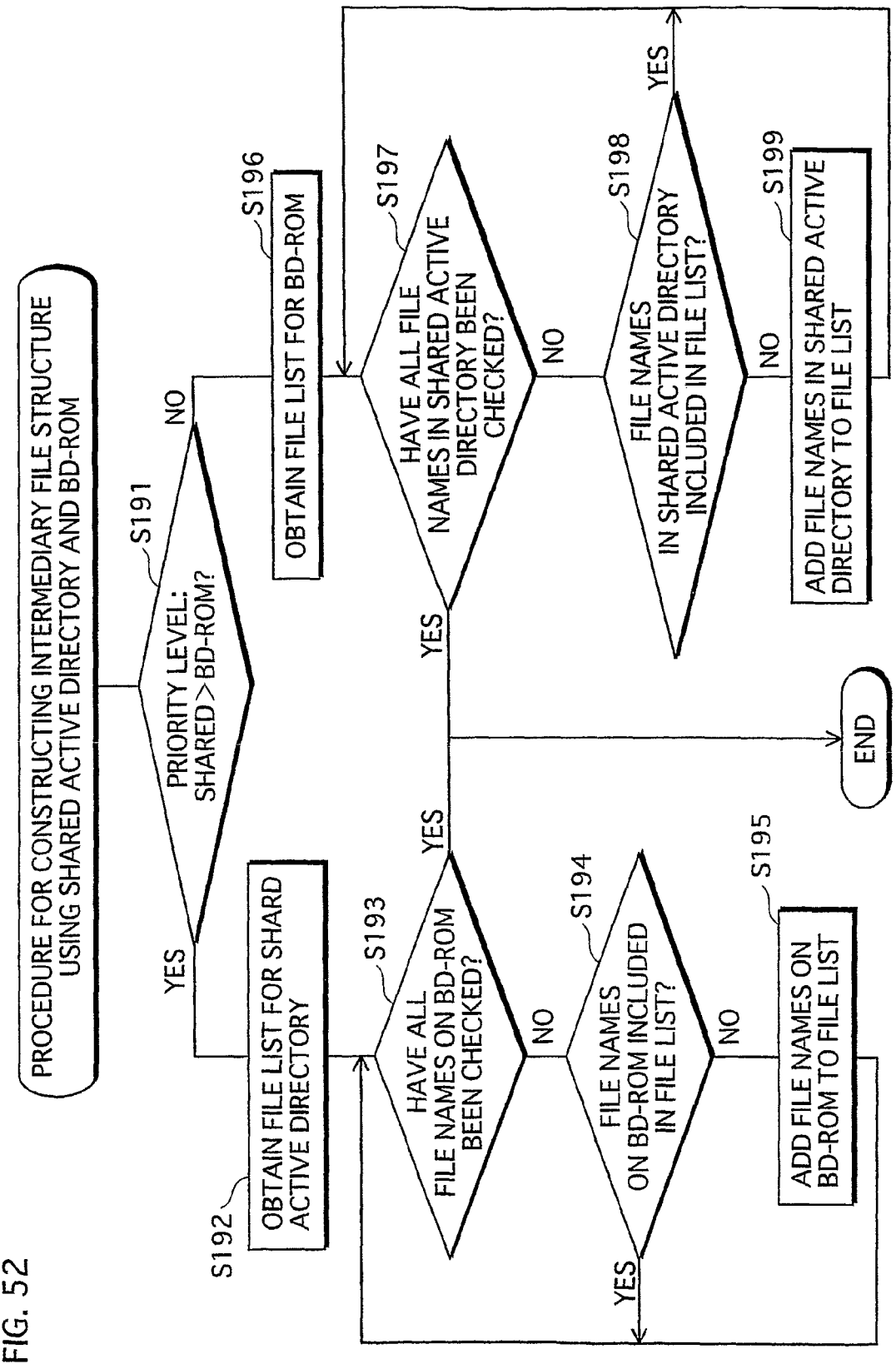
FIG. 52 describes a procedure for construction of an intermediate file structure.

Next, the following describes in detail the processing in Step S182 shown in FIG. 51, with reference to FIG. 52. When the files in the ACTIVE directory under the SHARED directory are merged with the files on the BD-ROM, then firstly in Step S191, a file which is stored either on the BD-ROM or in the discID directory and in which priority level information is written is read so as to check the priority levels of the SHARED directory and the BD-ROM. In the case where the priority level of the SHARED directory is higher (Step S191: YES), the procedure advances to Step S192, and a file list showing the files in the ACTIVE directory under the SHARED directory is obtained. Subsequently, the loop processing in Steps S193 through S195 is repeatedly performed on each of all the files recorded on the BD-ROM.

In Step S194, the file names of some of the files recorded on the BD-ROM that have not been processed yet are checked as processing targets, and it is judged whether or not the file list obtained in Step S192 contains a file having the same file name as each processing target (Step S193). In the case where the file list contain no file having the same file name as the processing target (Step S193: NO), the file name of the processing target file is added to the file list (Step S195). The processing in Step S194 and S195 is applied to each of all the files recorded on the BD-ROM, and when all the files have been checked (Step S193: YES), the obtained file list is taken as an intermediary file structure, and the processing is completed.

On the other hand, in the case where the priority level of the BD-ROM is higher than that of the SHARED directory in Step S191, the procedure advances to Step Sl96 and a list of the files recorded on the BD-ROM is obtained. Subsequently, the loop processing in Steps S197 through S199 is repeatedly performed on each of all the files in the ACTIVE directory under the SHARED directory.

In Step S198, out of the files in the ACTIVE directory under the SHARED directory, the file names of some of the files that have not been processed yet are checked as processing targets, and it is judged whether or not the file list obtained in Step S196 contains a file having the same file name as each processing target. In the case where the file list contain no file having the same file name as the processing target (Step S198: NO), the file name of the processing target file is added to the file list (Step S199). The processing in Step S198 and S195 is applied to each of all the files recorded in the ACTIVE directory under the SHARED directory, and when all the files have been checked (Step S197: YES), the obtained file list is taken as an intermediary file structure, and the processing is completed. Thus completes the procedure for constructing an intermediary file structure.

It should be noted that it is acceptable to determine a default priority order in advance so that, if there is no file indicating the priority level information, the default priority order is used.

Figure 53:
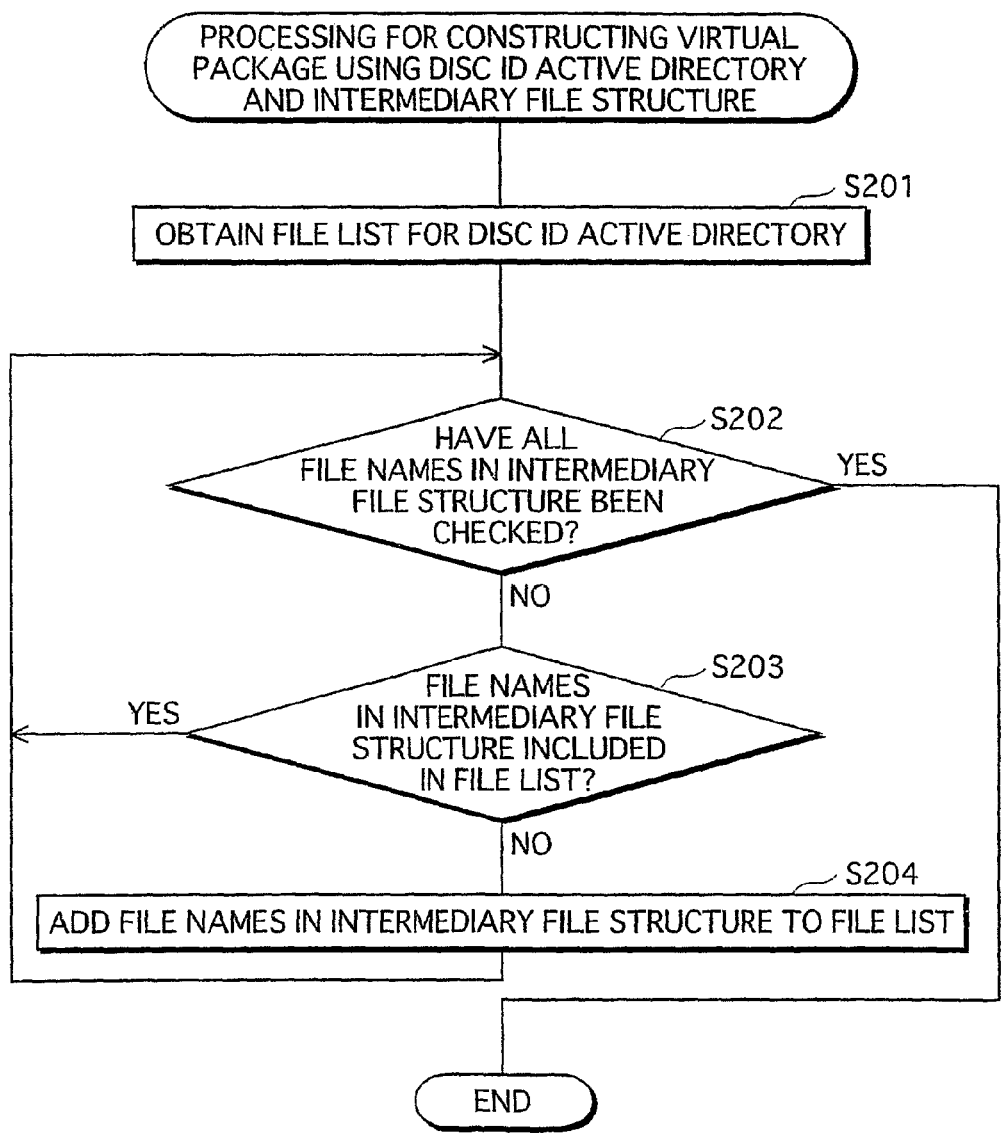
FIG. 53 is a flow chart that shows in detail the processing in Step S184 in FIG. 51.

FIG. 53 is a flow chart that shows in further detail the processing performed in Step S184 in FIG. 51. Firstly, in Step S201, a list of file names of the files in the ACTIVE directory under the discID directory is obtained. In Step S203, the file names contained in the file list for the intermediary file structure obtained in Step S182 in FIG. 51 are checked. In the case where there is no file having the same file name, the file names of the files in the intermediary file structure are added to the list in Step S204. The processing in Steps S203 and S204 is applied to each of all the files in the intermediary file structure, and when it is judged that all the files have been checked in Step S202, the obtained file list is taken as the file structure list for the Virtual Package, and the processing is completed. Thus completes the description of the processing procedure for Virtual Package Construction with the use of an intermediary file structure.

As explained so far, according to the present embodiment, in the case where a Virtual Package is constructed by merging files recorded on a plurality of recording media, the files recorded on the HDD, which is a readable/writable recording medium, are moved to the ACTIVE directory; therefore, there is no possibility that a substance file stored in the Local Storage is altered due to an illegitimate file access from the application itself or other applications while the Virtual Package is being constructed. Further, by providing an ACTIVE directory at a position to which Java applications belonging to the same provider are able to access in common, it is possible to enable the different BD-ROMs to share the contents stored in the Local Storage. Thus, there is no need for the Local Storage to store a plurality of AV streams or the like, having a large file size, which are of the same substance. Consequently, it is possible to share and utilize the data between the BD-ROMs efficiently.

Eighth Embodiment

The eighth embodiment discusses a method for detecting a tampering in the case where a file that is stored in the Local Storage and is used for constructing of a Virtual Package has been tampered with. In the eighth embodiment, description for a part that is the same as in the third embodiment will be omitted. Description will be provided only for the part that is different from the third embodiment.

When a file within the Local Storage to be used for construction of a Virtual Package is tampered with, there is a possibility that an operation that is not expected by the provider may be performed while the Virtual Package is being played back. Thus, it is necessary to detect tampering.

In order to detect tampering, the playback apparatus according to the present embodiment checks if the merge management information file has not been tampered with when a Virtual Package is to be constructed, and checks if files on the HDD have not been tampered with when the file is read.

After a Virtual Package is constructed, the Virtual File System unit 38 may sometimes provide some files stored in the Local Storage for the DVD-like module 29a, the Java platform 29b, the Playback Control Engine 32 or the like, during the playback of the Virtual Package. Since those files are stored in the Local storage, it is necessary to check if the files have not been tampered with before being used by such modules.

The files within the Local Storage that constitute a Virtual Package may be classified into two types in terms of necessity of checking for tampering.

The first type is data files that each have a small file size and normally will not cause any problem in the responsiveness of the playback apparatus even if the entire file is checked for tampering. For example, a "merge management information file" is normally classified into this type.

The second type is data files that each have a large file size and may cause a problem in the responsiveness of the playback apparatus because checking the entire file takes a long time. For example, "AV data (an M2TS file)" in an MPEG stream is normally classified into this type.

The following describes the checking for tampering in a file classified into the first type. At the end, the difference will be discussed with regard to the case where checking is performed on a file classified into the second type.

Figure 54:
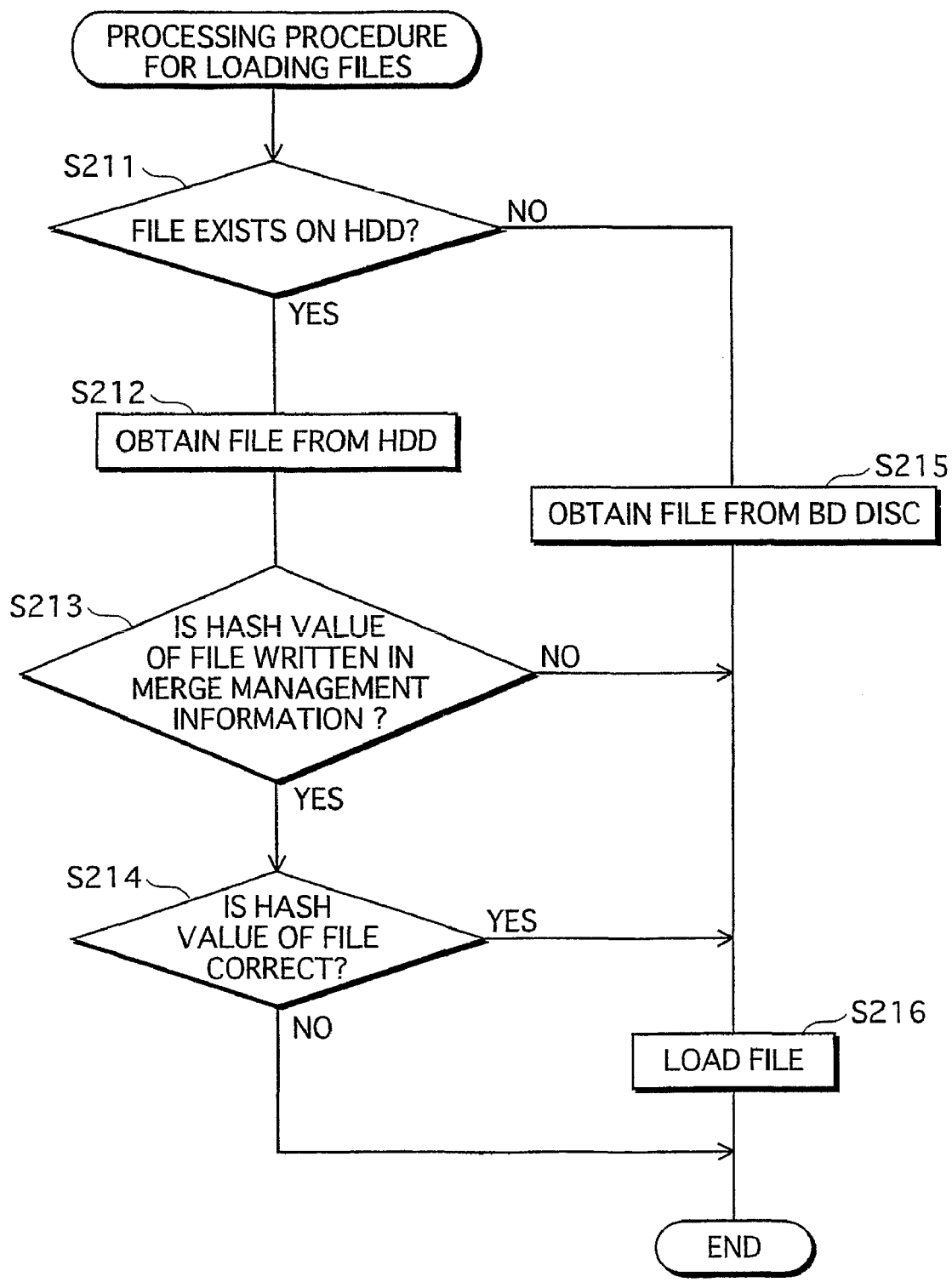
FIG. 54 is a flow chart that shows how the Virtual File System unit 38 provides the files in the Local Storage to other modules.

FIG. 54 is a flow chart that shows the Virtual File System unit 38 supplying a file in the Local Storage to another module. In Step S211, it is checked if the requested file exists in the Local Storage. In the case where the request file is in the Local Storage (Step S211: YES), the file is obtained from the Local Storage in Step S212. Subsequently, in Step S213, it is checked if the hash value of the target file is written in the merge management information file. In the case where the hash value is written in the merge management information file (Step S213: YES), a hash value of the file is calculated in Step S214, and the calculated value is compared with the value written in the merge management information file to judge if the values are equal to each other.

In the case where the calculated value is not equal to the value written in the merge management file (Step S214: NO), the loading of the file will not be actually performed. In the case where the judgment result in Step S211 is that the file does not exist in the Local Storage (Step S211: NO), the file is obtained from the BD-ROM in Step S215. Subsequently, the file is actually loaded in Step S216 so that other modules are able to use the file. Likewise, in the cases where the hash value is not written in the merge management information file (Step S213: NO) and where the calculated value is equal to the value written in the merge management information file (Step S214), the file is actually loaded in Step S216 so that other modules are able to use the file.

It should be noted in the case where the Virtual File System unit 38 reads a file from the Local Storage more than one time, the checking for tampering may be performed every time the file is read. It is also acceptable to lock the file after the tampering is performed so that the information in the Local Storage will not be altered.

Further, it is also acceptable to have an arrangement wherein the Virtual File System unit 38 performs the checking for tampering in advance on some or all of the files to be used by other modules and stores the checked files in the Virtual File System Unit 38 or locks the checked files. As long as an arrangement is made wherein after a file is read from the Local Storage, the hash value of the file is calculated to check for tampering before the file is used by other modules, it is acceptable to realize the arrangement in any manner.

When detecting that a file to be used by other modules has been tampered with, the Virtual File System unit 38 suspends the playback so that a malfunction will not be caused. In such a situation, it is acceptable to notify the user, or notify the Java application via the Java platform 29b, or to perform the playback again only with the BD-ROM, besides suspending the playback. Alternatively, it is acceptable to combine any of these processings.

As for the data files that each have a large file size and may cause a problem in the responsiveness of the playback apparatus because checking the entire file takes a long time, a method is used to encrypt the entire file so that the file cannot be decrypted after being tampered with. In such a case, it is acceptable to have an arrangement wherein even if a hash value of the encrypted file is written in the merge management information file, the Virtual File System unit 38 ignores it since when a part of the encrypted file is tampered with, it is impossible to decrypt the file as an authentic file.

Alternatively, it is acceptable that only a part of the file is checked for tampering or that only the size of the file us checked. In the case where the entire file is encrypted, there is a possibility that the entire file may be replaced with another file. In such a case, it is possible to easily perform the checking for tampering by checking the file size. It is also acceptable to set a condition under which the Virtual File System unit 38 ignores a written hash value. For example, a written hash value is ignored in the case where the file size is larger than a specific value, or where the extension in the file name contained in the merge management information file is a specific value such as .M2TS, for example, or where the file name contained in the merge management information file is under a specific directory such as the STREAM directory, for example.

As explained so far, according to the present embodiment, when a Virtual Package is constructed by merging files recorded on a plurality of recording media, if a substance file in the Local Storage, which is a readable/writable recording medium, has been tampered with, it is possible to judge if the hash value is correct and detect the tampering of the substance file so as to suspend the playback. Thus, it is possible to prevent a malfunction that may be caused by use of an illegitimate file before it happens.

Ninth Embodiment

The ninth embodiment discusses a method for displaying on a screen the state of Virtual Package construction processing. In the description of the ninth embodiment, description of the part that is the same as in the third embodiment will be omitted. Description will be provided only for the difference from the third embodiment.

Figure 55:
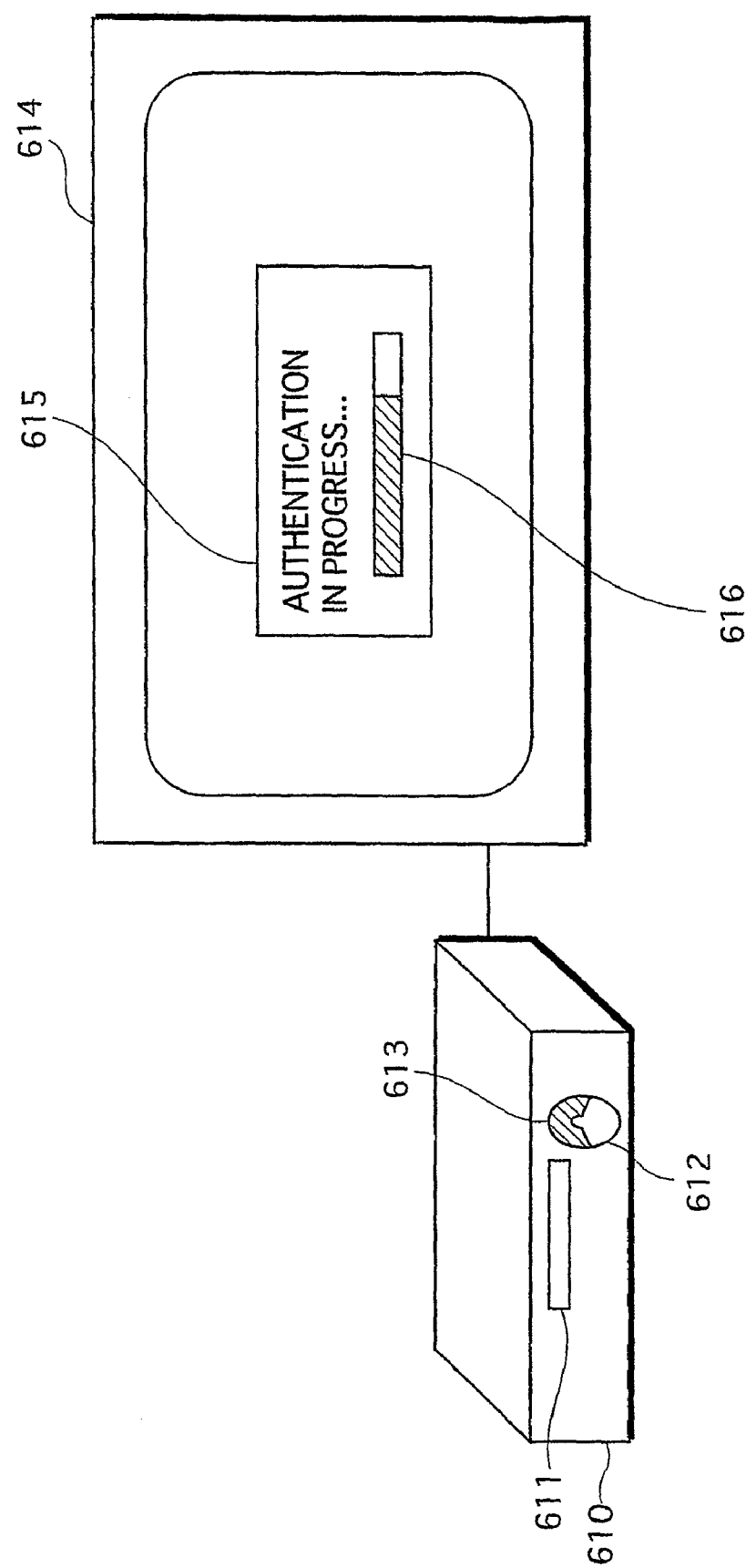
FIG. 55 schematically shows a display during a Virtual Package construction processing according to the ninth embodiment.

FIG. 55 schematically shows a display during a Virtual Package construction processing according to the ninth embodiment.

The playback apparatus 610 schematically represents the external appearance of a playback apparatus. A BD-ROM drive 611 that is built in the playback apparatus 610 loads and ejects a BD-ROM and access the BD-ROM. A fluorescent tube display device 612 that is operable to show a Virtual Package construction processing is being performed and serves as a color display unit is provided on the front side of the playback apparatus 610 and indicates that a Virtual Package construction processing is being performed by the color of the display (for example, display in an orange color). A fluorescent tube display device 613 that is operable to show the degree of progress in the processing related to Virtual Package construction such as the authentication processing, by changing the proportion of the displayed area is provided on the front side of the playback apparatus 610 and indicates the degree of progress in the Virtual Package construction processing by changing the proportion of the area displayed with the light from the fluorescent tube. The input unit (not shown in the drawing) of a display apparatus 614 such as a TV is connected, via a wiring or the like, to the output unit (not shown in the drawing) of the playback apparatus 610 and displays images outputted from the playback apparatus 610 on the screen. The playback apparatus 610 outputs a screen display 615 indicating that a Virtual Package construction is being performed to the display apparatus 614, as a pop-up message panel or the like, so that it is displayed as being superimposed on the content playback display screen.

The screen display 615 displayed as a pop-up includes a screen display 616 that shows the degree of progress in the processing related to Virtual Package construction such as the authentication processing, by changing the proportion of the displayed area which visually indicates the degree of progress in the Virtual Package construction processing by changing the proportion of the bar on the screen of the display apparatus 614.

Figure 56:
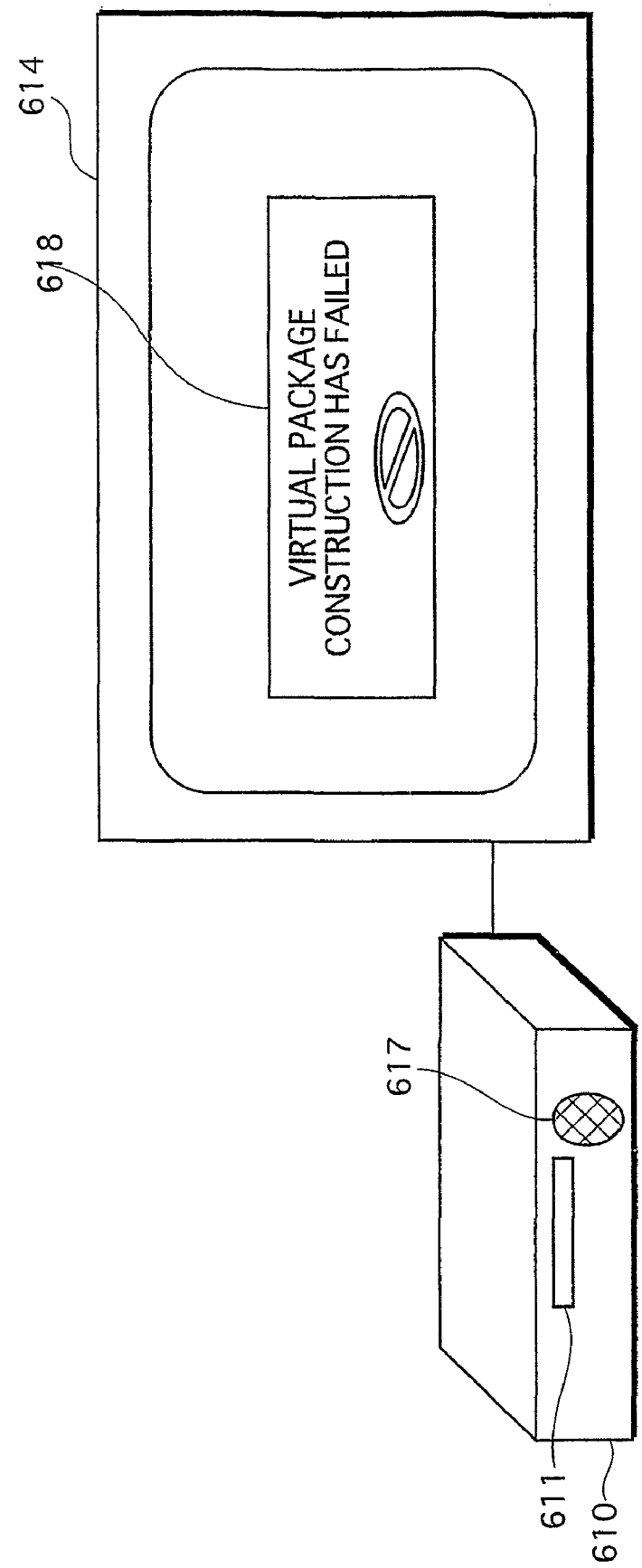
FIG. 56 shows a display of a failure in a Virtual Package construction processing according to the ninth embodiment.

FIG. 56 schematically shows a display of a failure in a Virtual Package construction processing according to the ninth embodiment. Description will be omitted for the same parts as in FIG. 55. Only the difference from FIG. 55 will be explained. A fluorescent tube display 617 operable to indicate a failure in a Virtual Package construction processing is provided on the front side of the playback apparatus 610 and indicates that a Virtual Package construction processing has failed by the color of the display (for example, display in a red color). In the case where a Virtual Package construction processing has failed, the playback apparatus 610 outputs a screen display 618 indicating a failure of the Virtual Package construction to the display apparatus 614, as a pop-up message panel or the like, so that it is displayed as being superimposed on the content playback display screen.

Figure 57:
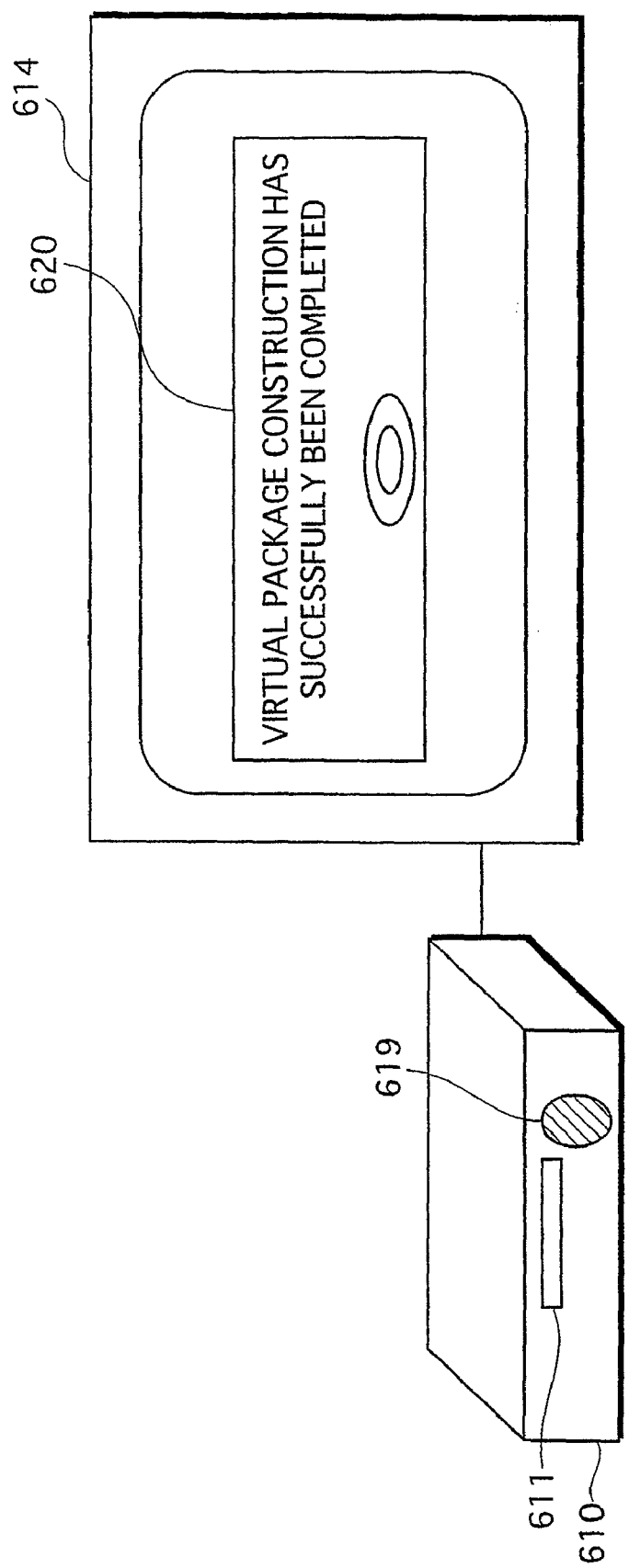
FIG. 57 schematically shows a display of a success in a Virtual Package construction processing according to the ninth embodiment.
Figure 58:
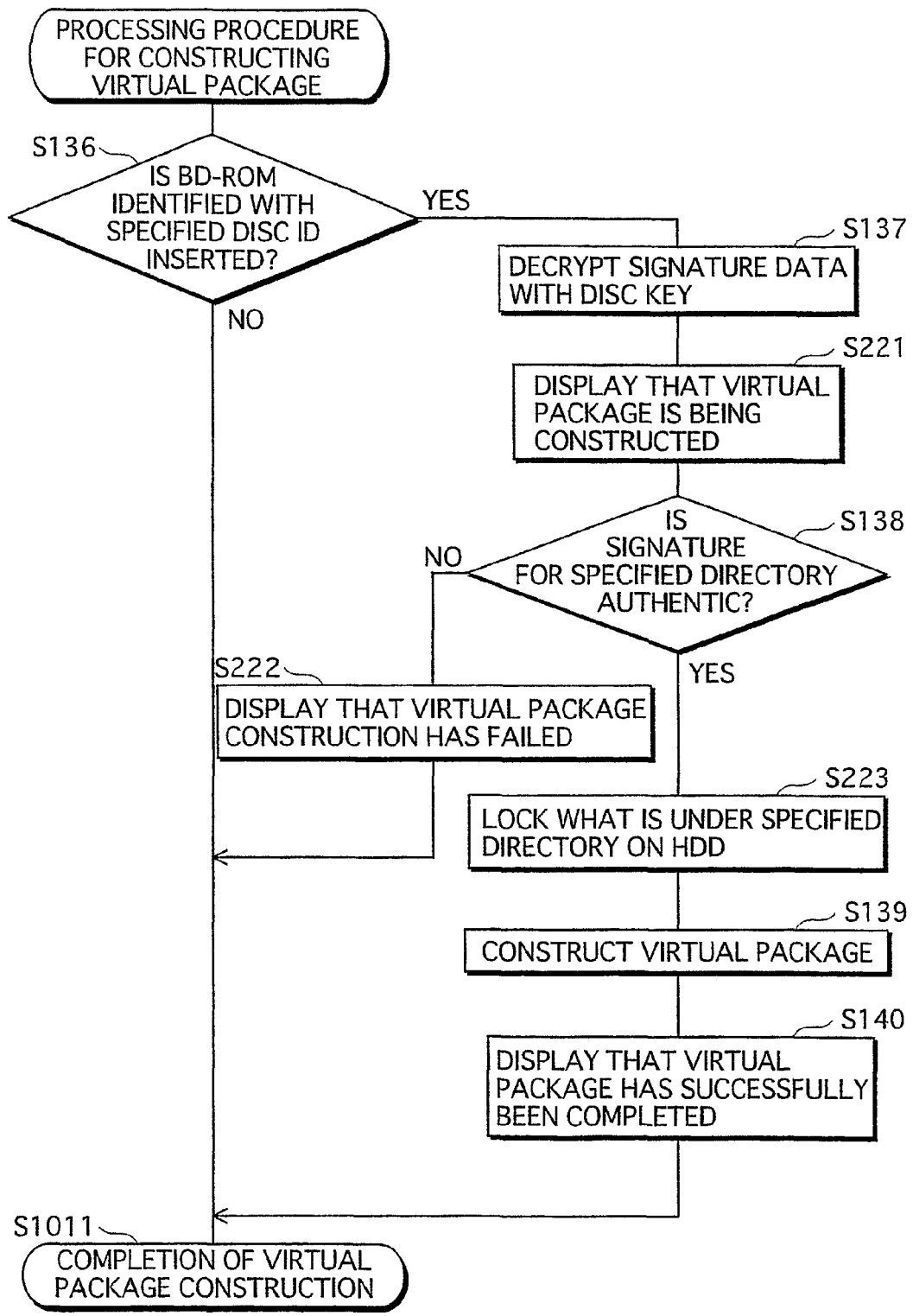
FIG. 58 is a flow chart that shows the processing procedure for updating the display related to a construction of a Virtual Package.

FIG. 57 schematically shows a display of a success in a Virtual Package construction processing according to the ninth embodiment. Description will be omitted for the same parts as in FIG. 55. Only the difference from FIG. 55 will be explained. A fluorescent tube display 619 operable to indicate a success in a Virtual Package construction processing is provided on the front side of the playback apparatus 610 and indicates that a Virtual Package construction processing has been successful by the color of the display (for example, display in a green color). In the case where a Virtual Package construction processing has been successful, the playback apparatus 610 outputs a screen display 620 indicating a success in the Virtual Package construction processing to the display apparatus 614, as a pop-up message panel or the like, so that it is displayed as being superimposed on the content playback display screen.

The following describes the procedure of displaying the state of a construction processing on a screen when a Virtual Package is constructed. FIG. 32 is a flow chart that shows the processing procedure for updating a display related to a Virtual Package construction processing.

This flow chart is obtained by taking out the processing procedure in Steps S131 through S135 from the flow chart shown in FIG. 44 and adding the processing procedure in Steps S222 and 223.

In Step S221, the display is switched to a display indicating that a Virtual Package processing is being performed shown in FIG. 55. In Step S222, the display is switched to a display indicating that a Virtual Package processing has failed shown in FIG. 56. In Step S223, the display is switched to a display indicating that a Virtual Package processing has been successful shown in FIG. 57. It is also acceptable that the display is shown on the screen for a predetermined time after the processing in Step S222 or in Step S223 is performed, before the output of the screen display indicating the state of the Virtual Package construction is finished, and the normal contents playback is performed.

Figure 59:
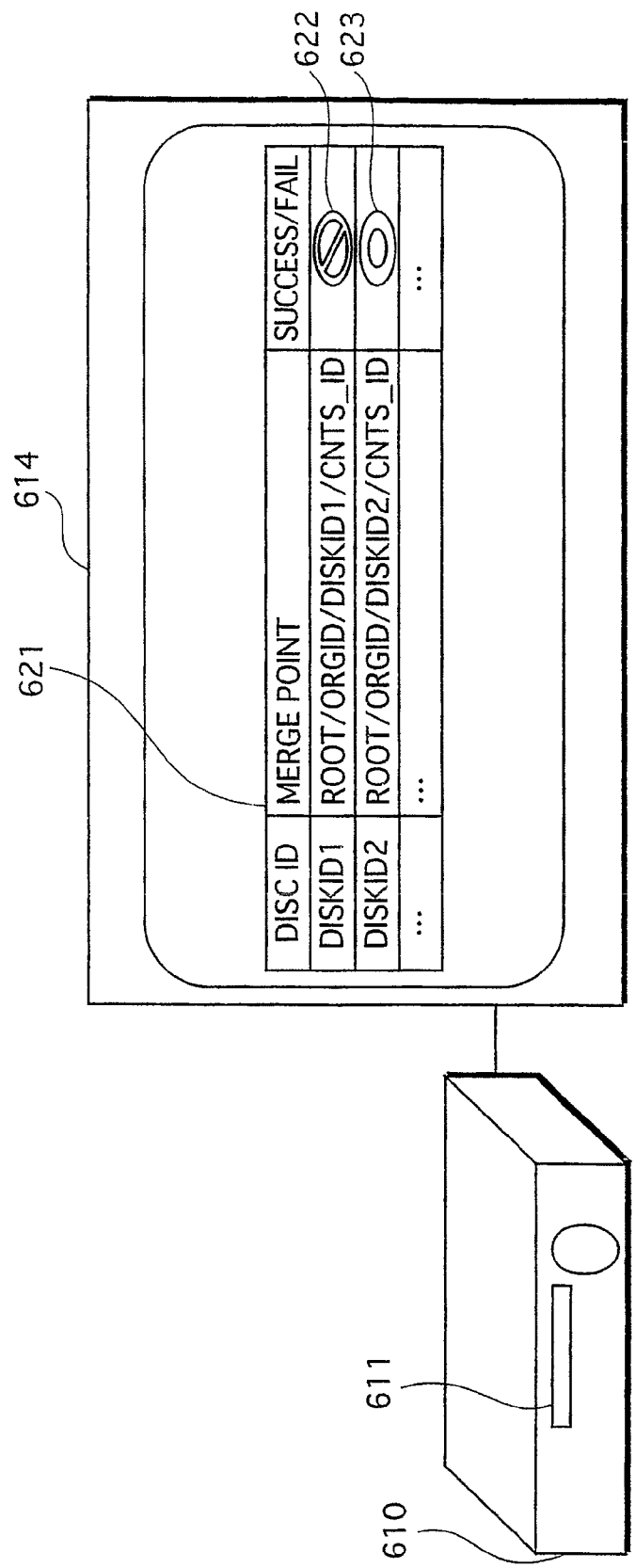
FIG. 59 shows a display of a list of contents in the Local Storage according to the ninth embodiment.

FIG. 59 shows a display of a list of the contents stored in the Local Storage according to the ninth embodiment. Description will be omitted for the same parts as in FIG. 55. Only the difference from FIG. 55 will be explained. A screen display 621 for a list of the contents stored in the Local Storage is an image for displaying, on the display apparatus 614, a list of the contents in the Local Storage that are managed in the Virtual Package management table. A screen display 622 showing a content that has failed in the Virtual Package construction processing in the list of the contents is a screen display for indicating to the user by an icon within the screen display 621 for the list of the contents in the Local Storage that the content has failed in the signature authentication. A screen display 623 showing a content that has been successful in the Virtual Package construction processing in the list of the contents is a screen display for indicating to the user by an icon within the screen display 621 for the list of the contents in the Local Storage that the content has been successful in the signature authentication.

It should be noted that in the present embodiment, the user is notified of a content that has failed in the Virtual Package construction processing; however, it is acceptable to have an arrangement wherein the system automatically deletes such a content.

OTHER MODIFICATION EXAMPLES

The present invention has been explained so far based on the embodiments examples above. Needless to say, however, the present invention is not limited to the embodiment examples described above. The present invention includes other examples as described below.

(1) The present invention may be construed as methods as described above. Alternatively, the present invention may be construed as a computer program for realizing such methods with the use of a computer or digital signals converted from such a computer program.

Additionally, it is acceptable that the present invention is construed as a computer-readable recoding medium e.g. a flexible disk, a hard disk, a CD-ROM, an MO, a DVD, a DVD-ROM, a DVD-RAM, a BD (Blu-ray Disc) or a semiconductor memory, that records such a computer program or such digital signals thereon; or that the present invention is construed as such a computer program or such digital signals recorded on such a recording medium.

Further, the present invention may be realized through transmission of such a computer program or such digital signals via telecommunication lines, wireless or wired communication lines, a network such as the Internet, or the like.

Further, it is acceptable to consider that the present invention is a computer system comprising a microprocessor and a memory, wherein the memory stores therein the computer program mentioned above, and the microprocessor operates according to the computer program.

Furthermore, it is acceptable to execute the aforementioned program or digital signals on a dependent computer system by delivering the program or digital signals recorded on the aforementioned recording medium or via the aforementioned network or the like (2) In the first through ninth embodiments, Java (registered trademark) is used as a programming language of the virtual machine. However, it is also acceptable to use, instead of Java™ programming languages such as B-shell used for the OS for UNIX™, Perl Script, ECMA Script, or the like. In other words, the present invention is not limited to Java™.

(3) In the first through ninth embodiments, the structure in the Local Storage to store the files has the same directory structure as on a BD-ROM; however, as long as the correspondence relationship between the files is clearly represented, the present invention is not limited to the fact that the same directory structures are used.

(4) In the first through ninth embodiments, an HDD is used as a readable/writable recording medium; however, it is acceptable to use a flash or the like as a readable/writable recording medium.

(5) In the first through ninth embodiments, the description is provided for a playback apparatus having a function of playing back a recording medium; however, needless to say, the present invention is applicable to a playback apparatus having not only a playback function but also a recording function.

(6) In the first through ninth embodiments, the description is provided for a playback apparatus that plays back a BD-ROM; however, needless to say, the same effects as the above can be achieved in the case where the necessary data recorded on the BD-ROM described in the above embodiments is recorded on a writable optical recording medium.

Further, needless to say, the same effects as the above can be achieved in the case where the necessary data recorded on the BD-ROM described in the above embodiments is recorded on a portable recording medium (e.g. a semiconductor memory such as an SD-card, or a Compact Flash), instead of on an optical recording medium.

(7) It is acceptable to combine any of the embodiments and modification examples.

INDUSTRIAL APPLICABILITY

Examples to which the present invention may be applied includes a playback apparatus such as a BD-ROM player on which a HDD is installed and which performs playback by extending what is recorded on a read-only recording medium with what is recorded on a readable/writable recording medium.

The invention claimed is:

1. A playback apparatus that plays back an application program and a digital stream in conjunction with each other, the playback apparatus comprising:

a reading unit operable to read a file recorded on a read-only recording medium mounted to the playback apparatus;

a storing unit storing therein (i) a plurality of files, (ii) merge management information which specifies a file out of the plurality of files that is to be used in combination with what is recorded on the read-only recording medium, and (iii) signature information which is used for judging authenticity of the merge management information;

a judgment unit operable to judge the authenticity of the merge management information based on the signature information;

a package management unit operable to (a) in a case where the merge management information is judged to be authentic, generate package information that indicates a new file structure obtained by adding the file specified by the merge management information to a file structure of the read-only recording medium and (b) in a case where the merge management information is judged to be inauthentic, not generate the package information that indicates the new file structure;

a playback unit operable to playback the digital stream either recorded on the read-only recording medium or stored in the storing unit based on the package information generated by the package management unit; and an execution unit operable to execute the application program either recorded on the read-only recording medium or stored in the storing unit based on the package information generated by the package management unit.

2. A playback method for playing back an application program and a digital stream in conjunction with each other, wherein a read-only recording medium has a first set of files recorded thereon, a readable/writable recording medium having recorded thereon a second set of files, merge management information which specifies a file out of the second set of files that is to be used in combination with what is recorded in the read-only recording medium, and signature information which is used for judging authenticity of the merge management information, and the playback method comprises:

a judgment step of judging the authenticity of the merge management information based on the signature information;

a package information generating step of (a) in a case where the merge management information is judged to be authentic, generating package information that indicates a new file structure obtained by adding the file specified by the merge management information to a file structure of the read-only recording medium and (b) in a case where the merge management information is judged to be inauthentic, not generating the package information that indicates the new file structure;

a playback step of playing back the digital stream either recorded on the read-only recording medium or on the readable/writable recording medium based on the generated package information; and an execution step of executing the application program either recorded on the read-only recording medium or on the readable/writable recording medium based on the generated package information.

* * * * *